United States Patent
Porat et al.

(10) Patent No.: US 9,831,929 B2
(45) Date of Patent: Nov. 28, 2017

(54) DIFFERENTIAL FEEDBACK WITHIN SINGLE USER, MULTIPLE USER, MULTIPLE ACCESS, AND/OR MIMO WIRELESS COMMUNICATIONS

(71) Applicant: BROADCOM CORPORATION, Irvine, CA (US)

(72) Inventors: Ron Porat, San Diego, CA (US); Matthew James Fischer, Mountain View, CA (US); Eric J. Ojard, San Francisco, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 102 days.

(21) Appl. No.: 14/821,939

(22) Filed: Aug. 10, 2015

(65) Prior Publication Data

US 2015/0349860 A1     Dec. 3, 2015

Related U.S. Application Data

(63) Continuation of application No. 13/239,582, filed on Sep. 22, 2011, now Pat. No. 9,118,364.

(Continued)

(51) Int. Cl.
*H04W 4/00* (2009.01)
*H04B 7/0417* (2017.01)
(Continued)

(52) U.S. Cl.
CPC ........... *H04B 7/0417* (2013.01); *H04B 7/043* (2013.01); *H04B 7/0456* (2013.01);
(Continued)

(58) Field of Classification Search
CPC ..... H04W 4/00; H04B 7/0641; H04B 7/0417; H04B 7/0478
(Continued)

(56) References Cited

U.S. PATENT DOCUMENTS 8,315,221 B2 * 11/2012 Choudhury ........... H04L 1/0026
370/329
2008/0049709 A1 * 2/2008 Pan ..................... H04B 7/0634
370/344

(Continued)

*Primary Examiner* — Jamal Javaid
(74) *Attorney, Agent, or Firm* — Garlick & Markison; Shayne X. Short

(57) ABSTRACT

Differential feedback within multiple user, multiple access, and/or MIMO wireless communications. After full feedback signal(s) have been received by a communication device (e.g., one that is to be performing beamforming for use in subsequent signal transmission), differential feedback signal(s) are received. Those differential feedback signal(s) are employed to update the full feedback signal(s) thereby generating updated/modified full feedback signals. Over time, such updated/modified full feedback signals may subsequently be further updated based upon later received inferential feedback signal(s). Such differential feedback signaling takes advantage of time and/or frequency correlation in a communication channel to provide for reduced feedback overhead by feeding back a difference or delta (Δ) relative to a previous value. For example, instead of providing full feedback signals in each respective/successive communication, feedback overhead is reduced by providing a difference or delta (Δ).

20 Claims, 40 Drawing Sheets

Related U.S. Application Data

(60) Provisional application No. 61/390,599, filed on Oct. 6, 2010, provisional application No. 61/409,727, filed on Nov. 3, 2010, provisional application No. 61/414,557, filed on Nov. 17, 2010.

(51) Int. Cl.
*H04B 7/0456* (2017.01)
*H04B 7/04* (2017.01)
*H04W 88/02* (2009.01)
*H04W 88/08* (2009.01)
*H04B 7/06* (2006.01)

(52) U.S. Cl.
CPC ........... *H04W 88/02* (2013.01); *H04W 88/08* (2013.01); *H04B 7/065* (2013.01); *H04B 7/0641* (2013.01); *H04B 7/0658* (2013.01)

(58) Field of Classification Search
USPC ........................................ 370/328, 329, 252
See application file for complete search history.

(56) References Cited

U.S. PATENT DOCUMENTS

| | | | |
|---|---|---|---|
| 2008/0069031 A1* | 3/2008 | Zhang | H04B 7/0617 370/328 |
| 2009/0003474 A1* | 1/2009 | Pan | H04B 7/0639 375/260 |

* cited by examiner

76 - 80

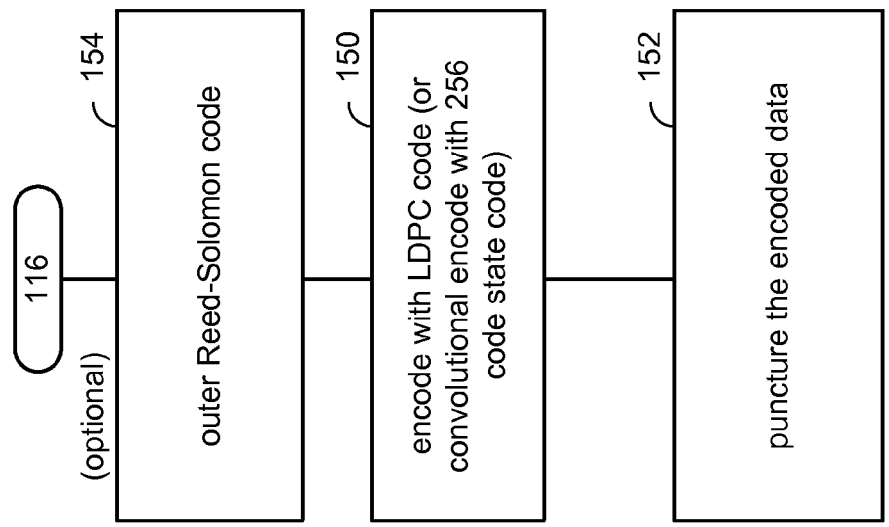
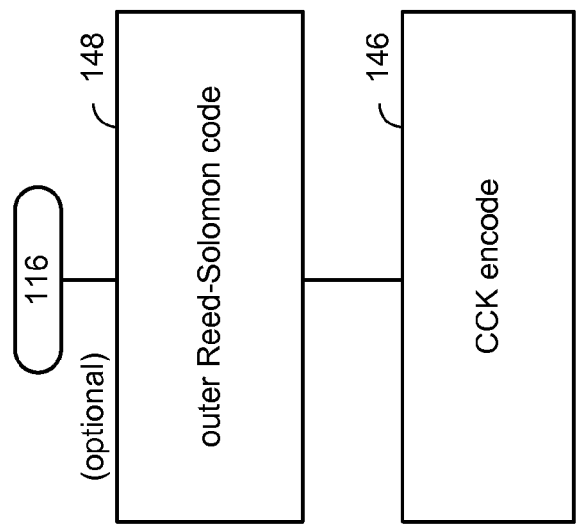

| x | codeword |
|---|---|
| -16: | 1 1 1 1 1 1 1 1 1 1 1 1 1 1 1 1 0 1 |
| -15: | 1 1 1 1 1 1 1 1 1 1 1 1 1 1 1 0 1 |
| -14: | 1 1 1 1 1 1 1 1 1 1 1 1 1 1 0 1 |
| -13: | 1 1 1 1 1 1 1 1 1 1 1 1 1 0 1 |
| -12: | 1 1 1 1 1 1 1 1 1 1 1 1 0 1 |
| -11: | 1 1 1 1 1 1 1 1 1 1 1 0 1 |
| -10: | 1 1 1 1 1 1 1 1 1 1 0 1 |
| -9: | 1 1 1 1 1 1 1 1 1 0 1 |
| -8: | 1 1 1 1 1 1 1 1 0 1 |
| -7: | 1 1 1 1 1 1 1 0 1 |
| -6: | 1 1 1 1 1 1 0 1 |
| -5: | 1 1 1 1 1 0 1 |
| -4: | 1 1 1 1 0 1 |
| -3: | 1 1 1 0 1 |
| -2: | 1 1 0 1 |
| -1: | 1 0 1 |
| 0: | 1 1 1 1 1 1 1 1 1 1 1 1 1 1 1 1 0 |
| 1: | 0 1 1 1 1 1 1 1 1 1 1 1 1 1 1 1 1 |
| 2: | 0 0 1 1 1 1 1 1 1 1 1 1 1 1 1 1 1 |
| 3: | 0 0 1 1 1 1 1 1 1 1 1 1 1 1 1 1 |
| 4: | 0 0 1 1 1 1 1 1 1 1 1 1 1 1 1 |
| 5: | 0 0 1 1 1 1 1 1 1 1 1 1 1 1 |
| 6: | 0 0 1 1 1 1 1 1 1 1 1 1 1 |
| 7: | 0 0 1 1 1 1 1 1 1 1 1 1 |
| 8: | 0 0 1 1 1 1 1 1 1 1 1 |
| 9: | 0 0 1 1 1 1 1 1 1 1 |
| 10: | 0 0 1 1 1 1 1 1 1 |
| 11: | 0 0 1 1 1 1 1 1 |
| 12: | 0 0 1 1 1 1 1 |
| 13: | 0 0 1 1 1 1 |
| 14: | 0 0 1 1 1 |
| 15: | 0 0 1 1 |

This is a subset of the codebook. The range of x does not need to be limited.

Example codebook: p=0

FIG. 16

```
  x    codeword
-16:                                     0
-15:                                   1 1 0
-14:                                 0 1 1 0
-13:                               1 0 0 1 1 0
-12:                             1 1 1 0 0 1 1 0
-11:                           1 1 1 1 1 0 0 1 1 0
-10:                         1 1 1 1 1 1 1 0 0 1 1 0
 -9:                       1 1 1 1 1 1 1 1 1 0 0 1 1 0
 -8:                     1 1 1 1 1 1 1 1 1 1 1 0 0 1 1 0
 -7:                   1 1 1 1 1 1 1 1 1 1 1 1 1 0 0 1 1
 -6:                 1 1 1 1 1 1 1 1 1 1 1 1 1 1 1 0 0 1 1
 -5:               1 1 1 1 1 1 1 1 1 1 1 1 1 1 1 1 1 0 0 1
 -4:             1 1 1 1 1 1 1 1 1 1 1 1 1 1 1 1 1 1 1 0 0
 -3:           1 1 1 1 1 1 1 1 1 1 1 1 1 1 1 1 1 1 1 1 1 0
 -2:         1 1 1 0 0
 -1:       1 0 0
  0:     0 0 0
  1:   0 0 1
  2: 0 1 1
  3: 1 1 1 0                           1 0 0 0 1 1 1 1 1 1
  4: 1 1 1 1 1 0                       1 0 0 0 0 1 1 1 1 1 1
  5: 1 1 1 1 1 1 1 0                   1 0 0 0 0 0 1 1 1 1 1 1
  6: 1 1 1 1 1 1 1 1 1 0               1 0 0 0 0 0 0 1 1 1 1 1 1
  7: 1 1 1 1 1 1 1 1 1 1 1 0           1 0 0 0 0 0 0 0 1 1 1 1 1 1
  8: 1 1 1 1 1 1 1 1 1 1 1 1 1 0       1 0 0 0 0 0 0 0 0 1 1 1 1 1 1
  9: 1 1 1 1 1 1 1 1 1 1 1 1 1 1 1 0   1 0 0 0 0 0 0 0 0 0 1 1 1 1 1 1
 10: 1 1 1 1 1 1 1 1 1 1 1 1 1 1 1 1 1 0 1 0 0 0 0 0 0 1 1 1
 11: 1 1                                 1 0 0 0 0 0 1 1 1
 12: 1 1                                 1 0 0 0 0 1 1 1
 13: 1 1                                 1 0 0 0 1 1 1
 14: 1 1                                 1 0 0 1 1
 15: 1 1                                 1 0 1
```

This is a subset of the codebook. The range of x does not need to be limited.

FIG. 17

Example codebook: p=1

| x | codeword |
|---|---|
| -16: | 1 1 1 1 1 1 1 1 1 0 0 1 |
| -15: | 1 1 1 1 1 1 1 1 1 1 0 0 0 1 0 1 |
| -14: | 1 1 1 1 1 1 1 1 1 1 0 1 |
| -13: | 1 1 1 1 1 1 1 1 0 1 1 1 1 0 0 1 0 1 |
| -12: | 1 1 1 1 1 1 1 1 0 0 1 1 |
| -11: | 1 1 1 1 1 1 1 1 0 0 0 1 |
| -10: | 1 1 1 1 1 1 1 0 1 1 1 1 0 0 1 |
| -9: | 1 1 1 1 1 1 1 0 1 1 |
| -8: | 1 1 1 1 1 1 0 1 1 1 1 0 1 |
| -7: | 1 1 1 1 1 0 1 1 |
| -6: | 1 1 1 1 0 0 1 1 1 1 0 0 |
| -5: | 1 1 1 0 0 0 1 1 |
| -4: | 1 1 0 0 1 1 1 1 0 0 |
| -3: | 1 0 0 1 0 1 |
| -2: | 0 0 1 1 |
| -1: | 0 1 |
| 0: | 1 0 |
| 1: | 1 1 0 0 |
| 2: | 1 1 1 0 1 0 |
| 3: | 1 1 1 1 0 0 0 0 1 1 |
| 4: | 1 1 1 1 1 0 0 0 |
| 5: | 1 1 1 1 1 1 0 0 0 0 1 1 |
| 6: | 1 1 1 1 1 1 1 0 1 0 |
| 7: | 1 1 1 1 1 1 1 1 0 1 1 0 0 0 |
| 8: | 1 1 1 1 1 1 1 1 1 0 1 0 |
| 9: | 1 1 1 1 1 1 1 1 1 1 0 0 |
| 10: | 1 1 1 1 1 1 1 1 1 1 1 0 1 0 1 1 0 0 |
| 11: | 1 1 1 1 1 1 1 1 1 1 1 1 0 0 |
| 12: | 1 1 1 1 1 1 1 1 1 1 1 1 0 1 0 0 |
| 13: | 1 1 1 1 1 1 1 1 1 1 1 1 1 0 1 1 |
| 14: | 1 1 1 1 1 1 1 1 1 1 1 1 1 1 0 1 |
| 15: | 1 1 1 1 1 1 1 1 1 1 1 1 1 1 1 1 |

This is a subset of the codebook. The range of x does not need to be limited.

Example codebook: p=2

FIG. 18

| x | codeword |
|---|---|
| -16: | 1 1 0 1 0 0 0 |
| -15: | 1 1 1 1 0 0 0 1 |
| -14: | 1 1 1 1 1 0 0 0 |
| -13: | 1 1 1 0 1 0 0 0 |
| -12: | 1 0 1 1 1 0 0 0 |
| -11: | 1 0 1 1 1 1 0 0 |
| -10: | 1 0 0 1 1 1 0 0 |
| -9: | 1 0 0 1 1 1 1 0 |
| -8: | 1 0 0 0 1 1 1 0 |
| -7: | 1 0 0 0 1 1 1 1 |
| -6: | 1 0 0 0 0 1 1 1 |
| -5: | 1 0 0 0 0 1 1 1 |
| -4: | 0 0 0 0 0 1 1 0 |
| -3: | 0 0 0 0 1 0 1 0 |
| -2: | 0 0 0 0 1 0 1 1 |
| -1: | 0 0 0 1 1 0 0 1 |
| 0: | 0 0 1 0 0 0 0 0 |
| 1: | 0 0 1 0 0 0 0 1 |
| 2: | 0 1 1 0 0 0 0 0 |
| 3: | 0 1 1 0 0 1 0 0 |
| 4: | 1 1 1 0 0 1 0 0 |
| 5: | 1 1 0 0 0 1 0 1 |
| 6: | 1 1 0 0 1 1 1 0 |
| 7: | 1 1 0 0 1 1 1 1 |
| 8: | 1 1 0 1 1 1 1 0 |
| 9: | 1 1 0 1 1 0 1 1 |
| 10: | 1 1 1 1 0 0 1 0 |
| 11: | 1 1 1 1 0 0 1 1 |
| 12: | 1 1 1 0 0 0 1 0 |
| 13: | 1 1 1 0 0 0 1 1 |
| 14: | 1 1 1 0 0 0 0 1 |
| 15: | 1 1 0 0 0 0 0 1 |

This is a subset of the codebook. The range of x does not need to be limited.

Example codebook: p=3

FIG. 19

| x | codeword | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|
| -16: | 1 | 1 | 1 | 1 | 1 | 1 | 1 | 1 | 1 | 1 | 1 | 1 | 1 | 1 | 1 | 1 | 0 | 1 | | | | | | | | | | | | | | | |
| -15: | 1 | 1 | 1 | 1 | 1 | 1 | 1 | 1 | 1 | 1 | 1 | 1 | 1 | 1 | 1 | 0 | 1 | | | | | | | | | | | | | | | | |
| -14: | 1 | 1 | 1 | 1 | 1 | 1 | 1 | 1 | 1 | 1 | 1 | 1 | 1 | 1 | 0 | 1 | | | | | | | | | | | | | | | | | |
| -13: | 1 | 1 | 1 | 1 | 1 | 1 | 1 | 1 | 1 | 1 | 1 | 1 | 1 | 0 | 1 | | | | | | | | | | | | | | | | | | |
| -12: | 1 | 1 | 1 | 1 | 1 | 1 | 1 | 1 | 1 | 1 | 1 | 1 | 0 | 1 | | | | | | | | | | | | | | | | | | | |
| -11: | 1 | 1 | 1 | 1 | 1 | 1 | 1 | 1 | 1 | 1 | 1 | 0 | 1 | | | | | | | | | | | | | | | | | | | | |
| -10: | 1 | 1 | 1 | 1 | 1 | 1 | 1 | 1 | 1 | 1 | 0 | 1 | | | | | | | | | | | | | | | | | | | | | |
| -9: | 1 | 1 | 1 | 1 | 1 | 1 | 1 | 1 | 1 | 0 | 1 | | | | | | | | | | | | | | | | | | | | | | |
| -8: | 1 | 1 | 1 | 1 | 1 | 1 | 1 | 1 | 0 | 1 | | | | | | | | | | | | | | | | | | | | | | | |
| -7: | 1 | 1 | 1 | 1 | 1 | 1 | 1 | 0 | 1 | | | | | | | | | | | | | | | | | | | | | | | | |
| -6: | 1 | 1 | 1 | 1 | 1 | 1 | 0 | 1 | | | | | | | | | | | | | | | | | | | | | | | | | |
| -5: | 1 | 1 | 1 | 1 | 1 | 0 | 1 | | | | | | | | | | | | | | | | | | | | | | | | | | |
| -4: | 1 | 1 | 1 | 1 | 0 | 1 | | | | | | | | | | | | | | | | | | | | | | | | | | | |
| -3: | 1 | 1 | 1 | 0 | 1 | | | | | | | | | | | | | | | | | | | | | | | | | | | | |
| -2: | 1 | 1 | 0 | 1 | | | | | | | | | | | | | | | | | | | | | | | | | | | | | |
| -1: | 1 | 0 | | | | | | | | | | | | | | | | | | | | | | | | | | | | | | | |
| 0: | 0 | | | | | | | | | | | | | | | | | | | | | | | | | | | | | | | | |
| 1: | 1 | 1 | | | | | | | | | | | | | | | | | | | | | | | | | | | | | | | |
| 2: | 0 | 1 | 1 | | | | | | | | | | | | | | | | | | | | | | | | | | | | | | |
| 3: | 0 | 0 | 1 | 1 | 1 | | | | | | | | | | | | | | | | | | | | | | | | | | | | |
| 4: | 0 | 0 | 1 | 1 | 1 | 1 | | | | | | | | | | | | | | | | | | | | | | | | | | | |
| 5: | 0 | 0 | 1 | 1 | 1 | 1 | 1 | | | | | | | | | | | | | | | | | | | | | | | | | | |
| 6: | 0 | 0 | 1 | 1 | 1 | 1 | 1 | 1 | | | | | | | | | | | | | | | | | | | | | | | | | |
| 7: | 0 | 0 | 1 | 1 | 1 | 1 | 1 | 1 | 1 | | | | | | | | | | | | | | | | | | | | | | | | |
| 8: | 0 | 0 | 1 | 1 | 1 | 1 | 1 | 1 | 1 | 1 | | | | | | | | | | | | | | | | | | | | | | | |
| 9: | 0 | 0 | 1 | 1 | 1 | 1 | 1 | 1 | 1 | 1 | 1 | | | | | | | | | | | | | | | | | | | | | | |
| 10: | 0 | 0 | 1 | 1 | 1 | 1 | 1 | 1 | 1 | 1 | 1 | 1 | | | | | | | | | | | | | | | | | | | | | |
| 11: | 0 | 0 | 1 | 1 | 1 | 1 | 1 | 1 | 1 | 1 | 1 | 1 | 1 | | | | | | | | | | | | | | | | | | | | |
| 12: | 0 | 0 | 1 | 1 | 1 | 1 | 1 | 1 | 1 | 1 | 1 | 1 | 1 | 1 | | | | | | | | | | | | | | | | | | | |
| 13: | 0 | 0 | 1 | 1 | 1 | 1 | 1 | 1 | 1 | 1 | 1 | 1 | 1 | 1 | 1 | | | | | | | | | | | | | | | | | | |
| 14: | 0 | 0 | 1 | 1 | 1 | 1 | 1 | 1 | 1 | 1 | 1 | 1 | 1 | 1 | 1 | 1 | | | | | | | | | | | | | | | | | |
| 15: | 0 | 0 | 1 | 1 | 1 | 1 | 1 | 1 | 1 | 1 | 1 | 1 | 1 | 1 | 1 | 1 | 1 | | | | | | | | | | | | | | | | |

Example codebook: p=0

This is a subset of the codebook. The range of x does not need to be limited.

```
  x      codeword
-16:   1 1 1 1 1 1 1 1 1 1 1 1 1 1 1 0
-15:   1 1 1 1 1 1 1 1 1 1 1 1 1 1 0
-14:   1 1 1 1 1 1 1 1 1 1 1 1 1 0 0 1 1 1 0
-13:   1 1 1 1 1 1 1 1 1 1 1 1 0 0 1 1 1 0
-12:   1 1 1 1 1 1 1 1 1 1 1 0 0 1 1 1 0
-11:   1 1 1 1 1 1 1 1 1 1 0 0 1 1 1 0
-10:   1 1 1 1 1 1 1 1 1 0 0 1 1 1 0
 -9:   1 1 1 1 1 1 1 1 0 0 1 1 1 0
 -8:   1 1 1 1 1 1 1 0 0 1 1 1 0
 -7:   1 1 1 1 1 1 0 0 1 1 1 0
 -6:   1 1 1 1 1 0 0 1 1 1 0
 -5:   1 1 1 1 0 0 1 1 1 0
 -4:   1 1 1 0 0 1 1 0
 -3:   1 1 0 0 1 1 0
 -2:   1 1 0 0 1 0
 -1:   1 0 0 1 0
  0:   0
  1:   1 0 1 1
  2:   1 1 0 0 1 1
  3:   1 1 0 1 1 1
  4:   1 1 1 0 0 0 1 1 1
  5:   1 1 1 0 0 1 1 1 1
  6:   1 1 1 0 1 0 1 1 1 1
  7:   1 1 1 0 1 1 1 1 1 1
  8:   1 1 1 1 0 0 0 0 1 1 1 1 1
  9:   1 1 1 1 0 0 0 1 1 1 1 1 1
 10:   1 1 1 1 0 0 1 0 1 1 1 1 1 1
 11:   1 1 1 1 0 0 1 1 1 1 1 1 1 1
 12:   1 1 1 1 0 1 0 0 1 1 1 1 1 1 1
 13:   1 1 1 1 0 1 0 1 1 1 1 1 1 1 1
 14:   1 1 1 1 0 1 1 0 1 1 1 1 1 1 1 1
 15:   1 1 1 1 0 1 1 1 1 1 1 1 1 1 1 1
```

Example codebook: p=1

This is a subset of the codebook. The range of x does not need to be limited.

FIG. 23

```
x     codeword
-16:  1 1 1 1 1 1 0 1 1 0 1 0 1 0
-15:  1 1 1 1 1 1 0 1 1 0 1 0 0 1
-14:  1 1 1 1 1 1 0 1 1 0 1 1 0
-13:  1 1 1 1 1 1 0 1 1 0 0 1
-12:  1 1 1 1 1 1 0 1 1 1 0 1 0
-11:  1 1 1 1 1 1 0 1 1 1 0 0 1
-10:  1 1 1 1 1 1 0 0 1 1 1 0 1 0
 -9:  1 1 1 1 1 1 0 0 1 1 1 0 0 1
 -8:  1 1 1 1 1 1 0 0 1 1 1 1 0
 -7:  1 1 1 1 1 0 0 1 1 0 1
 -6:  1 1 1 1 1 0 0 1 1 1 0
 -5:  1 1 1 1 1 0 1 0 1 1
 -4:  1 1 1 1 0 1 1 0 1
 -3:  1 1 1 0 0 1 1
 -2:  1 1 0 0 1 0
 -1:  1 0 0 1
  0:  0 1 1
  1:  1 1 0 0 0
  2:  1 1 0 0 1 0 0
  3:  1 1 1 0 0 1 1 0
  4:  1 1 1 1 0 0 0 1 0 1
  5:  1 1 1 1 0 1 0 0 0 1 1
  6:  1 1 1 1 1 0 0 0 0 1 0 1
  7:  1 1 1 1 1 0 0 0 0 1 1 0 0
  8:  1 1 1 1 1 1 0 0 0 0 1 1 0 1 0
  9:  1 1 1 1 1 1 0 0 0 0 1 1 1 0 1
 10:  1 1 1 1 1 1 1 0 0 0 0 1 1 0 0
 11:  1 1 1 1 1 1 1 0 1 0 0 0 1 0 0
 12:  1 1 1 1 1 1 1 1 0 0 0 0 1 0 1
 13:  1 1 1 1 1 1 1 1 0 1 0 0 0 1 1
 14:  1 1 1 1 1 1 1 1 1 0 0 0 0 1 0 1
 15:  1 1 1 1 1 1 1 1 1 0 1 0 0 0 0 1
```

This is a subset of the codebook. The range of x does not need to be limited.

Example codebook: p=2

```
 x      codeword
-16:    1 1 0 1 1 0 1 0 1
-15:    1 1 0 1 1 0 0 1 1 0
-14:    1 1 0 1 1 0 0 1 1 1
-13:    1 1 0 1 1 1 1 0 0 0
-12:    1 1 0 1 1 1 1 1 0 1 0
-11:    1 1 0 0 0 0 0 1 0 1 0
-10:    1 1 0 0 0 0 0 1 0 1 0
 -9:    1 1 0 0 0 0 0 1 1 1 0
 -8:    1 1 0 0 0 1 1 0 1 0
 -7:    1 1 0 0 0 1 1 1 1 0
 -6:    1 1 0 0 0 1 1 1 1 1 0
 -5:    1 1 0 0 1 1 1 0 1 0
 -4:    1 1 0 0 1 1 1 0 1 0
 -3:    1 1 0 0 1 1 1 0 1 0
 -2:    1 1 0 0 1 1 1 1 1 0
 -1:    1 1 0 0 1 1 1 1 1 0
  0:    0
  1:    1 0 0 0 0 0 0 0
  2:    1 0 0 0 0 0 0 1
  3:    1 0 0 0 0 0 1 0
  4:    1 0 0 0 0 0 1 1
  5:    1 0 0 0 1 0 0 0
  6:    1 0 0 0 1 0 0 1
  7:    1 0 1 0 0 0 1 0 1 0
  8:    1 1 0 0 0 0 1 0 1 0
  9:    1 1 1 0 0 0 0 1 1 0
 10:    1 1 1 0 0 0 0 1 1 0
 11:    1 1 1 0 0 1 0 1 0
 12:    1 1 1 0 0 1 0 1 1
 13:    1 1 1 0 0 1 1 0 1 0
 14:    1 1 1 0 0 1 1 1 1 0
 15:    1 1 1 0 0 1 1 1 1 0
```

This is a subset of the codebook. The range of x does not need to be limited.

Example codebook: p=3

| | Feedback Method | | | | |
|---|---|---|---|---|---|
| Average differential feedback overhead (bits) with Huffman Coding MU-MIMO, 8×2 configuration, SNR=35 dB | Angles (Phi, Psi)<br><br>13 Phi, 13 Psi<br>Configuration run (7 bit, 5 bit)<br><br>Quant Delta = pi/256 | | | Cartesian<br><br>16 I, 16 Q<br>Config run (3 bit, 3 bit)<br><br>Quant Delta = pi/128 | |
| Scenario | Using Huffman | | Using Proposed Encoder | | Using Huffman |
| −40 dBc | (2.78, 1.33) | 0.26 | (3, 1.45) | 0.28 | 1.53 | 0.23 |
| −25 dBc | (4.84, 2.76) | 0.47 | (5.18, 2.95) | 0.50 | 2.62 | 0.4 |

Overhead / ratio relative to (9,7)

FIG. 27  baseline SU feedback exchange

FIG. 29  SU feedback exchange with protection

MU feedback exchange with protection simple MU DFB exchange sequence

FIG. 33  failed DFB exchange sequence with retry option

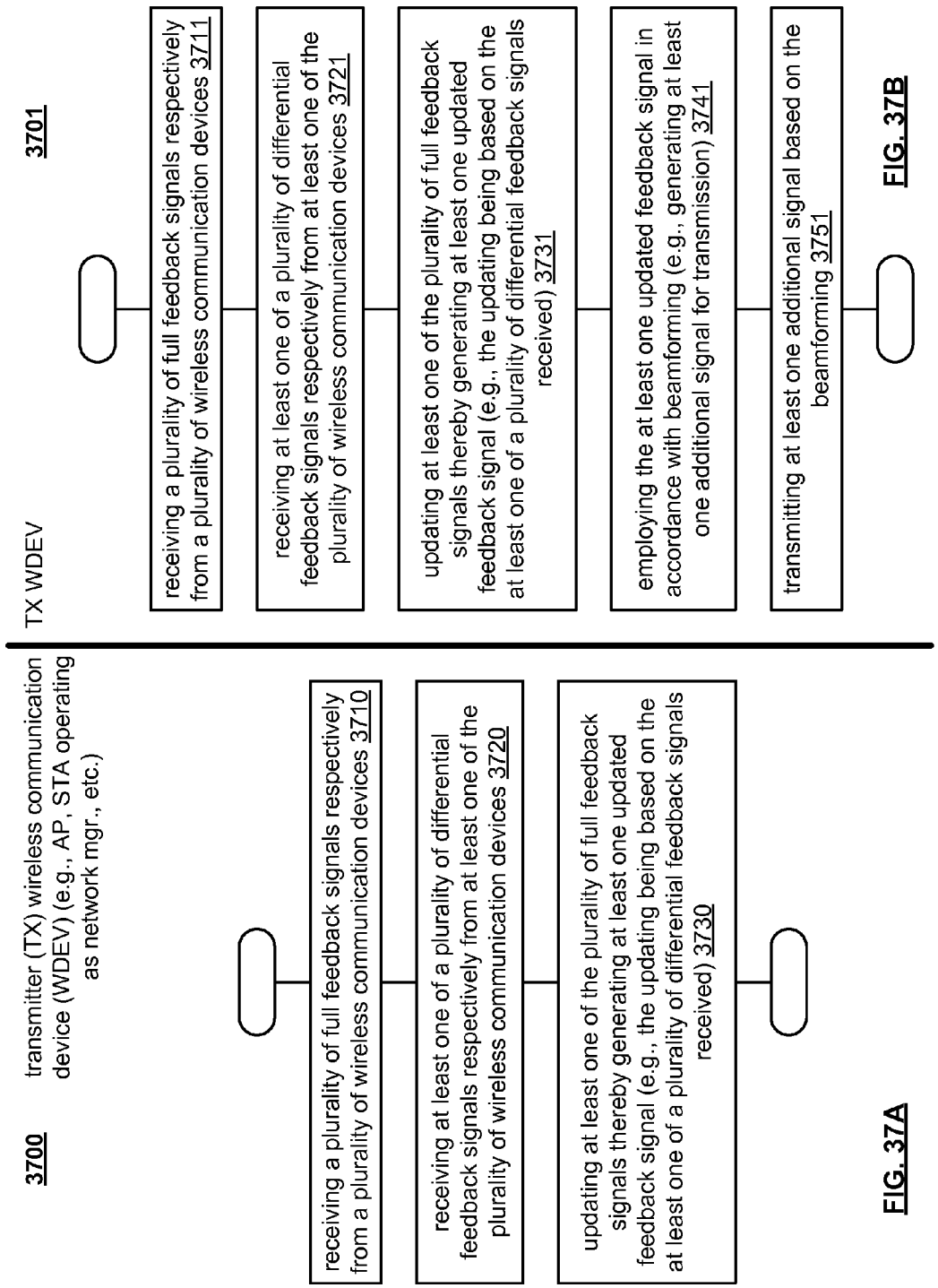

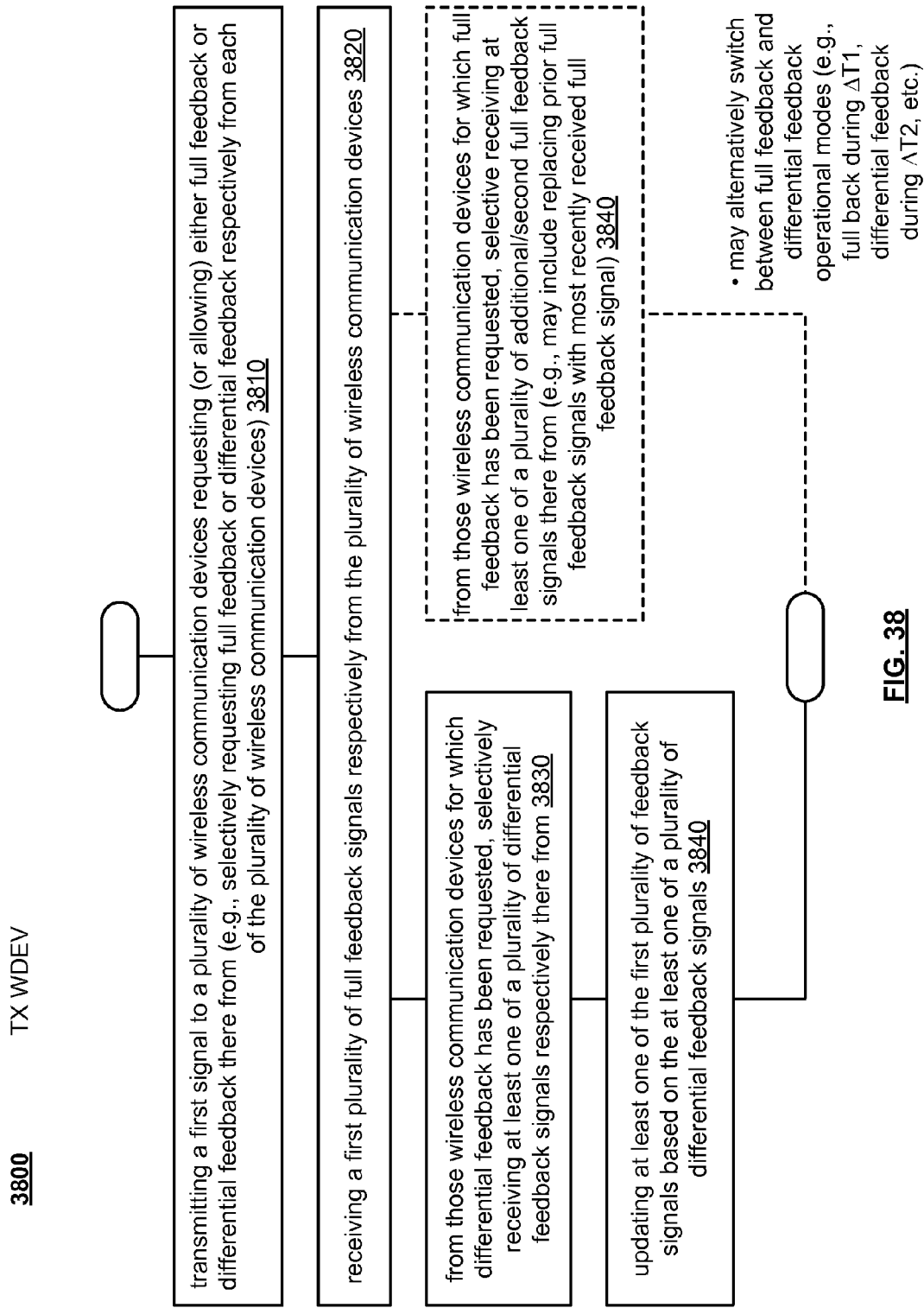

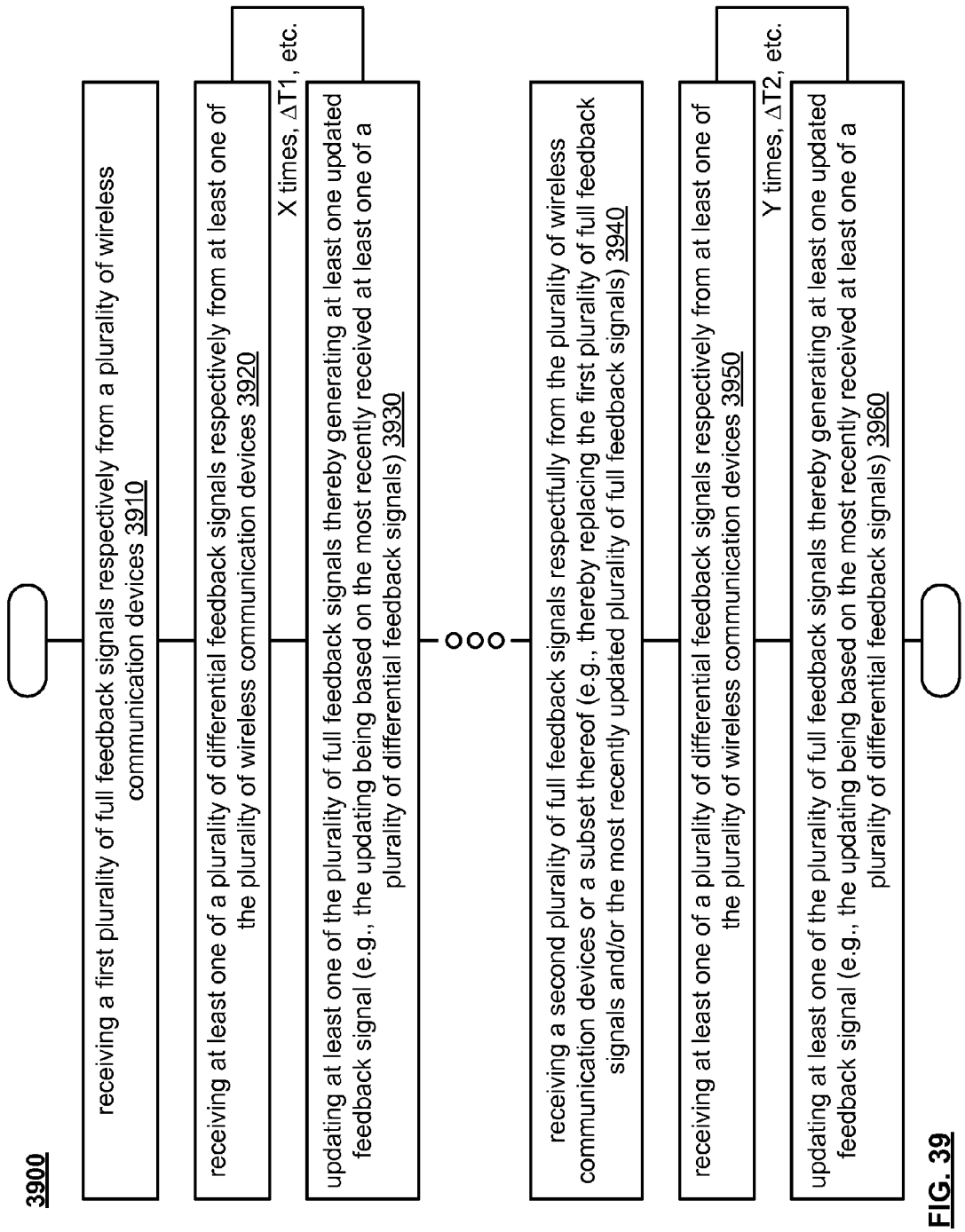

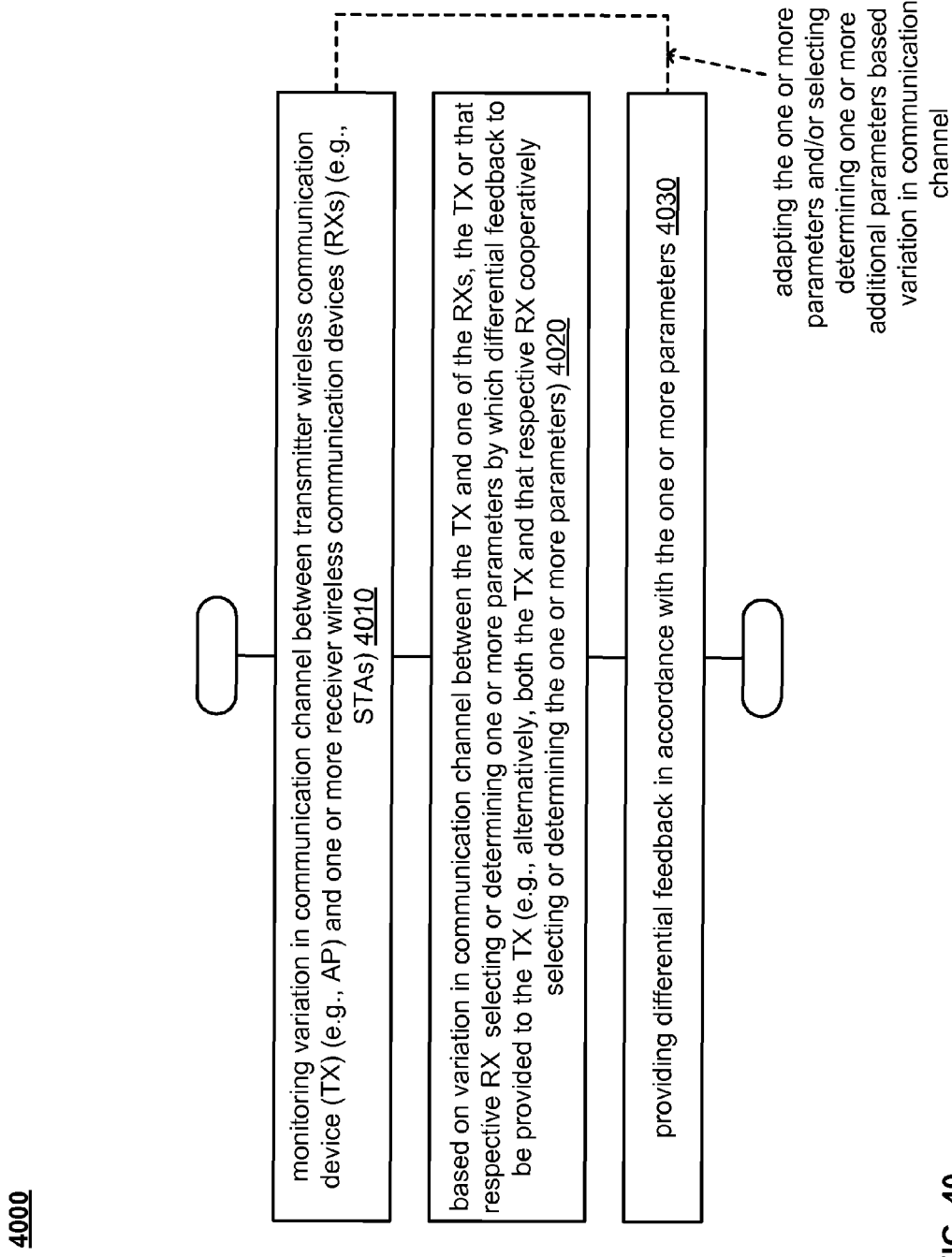

US 9,831,929 B2

DIFFERENTIAL FEEDBACK WITHIN SINGLE USER, MULTIPLE USER, MULTIPLE ACCESS, AND/OR MIMO WIRELESS COMMUNICATIONS

CROSS REFERENCE TO RELATED PATENTS/PATENT APPLICATIONS

The present U.S. Utility patent application claims priority pursuant to 35 U.S.C. §120 as a continuation of U.S. Utility application Ser. No. 13/239,582, entitled "Differential feedback within single user, multiple user, multiple access, and/or MIMO wireless communications," filed Sep. 22, 2011, pending, and scheduled subsequently to be issued as U.S. Pat. No. 9,118,364 on Aug. 25, 2015 (as indicated in an ISSUE NOTIFICATION mailed from the USPTO on Aug. 5, 2015), which claims priority pursuant to 35 U.S.C. §119(e) to U.S. Provisional Application No. 61/390,599, entitled "Differential feedback within multiple user, multiple access, and/or MIMO wireless communications," filed Oct. 6, 2010; U.S. Provisional Application No. 61/409,727, entitled "Differential feedback within multiple user, multiple access, and/or MIMO wireless communications," filed Nov. 3, 2010; U.S. Provisional Application No. 61/414,557, entitled "Differential feedback within multiple user, multiple access, and/or MIMO wireless communications," filed Nov. 17, 2010, all of which are hereby incorporated herein by reference in their entirety and made part of the present U.S. Utility patent application for all purposes.

INCORPORATION BY REFERENCE

The following IEEE standards are hereby incorporated herein by reference in their entirety and are made part of the present U.S. Utility patent application for all purposes:

1. IEEE Std 802.11™—2007, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, IEEE Std 802.11™—2007, (Revision of IEEE Std 802.11-1999), 1233 pages.

2. IEEE Std 802.11n™—2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n™—2009, (Amendment to IEEE Std 802.11™—2007 as amended by IEEE Std 802.11k™—2008, IEEE Std 802.11r™—2008, IEEE Std 802.11y™—2008, and IEEE Std 802.11r™—2009), 536 pages.

3. IEEE P802.11ac™/D1.1, August 2011, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 5: Enhancements for Very High Throughput for Operation in Bands below 6 GHz," Prepared by the 802.11 Working Group of the 802 Committee, 297 total pages (pp. i-xxiii, 1-274).

BACKGROUND OF THE INVENTION

1. Technical Field of the Invention

The invention relates generally to communication systems; and, more particularly, it relates to feedback as may be performed within such communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs.

Therefore, a need exists for a WLAN device that is capable of high data throughput and is backward compatible with legacy devices.

BRIEF DESCRIPTION OF THE SEVERAL VIEWS OF THE DRAWINGS

FIGS. 7-9 are diagrams illustrating various embodiments for encoding the scrambled data.

FIG. 16 is a diagram illustrating an embodiment of respective codewords that may be generated in accordance with a first embodiment of Huffman coding (e.g., with p=0).

FIG. 17 is a diagram illustrating an embodiment of respective codewords that may be generated in accordance with the first embodiment of Huffman coding (e.g., with p=1).

FIG. 18 is a diagram illustrating an embodiment of respective codewords that may be generated in accordance with a first embodiment of Huffman coding t (e.g., with p=2).

FIG. 19 is a diagram illustrating an embodiment of respective codewords that may be generated in accordance with a first embodiment of Huffman coding (e.g., with p=3).

FIG. 21 is a diagram illustrating an embodiment of respective codewords that may be generated in accordance with a second embodiment of Huffman coding (e.g., with p=0).

FIG. 22 is a diagram illustrating an embodiment of respective codewords that may be generated in accordance with the second embodiment of Huffman coding (e.g., with p=1).

FIG. 23 is a diagram illustrating an embodiment of respective codewords that may be generated in accordance with a second embodiment of Huffman coding t (e.g., with p=2).

FIG. 24 is a diagram illustrating an embodiment of respective codewords that may be generated in accordance with a second embodiment of Huffman coding (e.g., with p=3).

FIG. 25 is a diagram illustrating an embodiment of simulation results corresponding to a multi-user multiple input multiple output (MU-MIMO) communication system with 8 antennae at the transmitting wireless communication device and 2 antennae respectively at each of the receiving wireless communication devices.

FIG. 37A, FIG. 37B, FIG. 38, FIG. 39, and FIG. 40 are diagrams illustrating various embodiments of methods for operating one or more wireless communication devices.

DETAILED DESCRIPTION OF THE INVENTION

Figure 1:
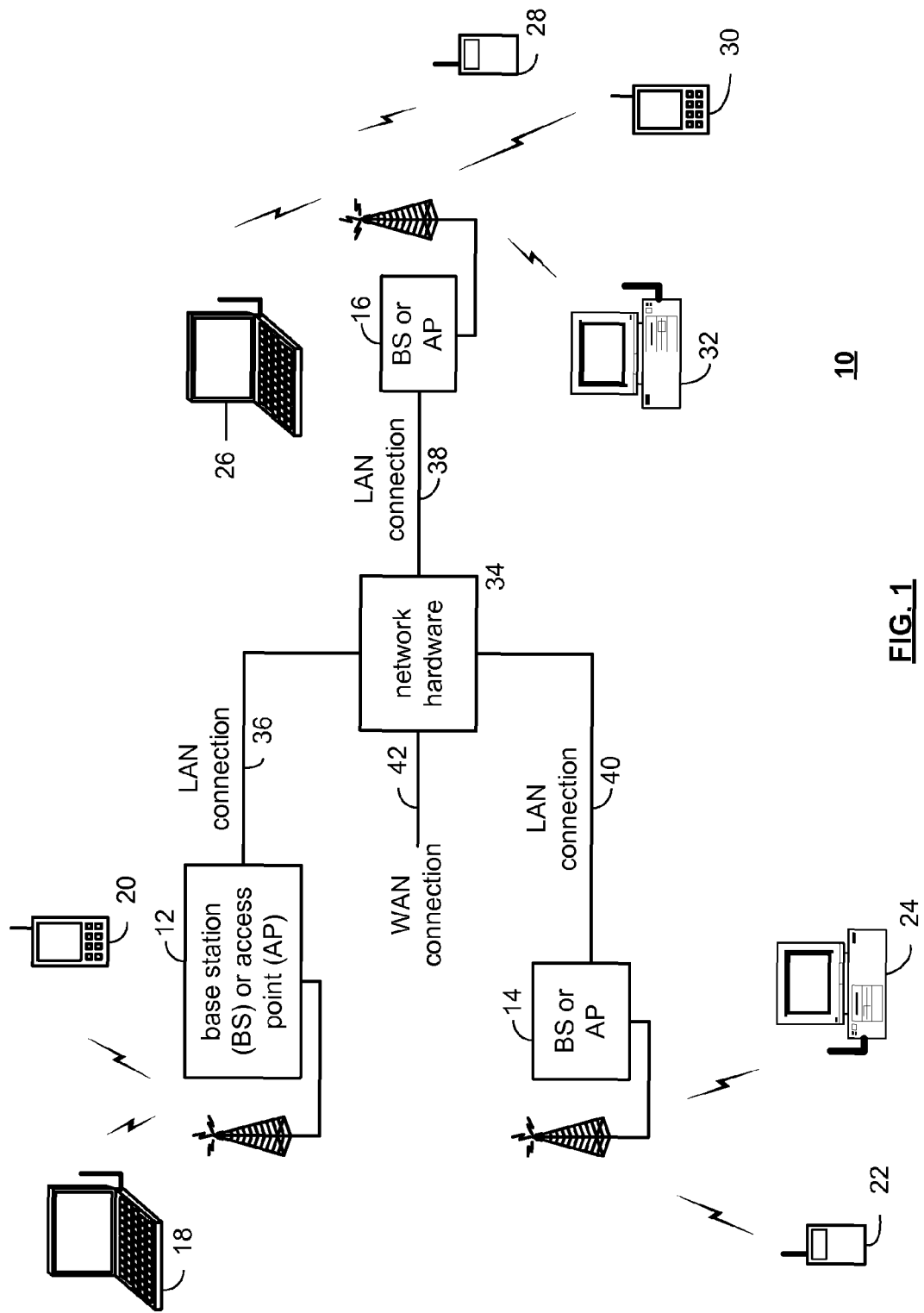
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices are described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, etc. provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication device may operate in accordance with the various aspects of the invention as presented herein to enhance performance, reduce costs, reduce size, and/or enhance broadband applications.

Figure 2:
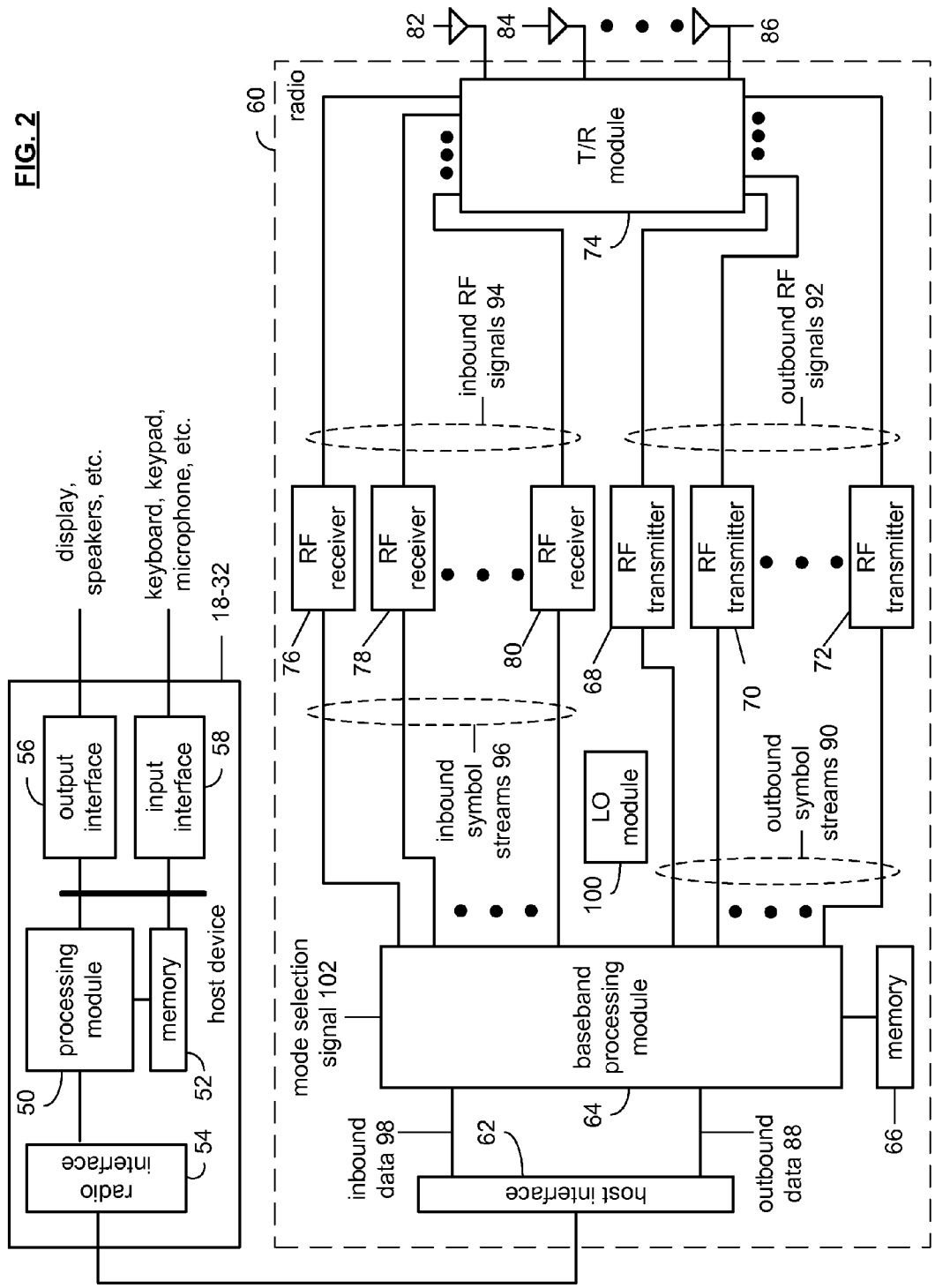
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing module 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 64 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module, which will be described in greater detail with reference to FIGS. 10A and 10B, includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
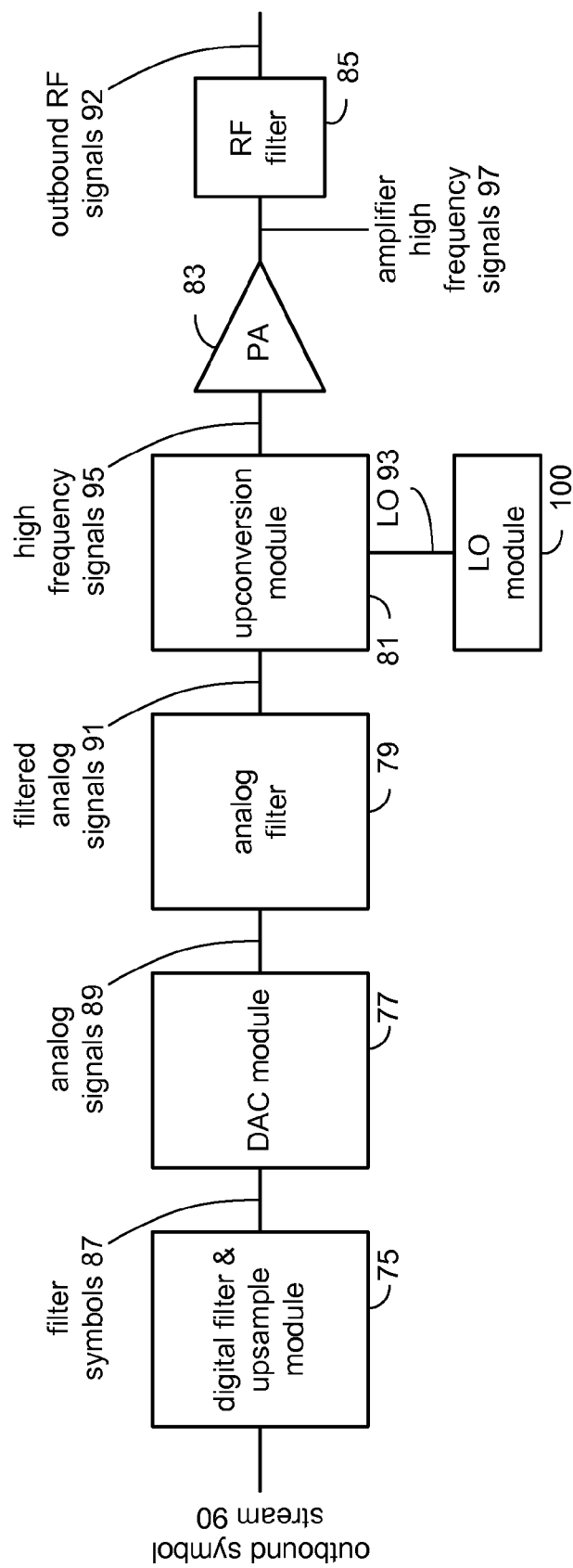
FIG. 3 is a diagram illustrating an embodiment of a radio frequency (RF) transmitter.

FIG. 3 is a diagram illustrating an embodiment of a radio frequency (RF) transmitter 68-72, or RF front-end, of the WLAN transmitter. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
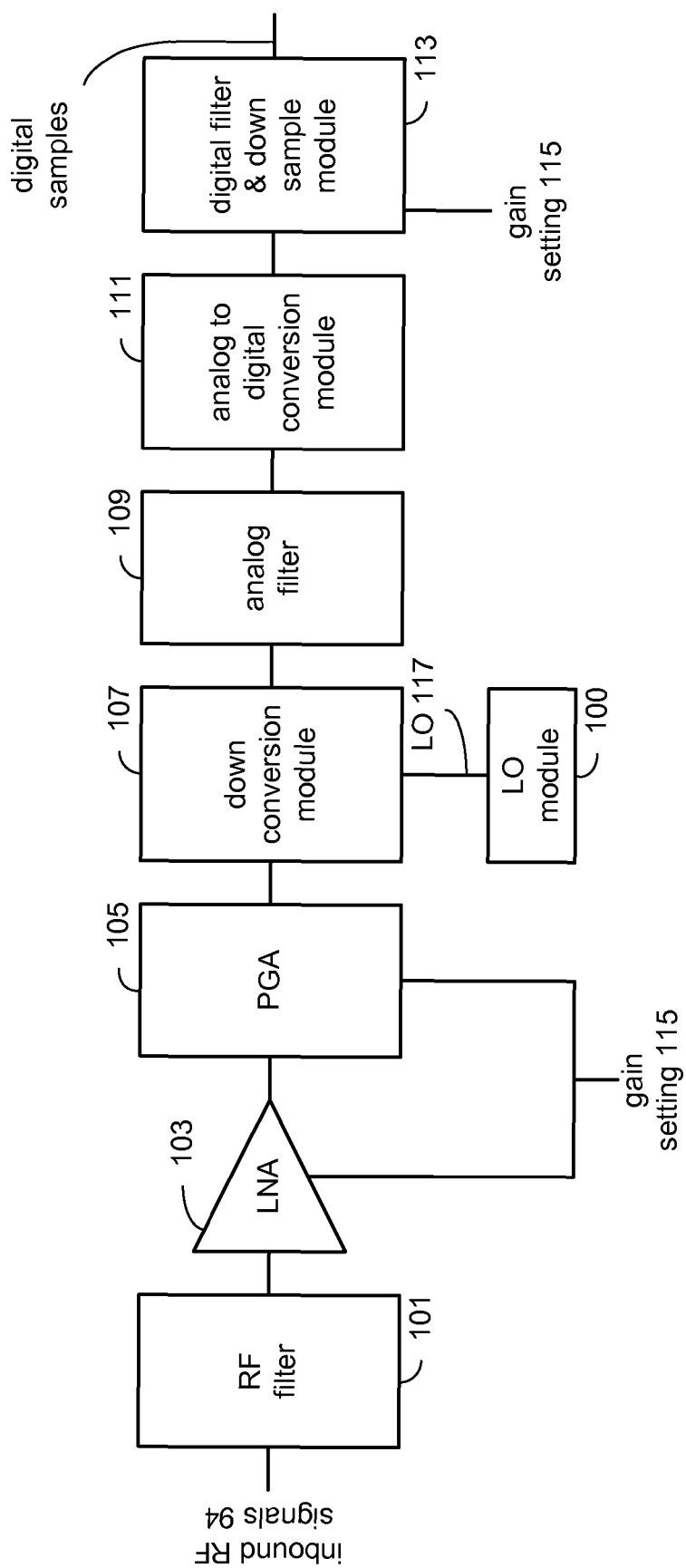
FIG. 4 is a diagram illustrating an embodiment of an RF receiver.

FIG. 4 is a diagram illustrating an embodiment of an RF receiver. This may depict any one of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency band-pass filter, receives the inbound RF signals 94 and filters them to produce filtered inbound RF signals. The low noise amplifier 103 amplifies the filtered inbound RF signals 94 based on a gain setting and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the digital samples (corresponding to the inbound symbol streams 96).

Figure 5:
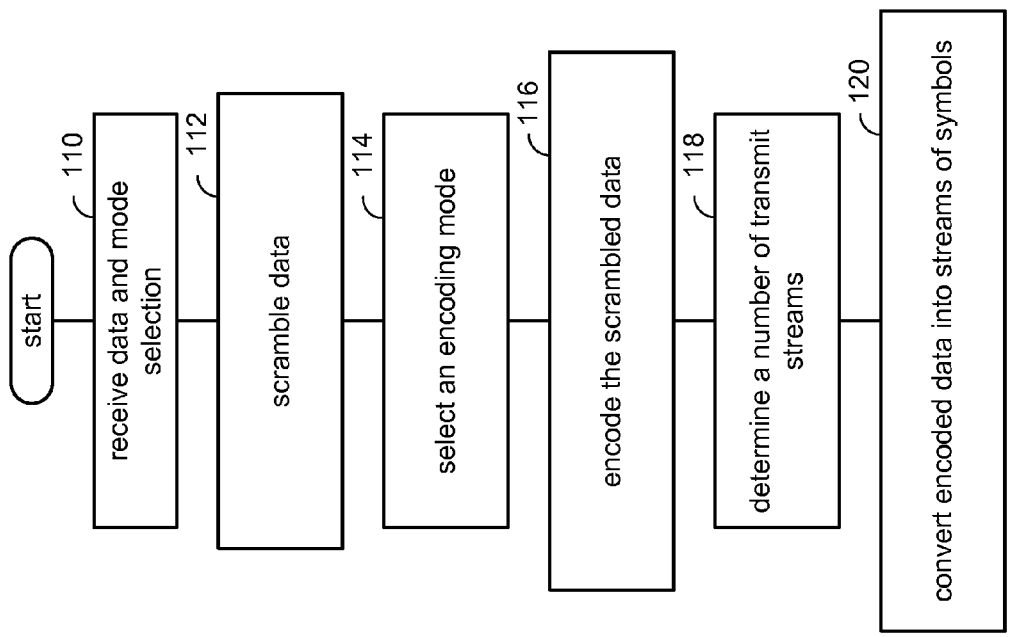
FIG. 5 is a diagram illustrating an embodiment of a method for baseband processing of data.

FIG. 5 is a diagram illustrating an embodiment of a method for baseband processing of data. This diagram shows a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing any one or more a variety of coding schemes (e.g., convolutional coding, Reed-Solomon (RS) coding, turbo coding, turbo trellis coded modulation (TTCM) coding, LDPC (Low Density Parity Check) coding, etc.).

The process then proceeds to Step 118 where the baseband processing module determines a number of transmit streams based on the mode select signal. For example, the mode select signal will select a particular mode which indicates that 1, 2, 3, 4 or more antennae may be utilized for the transmission. Accordingly, the number of transmit streams will correspond to the number of antennae indicated by the mode select signal. The process then proceeds to Step 120 where the baseband processing module converts the encoded data into streams of symbols in accordance with the number of transmit streams in the mode select signal. This step will be described in greater detail with reference to FIG. 6.

Figure 6:
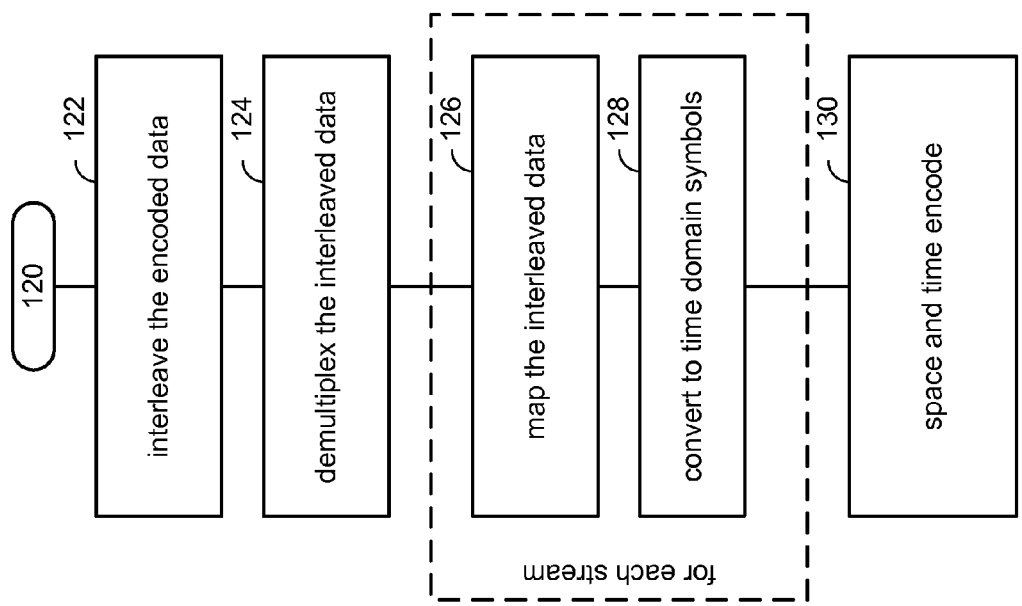
FIG. 6 is a diagram illustrating an embodiment of a method that further defines Step 120 of FIG. 5.

FIG. 6 is a diagram illustrating an embodiment of a method that further defines Step 120 of FIG. 5. This diagram shows a method performed by the baseband processing module to convert the encoded data into streams of symbols in accordance with the number of transmit streams and the mode select signal. Such processing begins at Step 122 where the baseband processing module interleaves the encoded data over multiple symbols and subcarriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n), the interleaving will also be done over multiple transmit paths or streams.

The process then proceeds to Step 124 where the baseband processing module demultiplexes the interleaved data into a number of parallel streams of interleaved data. The number of parallel streams corresponds to the number of transmit streams, which in turn corresponds to the number of antennae indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of inter-symbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=2M. In one embodiment the encoding matrix may comprise a form of:

$$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}$$

The number of rows of the encoding matrix corresponds to M and the number of columns of the encoding matrix corresponds to P. The particular symbol values of the constants within the encoding matrix may be real or imaginary numbers.

FIGS. 7-9 are diagrams illustrating various embodiments for encoding the scrambled data.

FIG. 7 is a diagram of one method that may be utilized by the baseband processing module to encode the scrambled data at Step 116 of FIG. 5. In this method, the encoding of FIG. 7 may include an optional Step 144 where the baseband processing module may optionally perform encoding with an outer Reed-Solomon (RS) code to produce RS encoded data. It is noted that Step 144 may be conducted in parallel with Step 140 described below.

Also, the process continues at Step 140 where the baseband processing module performs a convolutional encoding with a 64 state code and generator polynomials of $G_0=133_8$ and $G_1=171_8$ on the scrambled data (that may or may not have undergone RS encoding) to produce convolutional encoded data. The process then proceeds to Step 142 where the baseband processing module punctures the convolutional encoded data at one of a plurality of rates in accordance with the mode selection signal to produce the encoded data. Note that the puncture rates may include ½, ⅔ and/or ¾, or any rate as specified in tables 1-12. Note that, for a particular mode, the rate may be selected for backward compatibility with IEEE 802.11(a), IEEE 802.11(g), or IEEE 802.11(n) rate requirements.

FIG. 8 is a diagram of another encoding method that may be utilized by the baseband processing module to encode the scrambled data at Step 116 of FIG. 5. In this embodiment, the encoding of FIG. 8 may include an optional Step 148 where the baseband processing module may optionally perform encoding with an outer RS code to produce RS encoded data. It is noted that Step 148 may be conducted in parallel with Step 146 described below.

The method then continues at Step 146 where the baseband processing module encodes the scrambled data (that may or may not have undergone RS encoding) in accordance with a complimentary code keying (CCK) code to produce the encoded data. This may be done in accordance with IEEE 802.11(b) specifications, IEEE 802.11(g), and/or IEEE 802.11(n) specifications.

FIG. 9 is a diagram of yet another method for encoding the scrambled data at Step 116, which may be performed by the baseband processing module. In this embodiment, the encoding of FIG. 9 may include an optional Step 154 where the baseband processing module may optionally perform encoding with an outer RS code to produce RS encoded data.

Then, in some embodiments, the process continues at Step 150 where the baseband processing module performs LDPC (Low Density Parity Check) coding on the scrambled data (that may or may not have undergone RS encoding) to produce LDPC coded bits. Alternatively, the Step 150 may operate by performing convolutional encoding with a 256 state code and generator polynomials of $G_0=561_8$ and $G_1=753_8$ on the scrambled data the scrambled data (that may or may not have undergone RS encoding) to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
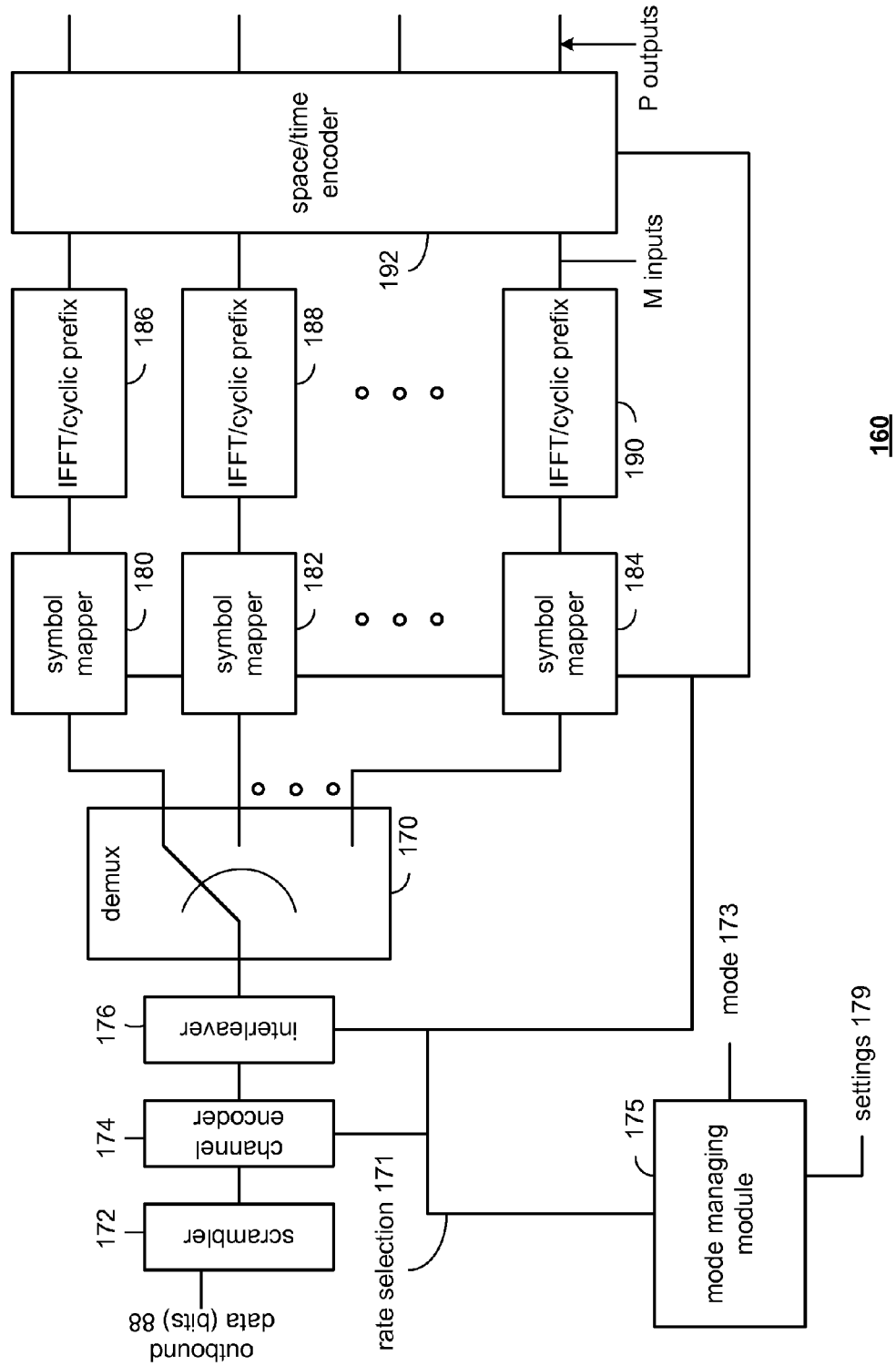
FIGS. 10A and 10B are diagrams illustrating embodiments of a radio transmitter.
Figure 10B:
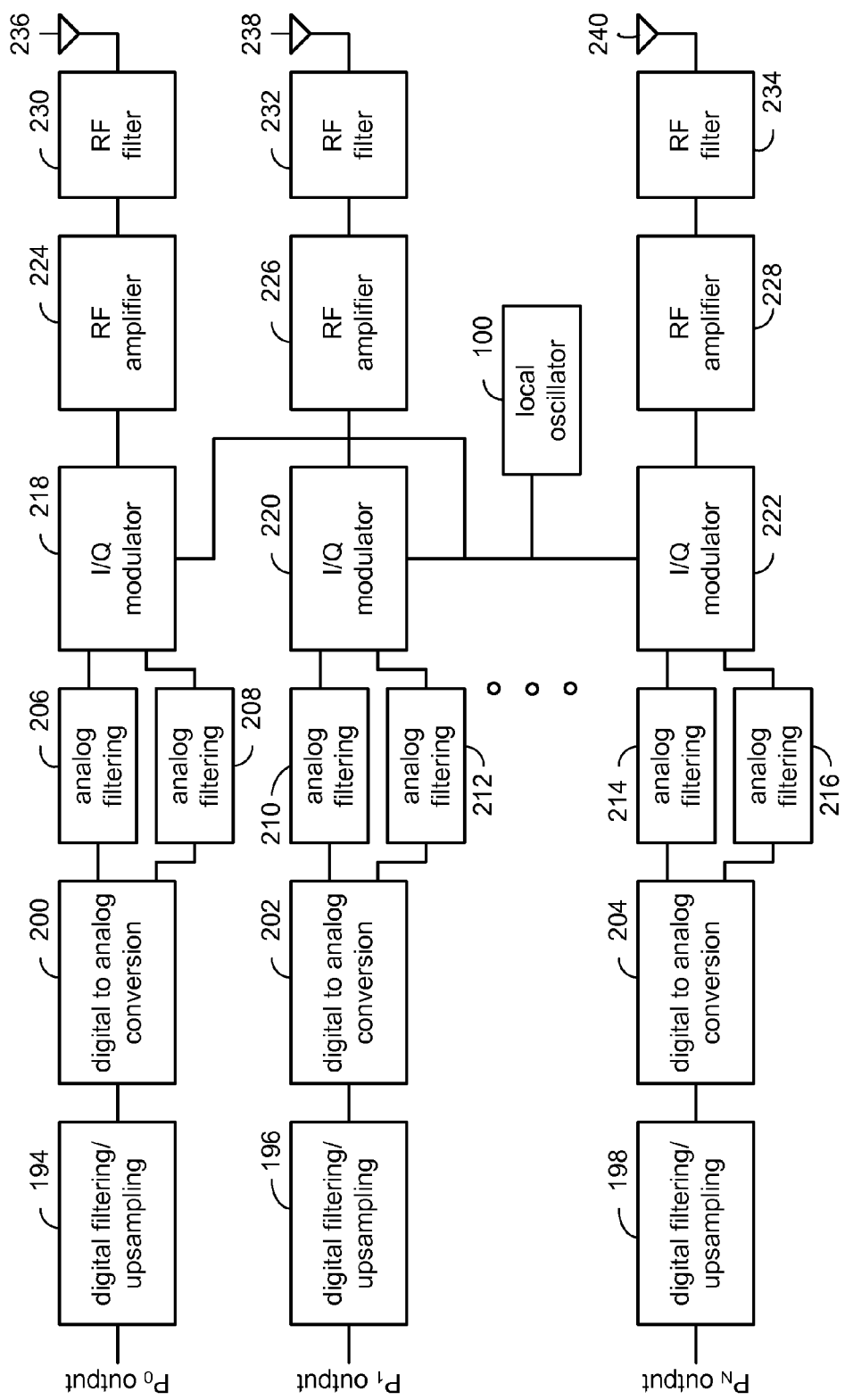

FIGS. 10A and 10B are diagrams illustrating embodiments of a radio transmitter. This may involve the PMD module of a WLAN transmitter. In FIG. 10A, the baseband processing is shown to include a scrambler 172, channel encoder 174, interleaver 176, demultiplexer 170, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal 173 and produces settings 179 for the radio transmitter portion and produces the rate selection 171 for the baseband portion. In this embodiment, the scrambler 172, the channel encoder 174, and the interleave 176 comprise an error protection module. The symbol mappers 180-184, the plurality of IFFT/cyclic prefix modules 186-190, the space time encoder 192 comprise a portion of the digital baseband processing module.

In operations, the scrambler 172 adds (e.g., in a Galois Finite Field (GF2)) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate ½ convolutional encoder with 64 states and a generator polynomials of $G_0=133_8$ and $G_1=171_8$. The output of the convolutional encoder may be punctured to rates of ½, ⅔, and ¾ according to the specified rate tables (e.g., tables 1-12). For backward compatibility with IEEE 802.11(b) and the CCK modes of IEEE 802.11 (g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, any one or more of the various types of error correction codes (ECCs) mentioned above (e.g., RS, LDPC, turbo, TTCM, etc.) a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to subsequent Figures.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 170 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, et cetera) according to the rate tables (e.g., tables 1-12). For IEEE 802.11(a) backward compatibility, double Gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal 2M paths. For each of the paths, the space/time encoder multiples the input symbols with an encoding matrix that has the form of $$\begin{bmatrix} c_1 & c_2 & c_3 & c_4 & \dots & c_{2M-1} & c_{2M} \\ -c_2^* & c_1^* & -c_4^* & c_3^* & \dots & -c_{2M}^* & c_{2M-1}^* \end{bmatrix}.$$

The rows of the encoding matrix correspond to the number of input paths and the columns correspond to the number of output paths.

FIG. 10B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennae 236-240. The P-outputs from the space/time encoder 192 are received by respective digital filtering/up-sampling modules 194-198. In one embodiment, the digital filters/up sampling modules 194-198 are part of the digital baseband processing module and the remaining components comprise the plurality of RF front-ends. In such an embodiment, the digital baseband processing module and the RF front end comprise a direct conversion module.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 208-214 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-converts the I/Q signals into radio frequency signals.

The RF amplifiers 224-228 amplify the RF signals which are then subsequently filtered via RF filters 230-234 before being transmitted via antennae 236-240.

Figure 11A:
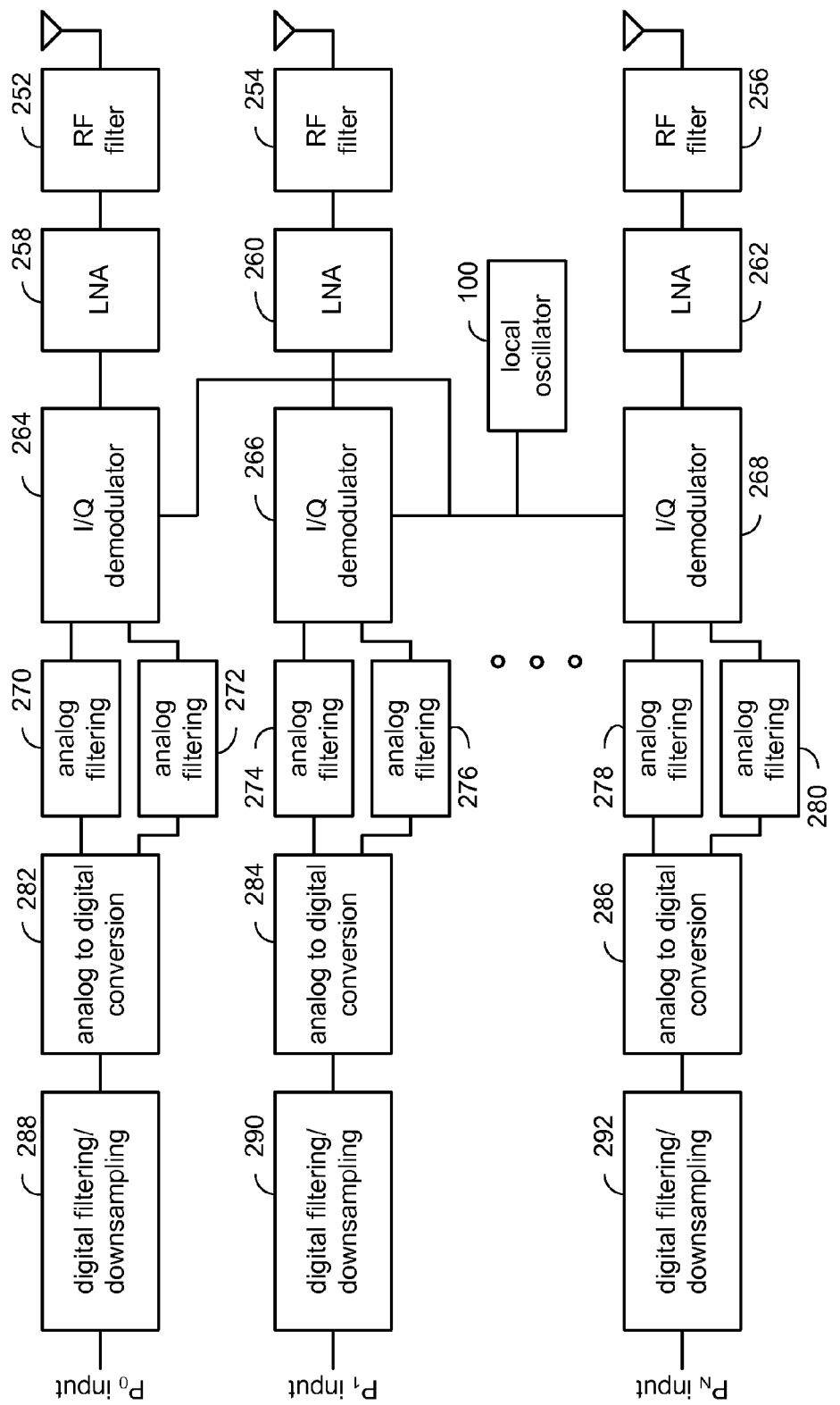
FIGS. 11A and 11B are diagrams illustrating embodiments of a radio receiver.
Figure 11B:
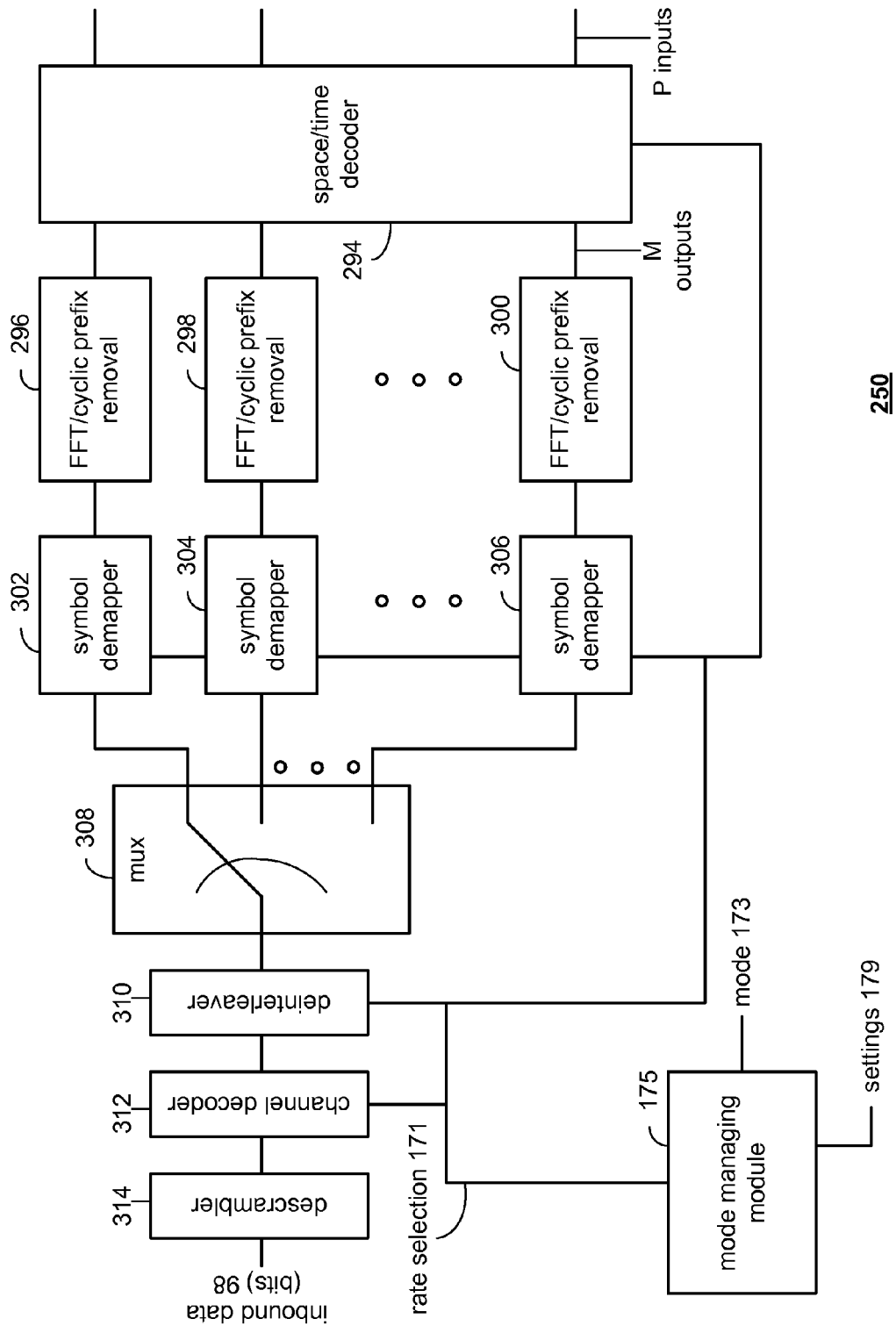

FIGS. 11A and 11B are diagrams illustrating embodiments of a radio receiver. These diagrams illustrate a schematic block diagram of another embodiment of a receiver. FIG. 11A illustrates the analog portion of the receiver which includes a plurality of receiver paths. Each receiver path includes an antenna, RF filters 252-256, low noise amplifiers 258-260, I/Q demodulators 264-268, analog filters 270-280, analog-to-digital converters 282-286 and digital filters and down-sampling modules 288-290.

In operation, the antennae receive inbound RF signals, which are band-pass filtered via the RF filters 252-256. The corresponding low noise amplifiers 258-260 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-290 filter the digital signals and adjust the sampling rate to correspond to the rate of the baseband processing, which will be described in FIG. 11B.

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175, which produces rate selections 171 and settings 179 based on mode selections 173. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

Figure 12:
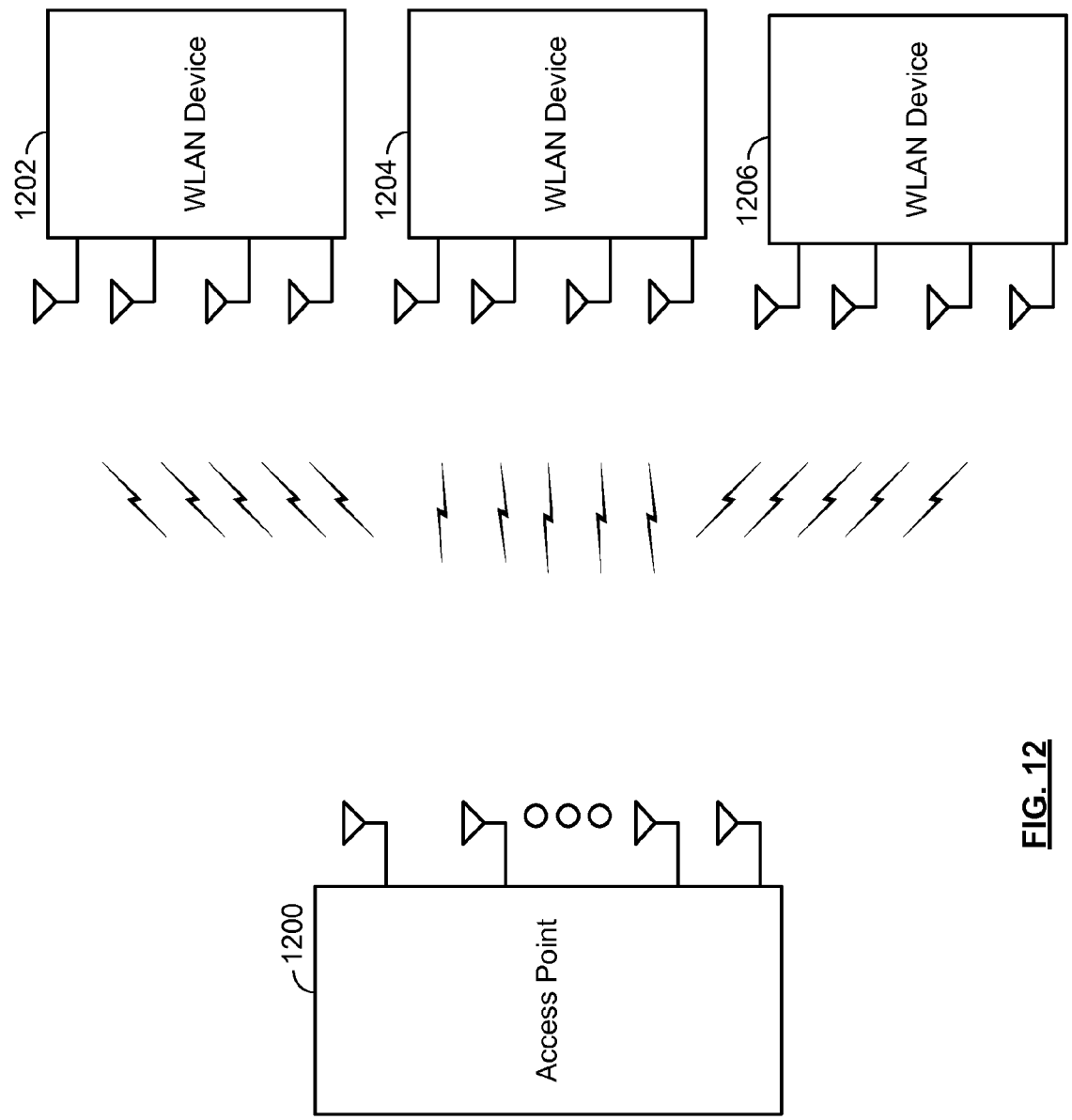
FIG. 12 is a diagram illustrating an embodiment of an access point (AP) and multiple wireless local area network (WLAN) devices operating according to one or more various aspects and/or embodiments of the invention.

FIG. 12 is a diagram illustrating an embodiment of an access point (AP) and multiple wireless local area network (WLAN) devices operating according to one or more various aspects and/or embodiments of the invention. The AP point 1200 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 1200 supports communications with the WLAN devices 1202, 1204, and 1206 with channel bandwidths, MIMO dimensions, and at data throughput rates unsupported by the prior IEEE 802.11x operating standards. For example, the access point 1200 and WLAN devices 1202, 1204, and 1206 may support channel bandwidths from those of prior version devices and from 40 MHz to 1.28 GHz and above. The access point 1200 and WLAN devices 1202, 1204, and 1206 support MIMO dimensions to 4×4 and greater. With these characteristics, the access point 1200 and WLAN devices 1202, 1204, and 1206 may support data throughput rates to 1 GHz and above.

The AP 1200 supports simultaneous communications with more than one of the WLAN devices 1202, 1204, and 1206. Simultaneous communications may be serviced via OFDM tone allocations (e.g., certain number of OFDM tones in a given cluster), MIMO dimension multiplexing, or via other techniques. With some simultaneous communications, the AP 1200 may allocate one or more of the multiple antennae thereof respectively to support communication with each WLAN device 1202, 1204, and 1206, for example.

Further, the AP 1200 and WLAN devices 1202, 1204, and 1206 are backwards compatible with the IEEE 802.11 (a), (b), (g), and (n) operating standards. In supporting such backwards compatibility, these devices support signal formats and structures that are consistent with these prior operating standards.

Figure 13:
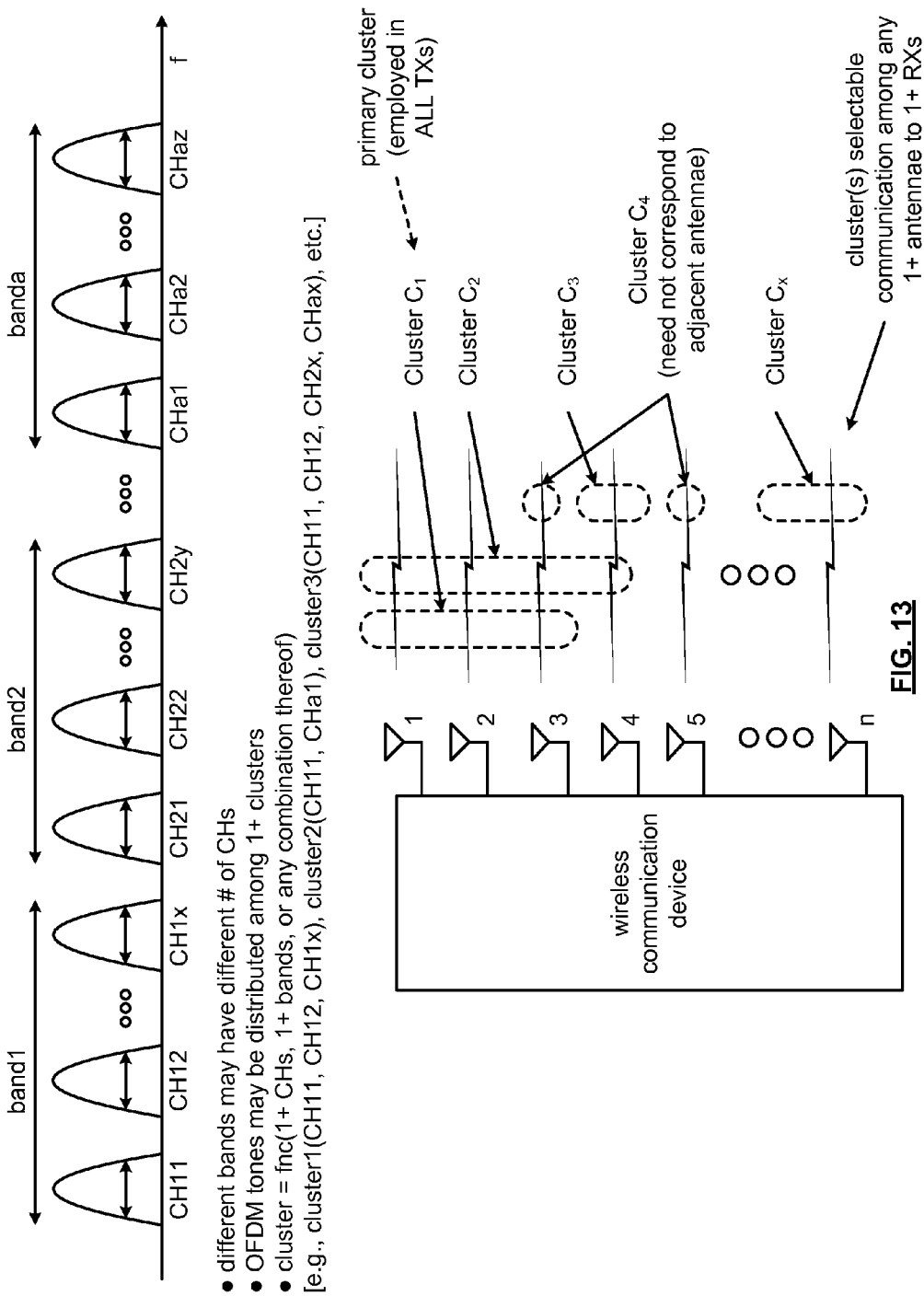
FIG. 13 is a diagram illustrating an embodiment of a wireless communication device, and clusters, as may be employed for supporting communications with at least one additional wireless communication device.

FIG. 13 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination one or more channels among one or more bands. As may be seen in the diagram, any respective cluster may be associated with any one or more antennae (including as few as one antenna as well as up to all of the antennae) of the wireless communication device.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae.

Figure 14:
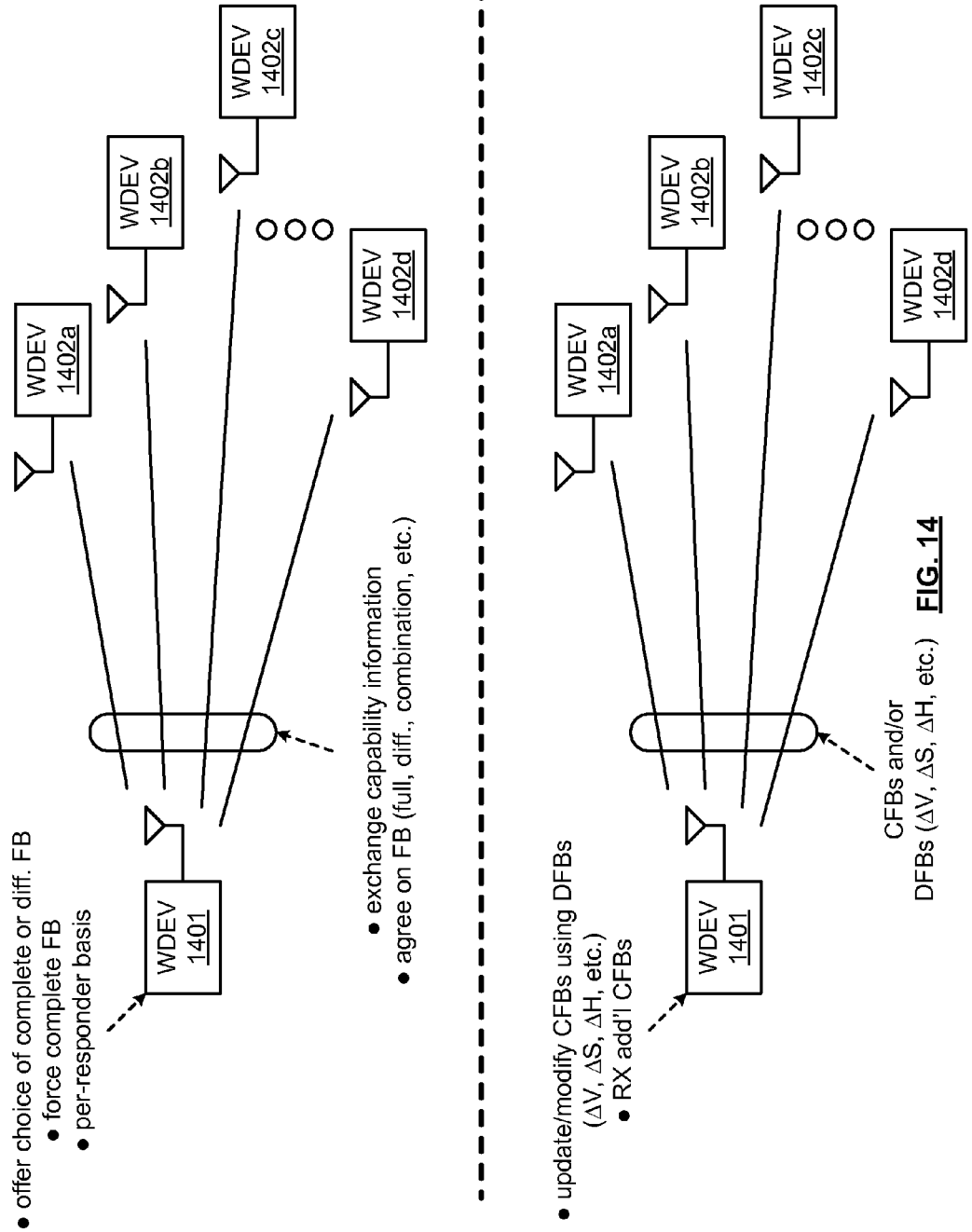
FIG. 14 is a diagram illustrating an embodiment of a wireless communication system in which differential feedback may be performed.

FIG. 14 is a diagram illustrating an embodiment of a wireless communication system in which differential feedback may be performed. A wireless communication system may be viewed as including a number of wireless communication devices 1401 (generally depicted as being a transmitting wireless communication device) and wireless communication devices 1402a, 1402b, 1402c, and generally up to 1402d (generally depicted as being receiving wireless communication devices). Communications directed from the wireless communication devices 1402a-1402d to the wireless communication device 1401 are generally referred to as uplink (UL) communications. Communications directed from the wireless communication device 1401 to the wireless communication devices 1402a-1402d are generally referred to as downlink (DL) communications.

In some embodiments, the transmitting wireless communication device 1401 is an AP, and the receiving wireless communication devices 1402a-1402d are STAs; in other embodiments, all of the wireless communication devices in the diagram are STAs.

When operating in accordance with providing feedback signals (e.g., full or complete feedback (CFB) signals and differential feedback (DFB) signals, or a combination thereof), the various wireless communication devices 1402a-1402d are operative to transmit in the UL direction in a manner such that the feedback signals corresponding to and being from different of the wireless communication devices 1402a-1402d are provided to the transmitting wireless communication device 1401 so that the transmitting wireless communication device 1401 may perform processing of CFB signals and DFB signals including updating and modifying CFB signals using DFB signals. Generally, CFB is received by a transmitting wireless communication device (e.g., AP) from the various receiving wireless communication devices (e.g., STAs). Then, when DFB is received from one or more of the of the receiving wireless communication devices (e.g., STAs), the transmitting wireless communication device (e.g., AP), such as using a baseband processing module therein, is operative to update the CFB using the DFB thereby generating updated CFB. The difference between a previous state of the communication channel (as associated with the previously received CFB) and a current state of the channel (being different by some amount from the previous state of the communication channel) may be determined using the next received DFB.

As may be seen, in accordance with the various aspects and principles presented herein, differential feedback may be added to the IEEE 802.11ac (e.g., ACcord) developing standards and recommended practices to enable reduced feedback overhead. Differential feedback takes advantage of time and/or frequency correlation in the communication channel and enables reduced feedback overhead by feeding back a delta (Δ) relative to the previous channel. It is seen in simulations that the overhead savings can be as high as ⅛ (e.g., a reduction of ⅞ in using DFB when compared to providing CFB).

Motivation for Differential Feedback (DFB)

Among the many considerations as to why DFB may be employed and may be preferable to using CFB, it is noted that the CFB frames can be quite large and consume much of the available bandwidth that may be used otherwise to communicate data between various wireless communication devices within a communication system. Depending on the number of antennae and resolution of information, and other parameters including physical layer (PHY) transmission rate, the feedback frames can have relatively long transmission durations. Particularly when channel sounding and associated feedback signaling is high in frequency, an even greater amount of throughput may be undesirably consumed for such feedback.

A combination of large feedback (FB) frames and frequent sounding can cause excessive overhead for sounding exchange, and may even possibly negate any gains that may be achieved from beamforming. One of the many benefits that may be achieved, the overhead associated with sounding and feedback exchanges may be reduced when using DFB. For example, the reduction in overhead achievable through the use of differential feedback such that the feedback frames containing differential information (DFB) is relative to previously sent information.

The currently proposed channel feedback approaches operating in accordance with the IEEE 802.11ac developing standards and recommended practices are based on feedback of the quantized channel singular vectors denoted by V and singular values denoted by S. The approach is based on what is known as compressed beamforming feedback as described in section 20.3.12.2.5 and in section 7.3.1.29 in the standard 802.11n-2009 (which is incorporated by reference above).

V and S are computed and fed back on all or a subset of the OFDM subcarriers.

The proposed approach feeds back delta_V=V_new−V_old and delta_S=S_new−S_old whereby V_old is defined by the feedback content in a previous time instance or a previous OFDM tone and V_new describes the new feedback content. Similar description applies to S_new and S_old. Thus, the differential feedback approach takes advantage of the reduced dynamic range in delta_V to reduce the feedback overhead. It is also possible to use the same approach with other feedback content such as the raw channel H.

The following description is centered around the differential approach for V. Similar description as in variant A is applicable for the differential approach for S Several variants of the approach are presented:

Variant A

Compute the difference deltaV=V_new−V_old.

Quantize the deltaV into Nbits using quantization granularity level delta.
    The values of the parameters (Nbits, delta) can be different for different columns of deltaV.
    Nbits is a function of the channel variation
        low channel variation require small number of bits to represent deltaV whereas larger channel variation require larger number of bits Feed back the quantized deltaV with the chosen Nbits value The parameters of the approach can be decided by the receiver, transmitter or partially spelled out in the spec. For example, the spec may specify the quantization levels but the receiver or transmitter will decide on Nbits based on the level of variation in the channel.

Example parameters are:
    Nbit=1, delta=1/64—the quantization levels are [−1/128, 1/128]

Nbit=2, delta=1/128—the quantization levels are [−3/256, −1/256, 1/256, 3/256]

Variant B

Compute the angle representation as described in the aforementioned 802.11n-2009 paragraphs of V_old and V_new Quantize the difference between the phi and psi angle values into Nbits_phi and Nbits_psi using quantization granularity levels delta_phi and delta_psi.

The values of the parameters (Nbits_phi, Nbits_psi, delta_phi, delta_psi) can be different for different columns of V.

The values Nbits_phi and Nbits_psi can be chosen to be equal or non-equal. Since PHI varies in the range [0,2pi] and PSI varies in the range [0,pi/2] different granularity levels delta_phi and delta_psi can be used Feed back the quantized difference of the angles with the chosen Nbits_phi and Nbits_psi values The parameters of the approach can be decided by the receiver (beamformee), transmitter (beamformer) or partially spelled out in the spec. For example, the spec may specify the quantization levels delta_phi, delta_psi but the receiver or transmitter will decide on Nbits_phi and Nbits_psi based on the level of variation in the channel.

Example parameters are as follows:

Nbit_phi=1, Nbit_psi=1, delta_phi=pi/64, delta_psi=pi/128—the quantization levels for phi are [−1/128, 1/128] and for psi [−1/256, 1/256]

Nbit_phi=2, Nbit_psi=1, delta_phi=pi/128, delta_psi=pi/128—the quantization levels for phi are [−3/256, −1/256, 1/256, 3/256] and for psi [−1/256, 1/256]

Figure 15:
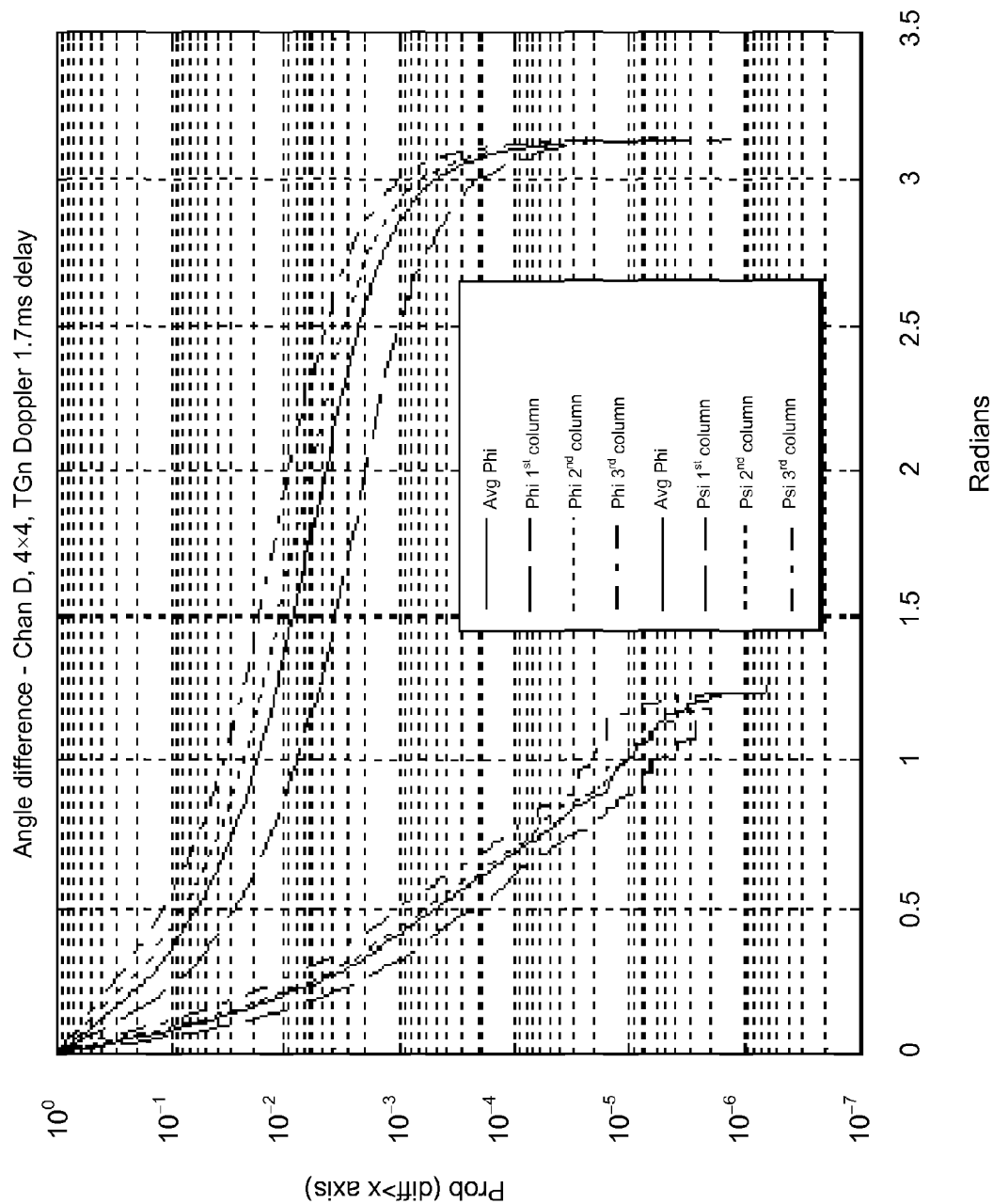
FIG. 15 is a diagram illustrating a histogram of the absolute value of the angle difference in accordance with an embodiment of providing differential feedback.

FIG. 15 is a diagram illustrating a histogram of the absolute value of the angle difference in accordance with an embodiment of providing differential feedback.

In addition to uniform quantization levels, it is possible to use non-uniform quantization levels (as opposed to uniform quantization levels) that better reflect the probability density function (or histogram) of the delta (Δ) values used in Variant A or Variant B as described above.

An example of such a histogram of the absolute value of the angle difference in Variant B (described above) is shown in the FIG. 15 whereby it is seen that while it is more likely to see small angle difference, larger angle differences can occur with small probability.

One possible embodiment of non-uniform quantization levels using 3 bits is as follows:

[−7/256, −3/256, −1/256, 1/256, 3/256, 7/256], where the outer points are spaced away to capture higher angle differences.

Given that small angle differences are more likely, it may be desirable to use Huffman coding or another variant or variation of run length coding to encode the bit sequence optimally. For example, Huffman coding utilizes the fact that some values in the quantization levels (e.g., those being lower) are more likely than others and then encodes them with fewer bits whereas the other values are encoded with more bits leading (e.g., those values in the quantization levels being less likely than others) which operates in combination to a reduction in the total average number of bits in the message.

An example Huffman encoder for an 8 symbol alphabet (i.e., 8 respective and distinct symbols shown below as x) with the following 8 respective associated probabilities:

[0.45 0.25 0.1 0.05 0.04 0.04 0.04 0.03]

Results in the mapping of those symbols to the following respective codewords may be performed as follows:

['1', '0 1', '0 0 0 0', '0 0 1 1', '0 0 1 0 0', '0 0 0 1 1', '0 0 1 0', '0 0 1 0 1'], or alternatively, shown as:

| x | codeword | probability |
|---|---|---|
| 0 | 1 | 0.45 |
| 1 | 0 1 | 0.25 |
| 2 | 0 0 0 0 | 0.1 |
| 3 | 0 0 1 1 | 0.05 |
| 4 | 0 0 1 0 0 | 0.04 |
| 5 | 0 0 0 1 1 | 0.04 |
| 6 | 0 0 0 1 0 | 0.04 |
| 7 | 0 0 1 0 1 | 0.03 |

This will provide for a reduction of 23% in overhead from 3 bits (for regular mapping) to 2.3 bits on average.

An optimal compression using Huffman coding requires reasonably accurate knowledge of the probabilities of each respective symbol. Herein, three possible options for implementing such Huffman coding in a communication system are considered:

1. Provide in the communication protocol, specification, and/or recommended practices several options for the Huffman encoder mapping so that the receiver can choose the most appropriate Huffman coding for the data seen, and the transmitter is signaled with respect to which of the possible options is chosen. However, this option can become cumbersome if the alphabet size is relatively large (e.g., complexity increases with increased alphabet size). Considering an embodiment that may include an alphabet including as many as 128 or 512 symbols, storing such large alphabets in a table (e.g., a very large look up table (LUT) can undesirably increase cost, real estate, form factor, etc. of a communication device).

2. Provide Huffman encoding approach (e.g., such as may be performed using a Huffman encoder) to produce operative for adapting to large statistics variation using one or more variables. The receiving communication device chooses which one or more input variables produce the best match to the statistics and then feeds back the chosen variable value along with the compressed data 3. Compute in 'real time' (e.g., on the fly) the exact probability of each symbol, build a Huffman encoding mapping and feed it back along with the compressed data. While this option can provide optimal performance, it may require a more complicated operation of defining a Huffman encoding approach (e.g., such as may be performed using a Huffman encoder) for each statistics encountered by the receiving communication device.

Later herein, one possible modified variant of a Huffman encoding approach (e.g., referred to as Encoding Approach I) is employed to generate and perform Huffman encoding and various simulations show that it provides very close to Huffman performance.

As described above, a Huffman encoding approach (e.g., such as may be performed using a Huffman encoder) and the approximate approach may be used separately for each column of V since the variation in V is smaller in the first column than it is in the second column, and the variation in V is smaller in the second column than it is in the third column, and so forth.

Encoding Approach I

Let p be a code parameter, p∈{0, 1, 2, ... }

Let x be an integer value to encode

The encoding process is as follows:

$$n = \left\lfloor \left| \frac{x}{2^p} + \frac{1}{2} \right| \right\rfloor,$$

where || denotes absolute value, and |y| denotes the largest integer not greater than y.

$$s = \begin{cases} 0, & x \geq 0 \\ 1, & x < 0 \end{cases}.$$

$[b_{p-1}, \ldots, b_0]$=x modulo 2p encoded into p bits using 2's complement encoding.

if $n = 0$.
 codeword = $[b_{p-1}, \ldots, b_0]$
else
 codeword = $[\underbrace{1, \ldots, 1}_{n \text{ leading ones (1s)}}, 0, s, b_{p-1}, \ldots, b_0]$
end As may be seen, the parameter p enables this Huffman encoding approach (e.g., such as may be performed using a Huffman encoder) to accommodate a wide range of probability distributions on x in a near-optimal manner. This Huffman encoding approach (e.g., such as may be performed using a Huffman encoder) supports an unlimited range on the values of x, and it can be readily extended to accommodate any desired range as may be employed in various embodiments.

As may be seen, for different respective values of p, different respective codewords will be generated for values of x. The following several diagrams employ the "Encoding Approach I" for different respective values of p. In each of the respective Huffman trees shown in these diagrams, it can be seen that the codewords having more bits therein (e.g., corresponding to input values of x approaching −16 and 15, respectively). The probabilities associated with input values of x approaching −16 and 15 are relatively less than the probabilities associated with input values of x nearer to 0 (which have respective codeword lengths being relatively much shorter). As such, even though there are some codewords having more bits therein (e.g., corresponding to input values of x approaching −16 and 15, respectively), the probability of these codewords being selected and transmitted is relatively less than the probabilities associated with input values of x nearer to 0 (which have respective codeword lengths being relatively much shorter). In other words, those codewords having relatively more bits therein (e.g., corresponding to input values of x approaching −16 and 15, respectively) are not selected and transmitted as often as those codewords having relatively less bits therein (e.g., corresponding to input values of x approaching nearer to 0).

FIG. 16 is a diagram illustrating an embodiment of respective codewords that may be generated in accordance with a first embodiment of Huffman coding (e.g., with p=0).

FIG. 17 is a diagram illustrating an embodiment of respective codewords that may be generated in accordance with the first embodiment of Huffman coding (e.g., with p=1).

FIG. 18 is a diagram illustrating an embodiment of respective codewords that may be generated in accordance with a first embodiment of Huffman coding t (e.g., with p=2).

FIG. 19 is a diagram illustrating an embodiment of respective codewords that may be generated in accordance with a first embodiment of Huffman coding (e.g., with P=3).

Figure 20:
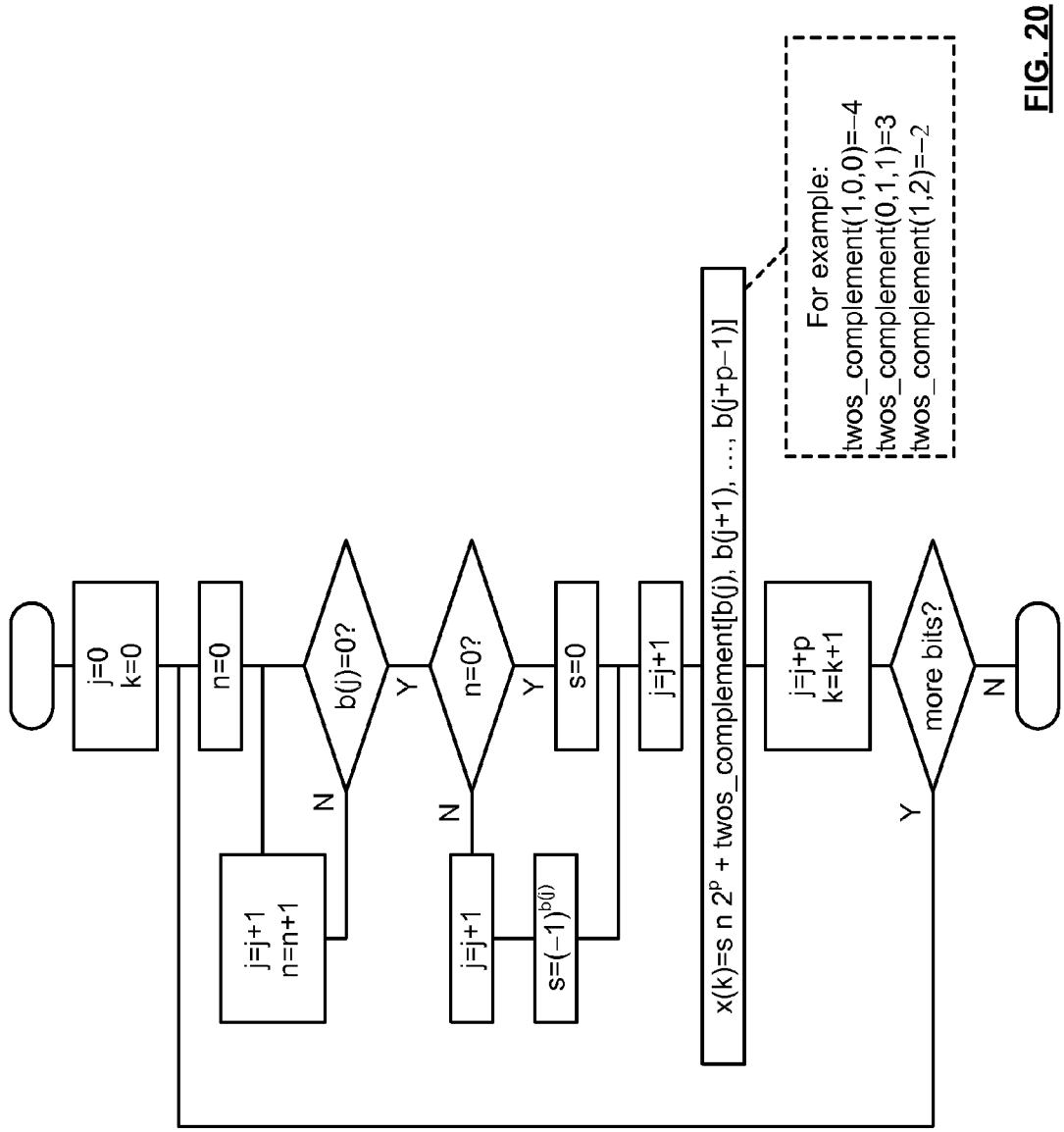
FIG. 20 is a diagram illustrating an embodiment of a method for performing decoding of a signal for generating a best estimate of a codeword encoded therein.

FIG. 20 is a diagram illustrating an embodiment of a method for performing decoding of a signal for generating a best estimate of a codeword encoded therein.

Selection of Parameter p

When performing such encoding in accordance with the various principles and aspects presented herein, finding a more optimal parameter, p, can provide for improved performance.

For all values of p, the length of the codeword is a function of x.

Prior to encoding, the exact length of the encoded sequence can be calculated for all possible values of p.

The value of p which gives the shortest sequence may be selected in certain embodiments.

After the selection of p, the sequence x can be encoded.

The value of p can be chosen independently for different columns and different angles.

Alternatively, the receiving communication device can calculate the variance of the calculated difference as described in variant A or variant B and choose the parameter p based on that value (e.g., a lower variance value corresponds to a lower value of p).

The Applicant respectfully points out that various types and variants of Huffman encoding may be performed as well without departing from the scope and spirit of the invention. For example, a variation of the "Encoding Approach I" (e.g., variant being depicted as "Encoding Approach Ia") may be employed as follows.

Encoding Approach Ia

Let p be a code parameter, p∈{0, 1, 2, . . . }

Let x be an integer value to encode

The encoding process is as follows:

$$n = \left\lfloor \left| \frac{x}{2^p} + \frac{1}{2} \right| \right\rfloor,$$

where || denotes absolute value, and |y| denotes the largest integer not greater than y.

$$s = \begin{cases} 0, & x \geq 0 \\ 1, & x < 0 \end{cases}.$$

$[b_{p-1}, \ldots, b_0]$=(x−s×n) encoded into p bits using 2's complement encoding.

if $n = 0$.
 codeword = $[b_{p-1}, \ldots, b_0]$
else
 codeword = $[\underbrace{1, \ldots, 1}_{n \text{ leading ones (1s)}}, 0, s, b_{p-1}, \ldots, b_0]$
end Encoding Approach II (Alternative)

The Encoding Approach I described above may provide for better performance that an alternative Encoding Approach II. However, there may be a variety of other possible encoding choices that may provide for sufficiently acceptable performance without departing from the scope and spirit of the invention. In other words, the Encoding Approach I described above, while preferred for certain embodiments, is not the only Encoding Approach that may be employed in accordance with various the principles and aspects of the invention.

In the following several diagrams, alternative exemplary codebooks are shown for at least one alternative encoding approach (e.g., Encoding Approach II).

In accordance with the analysis and principles provided above, the reader will understand that appropriate encoding and decoding approaches may be determined by inspection of the codebooks on the following several diagrams. Again, the following several diagrams correspond to Encoding Approach II.

FIG. 21 is a diagram illustrating an embodiment of respective codewords that may be generated in accordance with a second embodiment of Huffman coding (e.g., with p=0).

FIG. 22 is a diagram illustrating an embodiment of respective codewords that may be generated in accordance with the second embodiment of Huffman coding (e.g., with p=1).

FIG. 23 is a diagram illustrating an embodiment of respective codewords that may be generated in accordance with a second embodiment of Huffman coding t (e.g., with p=2).

FIG. 24 is a diagram illustrating an embodiment of respective codewords that may be generated in accordance with a second embodiment of Huffman coding (e.g., with p=3).

FIG. 25 is a diagram illustrating an embodiment of simulation results corresponding to a multi-user multiple input multiple output (MU-MIMO) communication system with 8 antennae at the transmitting wireless communication device and 2 antennae respectively at each of the receiving wireless communication devices.

Simulation of a MU-MIMO system with 8 antennae at the transmitting communication device and 2 antennae at each of 4 respective receiving communication devices was conducted with varying rates of channel aging (e.g., high being −25 dBc, and low being −40 dBc).

The Huffman coding corresponding to Encoding Approach I as described above is used to compress the delta (Δ) as defined in variant B and variant A (as described above), and the overhead associated with differential feedback is compared to a complete feedback using the presently agreed upon IEEE 802.11ac numbers of 9 bits for Phi and 7 bits for Psi. The same quantization delta for Phi and Psi are employed, namely, delta=pi/256. Hence the quantization levels are [−64:1:63]×delta for Phi, and [−16:1:15] for Psi. For an alternative Cartesian embodiment, the following may be used: [−2.5 −1.5 −0.5 0.5 1.5 2.5]/128.

As may be seen in the diagram, the overhead results indicate that usage of the proposed Encoding Approach I incurs only a modest 6-8% overhead increase when compared to Huffman encoding while providing a predefined set of encoding mapping that can be readily implemented across a wide variety of applications.

Figure 26:
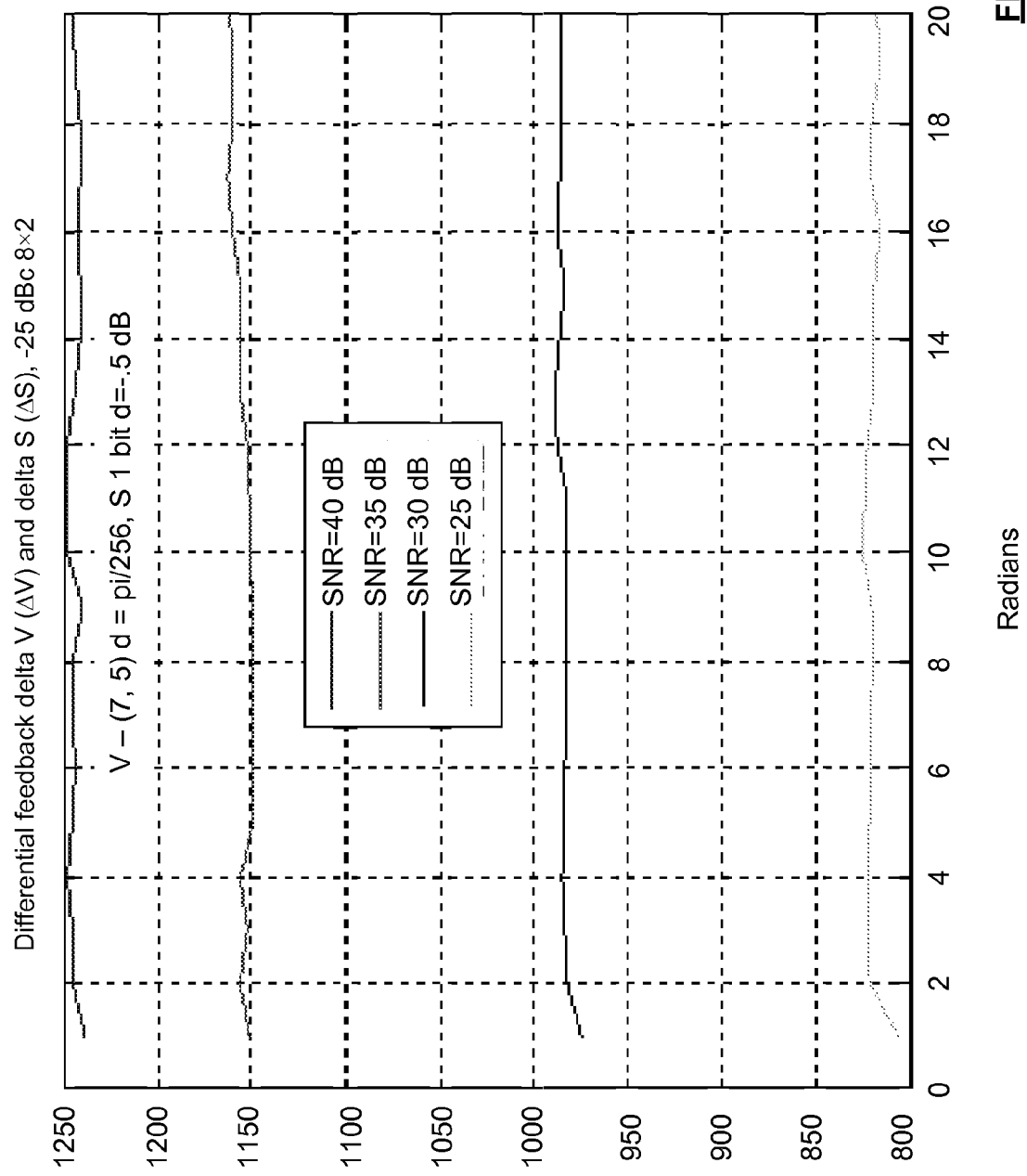
FIG. 26 is a diagram illustrating an embodiment of simulation results corresponding to differential feedback composed of a singular vector (V) and singular value (S), respectively.

FIG. 26 is a diagram illustrating an embodiment of simulation results corresponding to differential feedback composed of a singular vector (V) and singular value (S), respectively. As may be seen with respect to certain of the results, some results add a differential singular value (S) to a vector (V). The sensitivity to an inaccurate differential singular value (S) is much lower than to receiving an inaccurate differential vector (V), and it may be seen that a 1 bit quantization of S to the levels ±−0.25 dB is sufficient. The similar conditions described above are also employed for this simulation.

Differential Feedback (DFB) Setup

DFB setup is not really needed, but may be employed in certain embodiments without departing from the scope and spirit of the invention. It is not needed necessarily because when a beamformer (e.g., transmitting wireless communication device, such as an AP) offers choice of Complete FB (CFB) or Differential FB (DFB), it is assumed that full FB is supported by all receiving wireless communication devices (e.g., STAs) within the communication system. This means that any receiving wireless communication device (e.g., STA) can always respond with Complete FB and will always be obeying the beamformer, even when the beamformer offers a choice.

In the event that setup is performed, then the DFB Beamformer and DFB Beamformee exchange capability information and agree to use DFB. The responsibilities and expectations for Beamformer and Beamformee (e.g., AP and STAs, respectively) are different when DFB is used.

For example, non-differential FB frames (FULL or COMPLETE FB=CFB) must be sent periodically for one or more reasons. For example, CFB may be provided to establish a reference for subsequent DFB frames, to recover from frame delivery errors, to express the difference if the differential state exceeds the ability of the DFB frame, etc.

Differential Feedback (DFB) Control

Beamformer and Beamformee must agree as to when full or Complete FB vs. differential FB is provided.

In one embodiment, the Beamformer is forced to employ FULL FB or Complete FB as needed. This may be performed on a per-responder basis for each sounding exchange. The Beamformer can force any given responder to send FULL FB or Complete FB in an effort to recover from error conditions.

When a Beamformer is NOT requesting FULL FB from any given Beamformee, then that Beamformee has a choice. For example, the Beamformee can send either FULL FB or DFB.

In an alternative embodiment, a Beamformer may use bit to signal allowance for Differential FB. For example, a bit in the Single User (SU) case NDP-A (Null Data Packet Announcement) and a bit with same function in Multi User (MU) case MNDP-A (Multi User NDSP-A) frame may be employed per sounding responder. Generally speaking, as few as a single bit within a communication from a transmitter wireless communication device (e.g., such a communication may generally be referred to as a signal in various implementations thereof may include a multi-user packet, an NDP-A, a management frame, etc. and/or any other type of signal from the transmitter wireless communication device to at least one other wireless communication device). An embodiment in which a single bit is used to differentiate between full feedback and the optional situation in which either differential or fold feedback may be provided a be implemented as follows:

0→default=Must send FULL (i.e. complete) FB
1→option=May send Differential FB or FULL FB Several of the following diagrams provide descriptions of DFB sounding exchanges with various error conditions and recovery.

Figure 27:
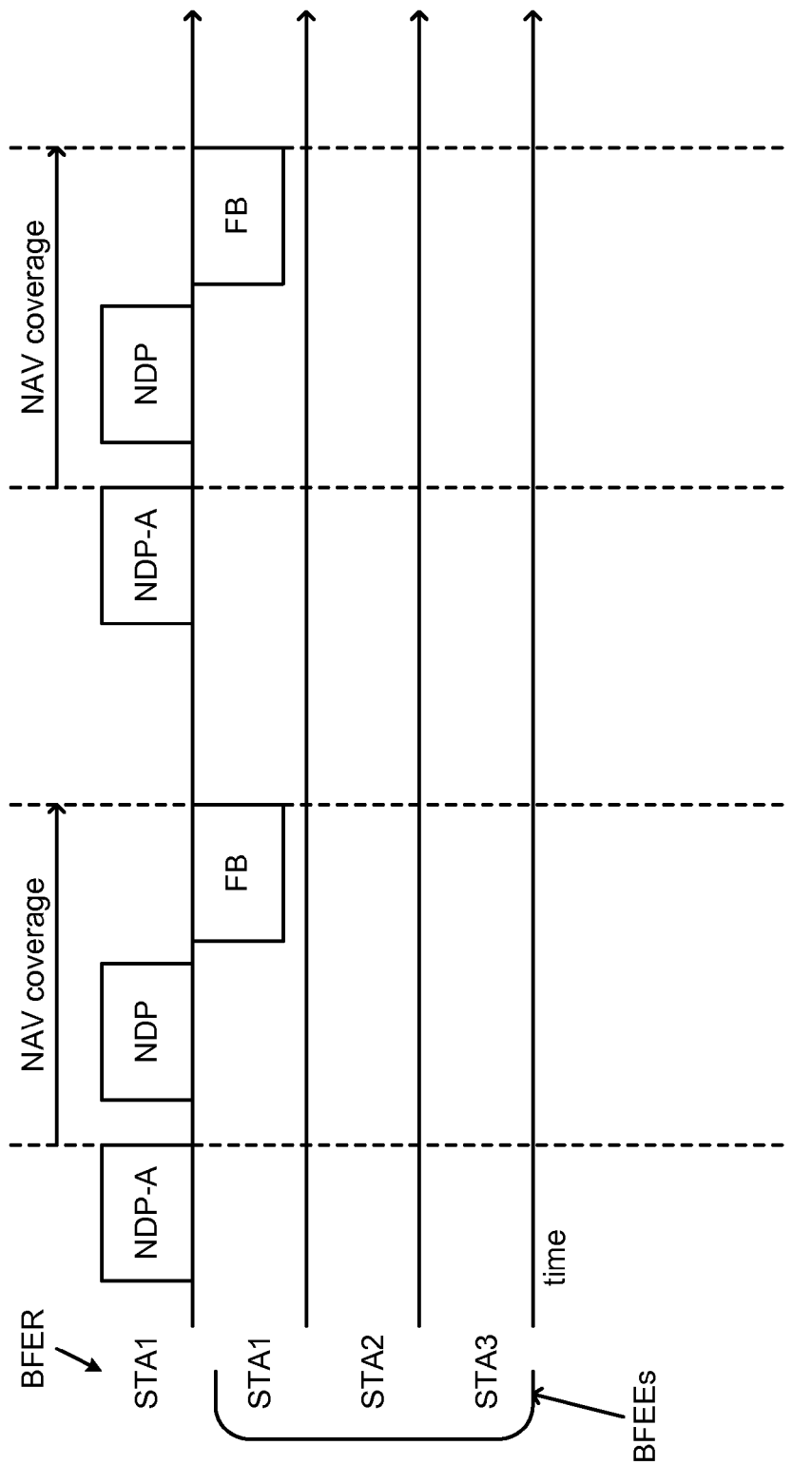
FIG. 27 is a diagram illustrating an embodiment of baseline single-user (SU) feedback exchange between various wireless communication devices within a communication system.

FIG. 27 is a diagram illustrating an embodiment of baseline single-user (SU) feedback exchange between various wireless communication devices within a communication system. Generally speaking, the depiction of the various wireless communication devices within this diagram is as follows:

STA0 is Beamformer initiating a sounding exchange

STA1, STA2, STA3 are beamformees that respond with sounding Feedback

As can be seen, a given transmitter wireless communication device or being former need not necessarily be an access point (AP). In this particular embodiment, a wireless station (e.g., STA0) serves as the beamformer that is initiating a sounding exchange, and the other wireless stations are the beamformees that respond with respective sounding feedback.

Initially, a Single User Null Data Packet Announcement Frame (e.g., depicted in the diagram as NDP-A) is provided from the being former to the respective beamformees. Such a communication from the transmitter wireless communication device to the respective receiver wireless communication devices may be implemented to provide transmitter address (TA) information for the corresponding null data packet (NDP) sounding frame. Such a communication may also be implemented to provide a number of subsequent NDP sounding frames, which may be as few as one NDP sounding frame in certain embodiments. A given respective wireless station (STA) that is addressed by a receiver address (RA) of the NDP-A is expected to respond to sounding with Feedback. In addition, such a communication may include a DUR (Duration) field which may indicate network allocation vector (NAV) coverage for the exchange. It is noted that the exact value of the DUR may be adapted for a particular application, design, implementation, etc., and the particular value of the DUR field is generally flexible. Such a value may be employed as to cover part of the exchange, with subsequent frames providing overlapping and extending coverage.

Again, the alphanumeric reference numeral associated with NDP in the diagram corresponds to Null Data Packet sounding frame, and may be implemented to contain training symbols used by recipients (e.g., those receiver wireless communication devices for which sounding frame is intended) to perform estimation of channel. In the diagram, the alphanumeric reference numeral associated with FB corresponds to Feed Back frame, which may be implemented to contain an estimate of channel or transmit beam-forming vector information. As may be understood with respective to various embodiments and/or diagrams herein, such feedback may be implemented in accordance with either Full of Complete FB (CFB) or Differential FB (DFB). The alphanumeric reference numeral associated with PFB corresponds to Poll for Feed Back frame, and may be implemented to include a request for a responder to transmit a Feed Back frame (FB). The coverage provided by the network allocation vector (NAV) coverage is uni-directional, and may be transmitted by the beamformer wireless station (e.g., STA0), but not retransmitted in a response frame by any other STA.

Figure 28:
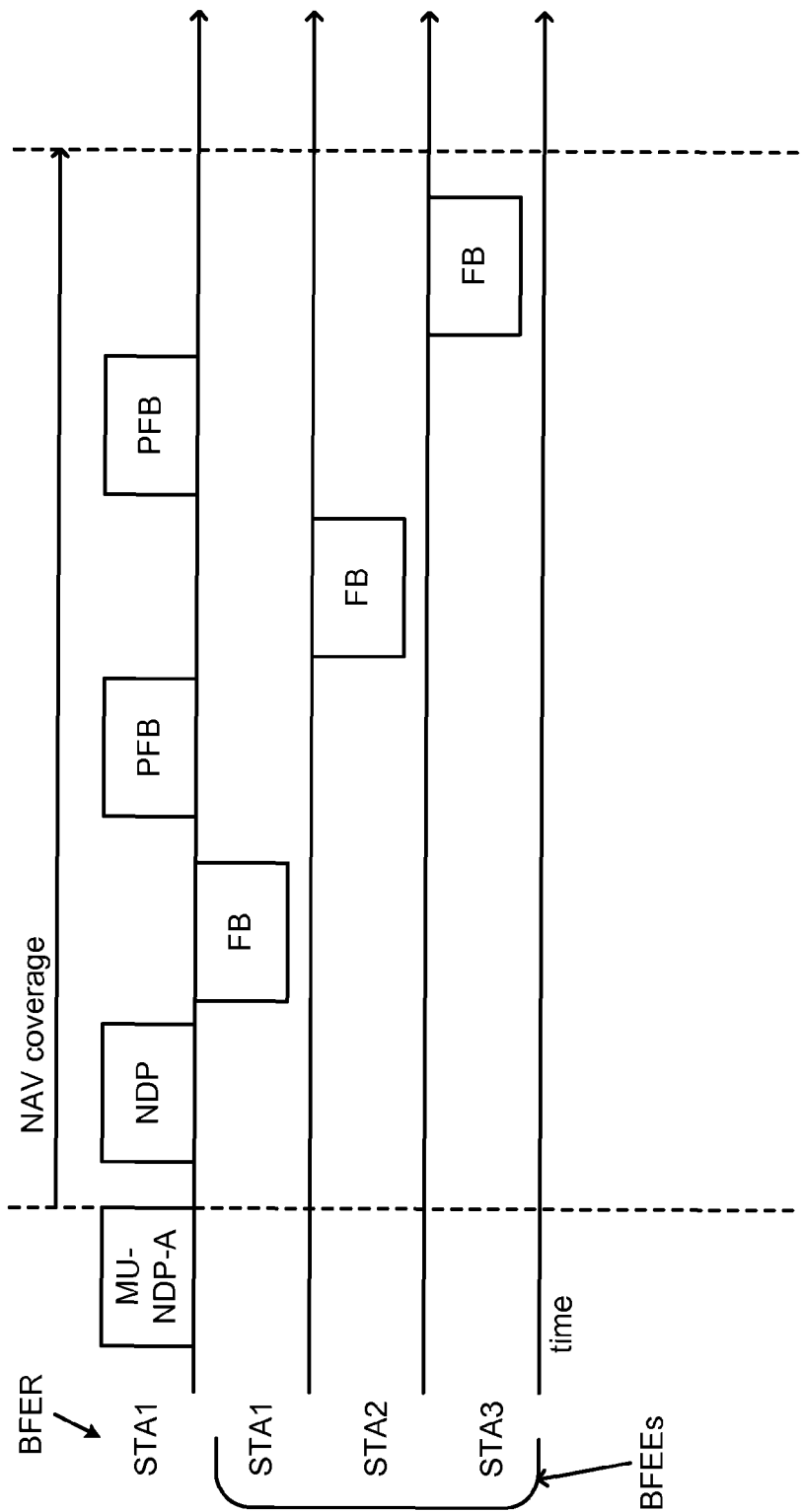
FIG. 28 is a diagram illustrating an embodiment of baseline multi-user (MU) feedback exchange between various wireless communication devices within a communication system.

FIG. 28 is a diagram illustrating an embodiment of baseline multi-user (MU) feedback exchange between various wireless communication devices within a communication system. In this diagram, the transmitter wireless communication device is depicted as STAG and is the Beamformer initiating a sounding exchange. The other wireless communication devices or the receiver wireless communication devices are depicted as STA1, STA2, STA3 are beamformees that respond with sounding Feedback. MNDP-A is a Multi-User Null Data Packet Announcement Frame that may be implemented to provide TA information for NDP sounding frame, a number of subsequent NDP sounding frames (e.g., as few as 1 in some embodiments), a list of wireless communication devices (STAs) that are expected to respond to sounding with Feedback. Also, such a MNDP-A may be implemented to include a DUR (Duration) field which may indicate NAV coverage for the exchange. Again, as described suspect other embodiments and/or diagrams, the exact value of DUR is flexible, and it may cover part of the exchange, with subsequent frames providing overlapping and extending coverage.

NDP is a Null Data Packet sounding frame which may be implemented to contain training symbols used by the wireless communication devices (e.g., receiver wireless communication devices, recipients, STAs) to estimate the channel. FB is the Feed Back frame, and it may be implemented to contain estimate of channel or transmit beam-forming vector information.

As may be understood with respective to various embodiments and/or diagrams herein, such feedback may be implemented in accordance with either Full of Complete FB (CFB) or Differential FB (DFB). PFB corresponds to Poll for Feed Back frame, and may be implemented to include a request for a responder to transmit a Feed Back frame (FB). The coverage provided by the network allocation vector (NAV) coverage is uni-directional, and may be transmitted by the beamformer wireless station (e.g., STA0), but not retransmitted in a response frame by any other STA.

Figure 29:
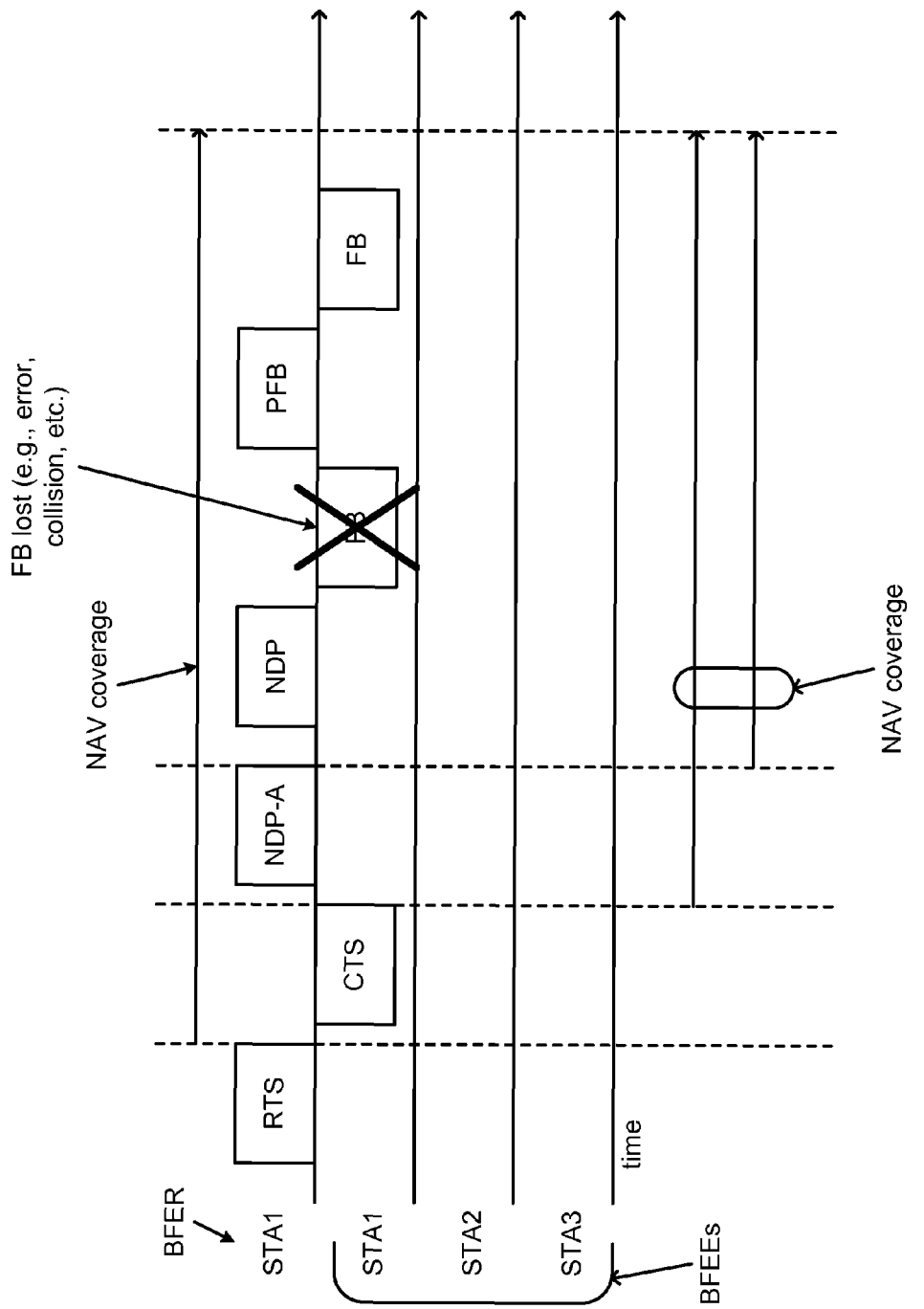
FIG. 29 is a diagram illustrating an embodiment of a SU feedback exchange, with protection as provided by a request to send (RTS) and clear to send (CTS) exchange and associated network allocation vector (NAV), between various wireless communication devices within a communication system.

FIG. 29 is a diagram illustrating an embodiment of a SU feedback exchange, with protection as provided by a request to send (RTS) and clear to send (CTS) exchange and associated network allocation vector (NAV), between various wireless communication devices within a communication system. It is noted as such operation in accordance with such an RTS-CTS exchange is optional within certain desired embodiments, and need not be performed within all embodiments. With respect to the various communications and signaling associated with RTS, CTS, NDP-A, it is noted that each respective frame may contain a DUR field value that covers some of the upcoming sounding and feedback exchange. Such a DUR field may indicate NAV coverage for the exchange, and the exact value of DUR is flexible.

For example, it may cover all of the exchange, or part of the exchange. In certain embodiments, it may cover part of the exchange with subsequent frames providing overlapping and extending coverage. In even other embodiments, it may cover more than is necessary. In accordance with performing failure and recovery being unpredictable, overestimation may be possible. In such situations, truncation is accommodated when excess NAV coverage remains at the end of the sequence, and truncation may be performed with CF-End transmission(s) (e.g., which is not specifically illustrated within the diagram but will be understood by the reader). With respect to feedback and poll for feedback, FB and PFB, respectively, these frames may also contain protective DUR field values. In this particular embodiment, the coverage provided by the network allocation vector (NAV) is bi-directional. That is to say, such coverage is provided initially by the RTS that is transmitted by STA0, repeated in CTS by a STA that is not STA0 (e.g., shown as being provided by STA1 in the diagram).

Figure 30:
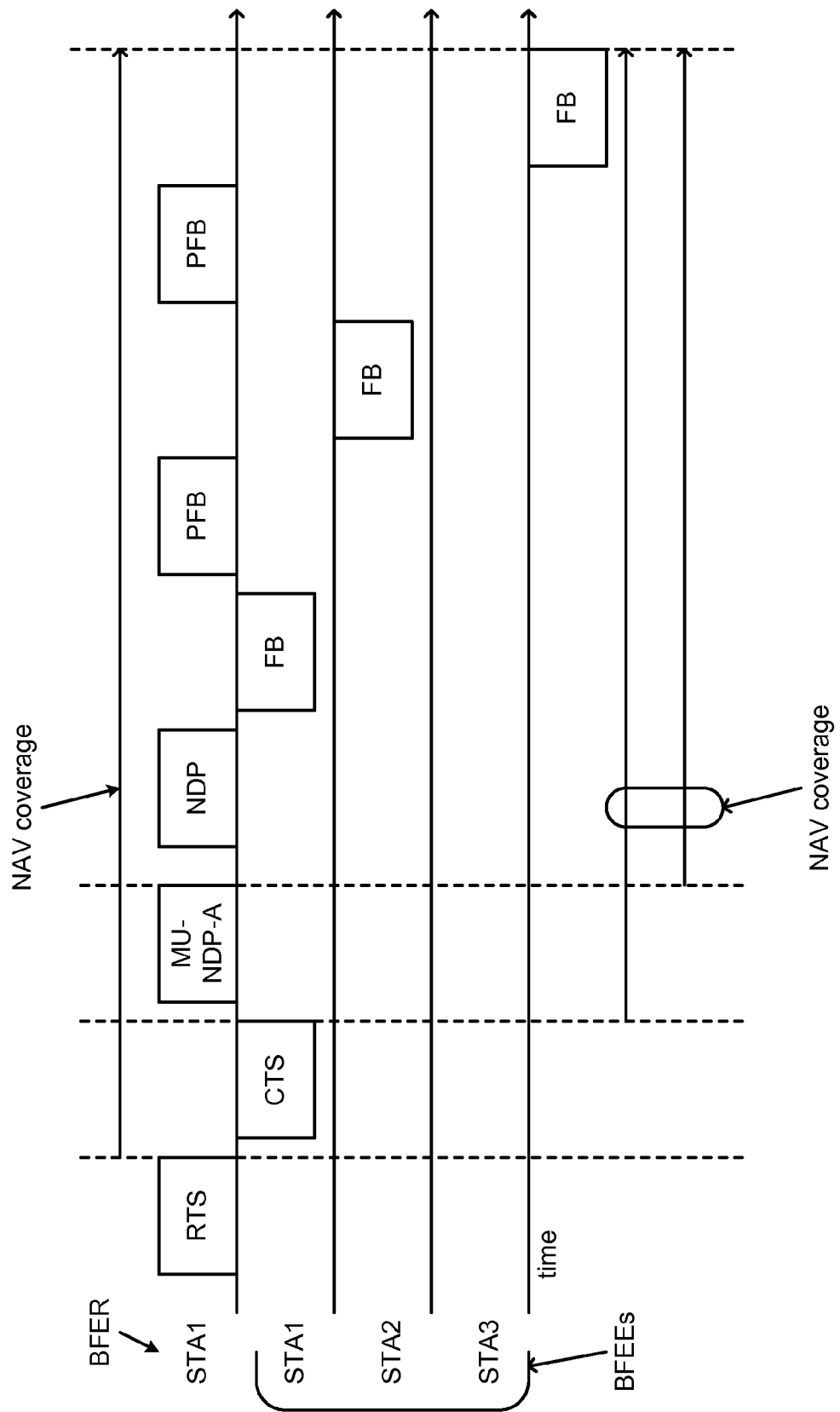
FIG. 30 is a diagram illustrating an embodiment of a MU feedback exchange, with protection as provided by an RTS/CTS exchange and associated network allocation vector (NAV), between various wireless communication devices within a communication system.

FIG. 30 is a diagram illustrating an embodiment of a MU feedback exchange, with protection as provided by an RTS/CTS exchange and associated network allocation vector (NAV), between various wireless communication devices within a communication system. Again, as stated elsewhere herein, such an RTS-CTS exchange is optional and need not be performed within every embodiment. With respect to the various communications and signaling associated with RTS, CTS, MNDP-A, it is noted that each respective frame may contain a DUR field value that covers some of the upcoming sounding and feedback exchange. Such a DUR field may indicate NAV coverage for the exchange, and the exact value of DUR as flexible.

For example, has stated the suspect other embodiments and/or diagrams, it may cover all of the exchange, or part of the exchange. In certain embodiments, it may cover part of the exchange with subsequent frames providing overlapping and extending coverage. In even other embodiments, it may cover more than is necessary. In accordance with performing failure and recovery being unpredictable, overestimation may be possible. In such situations, truncation is accommodated when excess NAV coverage remains at the end of the sequence, and truncation may be performed with CF-End transmission(s) (e.g., which is not specifically illustrated within the diagram but will be understood by the reader). With respect to feedback and poll for feedback, FB and PFB, respectively, these frames may also contain protective DUR field values. In this particular embodiment, the coverage provided by the network allocation vector (NAV) is bi-directional. That is to say, such coverage is provided initially by the RTS that is transmitted by STA0, repeated in CTS by a STA that is not STA0 (e.g., shown as being provided by STA1 in the diagram).

Figure 31:
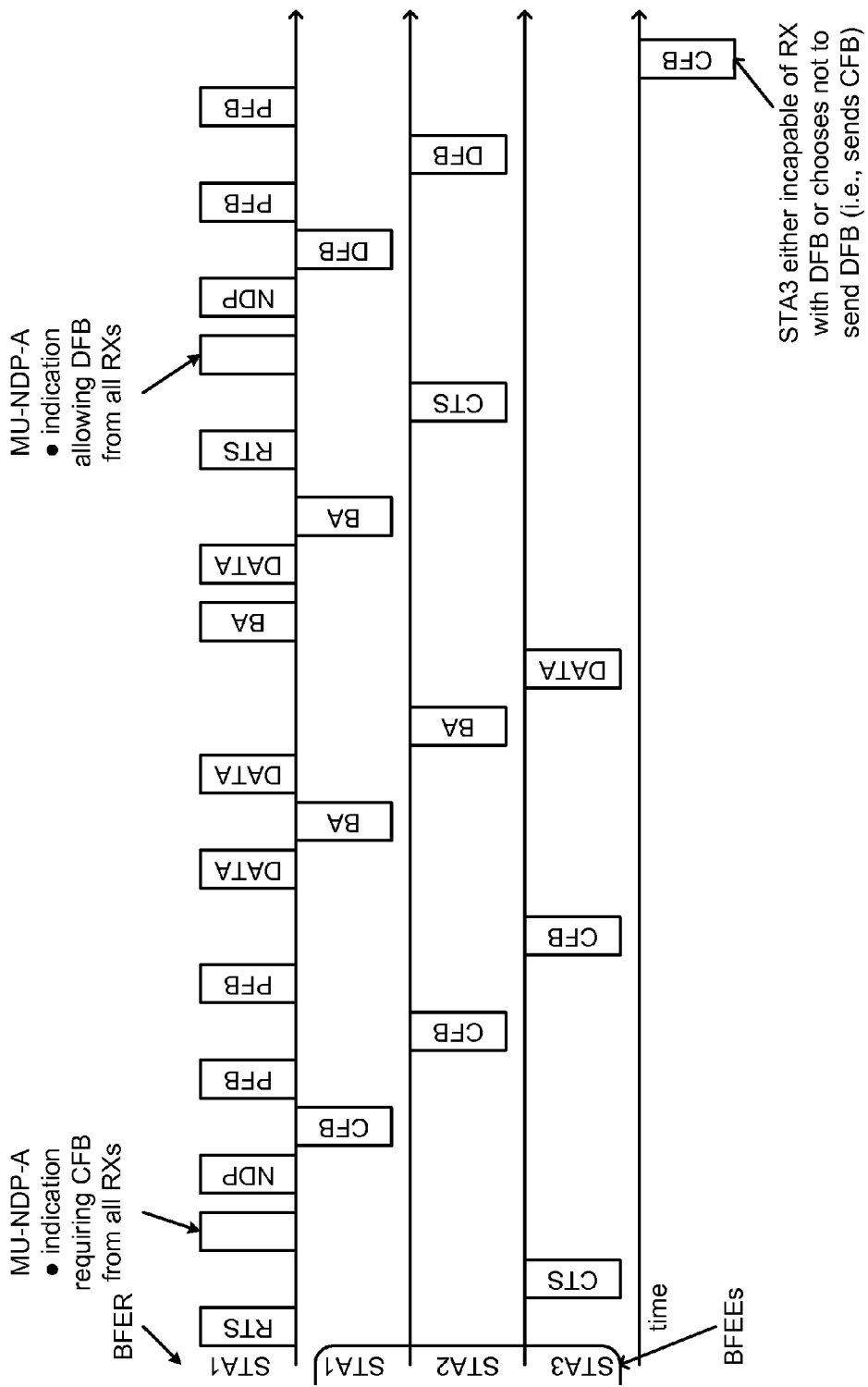
FIG. 31 is a diagram illustrating an embodiment of a simple MU differential feedback (DFB) feedback exchange sequence between various wireless communication devices within a communication system.

FIG. 31 is a diagram illustrating an embodiment of a simple MU differential feedback (DFB) feedback exchange sequence between various wireless communication devices within a communication system. As can be seen within this diagram, the communication and signaling sequence between the respective wireless communication devices begins with a sounding and feedback exchange. In this exchange, a transmitter wireless communication device (e.g., STA0) operates as a Beamformer and specifically requires Full or Complete FB (CFB) from the respective other wireless communication devices (e.g., receiver wireless communication devices, wireless stations (STAs), etc.). This indication of requiring full or complete feedback from the respective other wireless communication devices may be indicated within one or more signaled bits in the MNDP-A frame. It is also noted that the indication may be per respective wireless communication device, such that the type of feedback to be provided from the respective wireless communication devices is differentiated on a device by device basis. For example, such indication may be per-recipient, but in the exemplary embodiment of this diagram, all recipients are requested to send CFB. However, again, it is noted that various alternative embodiments may mix the respective requirements of each individual wireless communication device, such that certain of the wireless communication devices may provide full or complete feedback and certain other of the wireless communication devices may provide differential feedback. Such individual and respective indication of the type of feedback to be provided by the respective wireless communication devices (e.g., a first wireless communication device providing full or complete feedback, a second wireless communication device providing differential feedback, etc.) may be indicated within a singular or common sounding exchange. That is to say, a given or same sounding exchange may individually and respectively request different types of feedback from different respective wireless communication devices (e.g., a first wireless communication device providing full or complete feedback, a second wireless communication device providing differential feedback, etc.).

It is noted that each of the respective wireless communication devices (e.g., receiver wireless communication devices, STA1, STA2, STA3, etc.) respond with a respective CFB (Complete FB frame). That is to say, each respective one of the wireless communication devices responds with a respective CFB (e.g., a first CFB from STA1, a second CFB from STA2, etc.). A period of time passes before the next sounding exchange. During the intervening time between the respective sending exchanges, any of a variety of different types of communications may be effectuated between the various wireless communication devices of the communication system, including DATA exchanges. A subsequent sounding exchange may allow for differential FB (DFB), such that each respective wireless communication device (e.g., each respective receiver wireless communication device, wireless station (STA)) will be provided with the option or choice of responding with feedback in accordance with differential feedback (DFB) or full/complete feedback (CFB).

Figure 32:
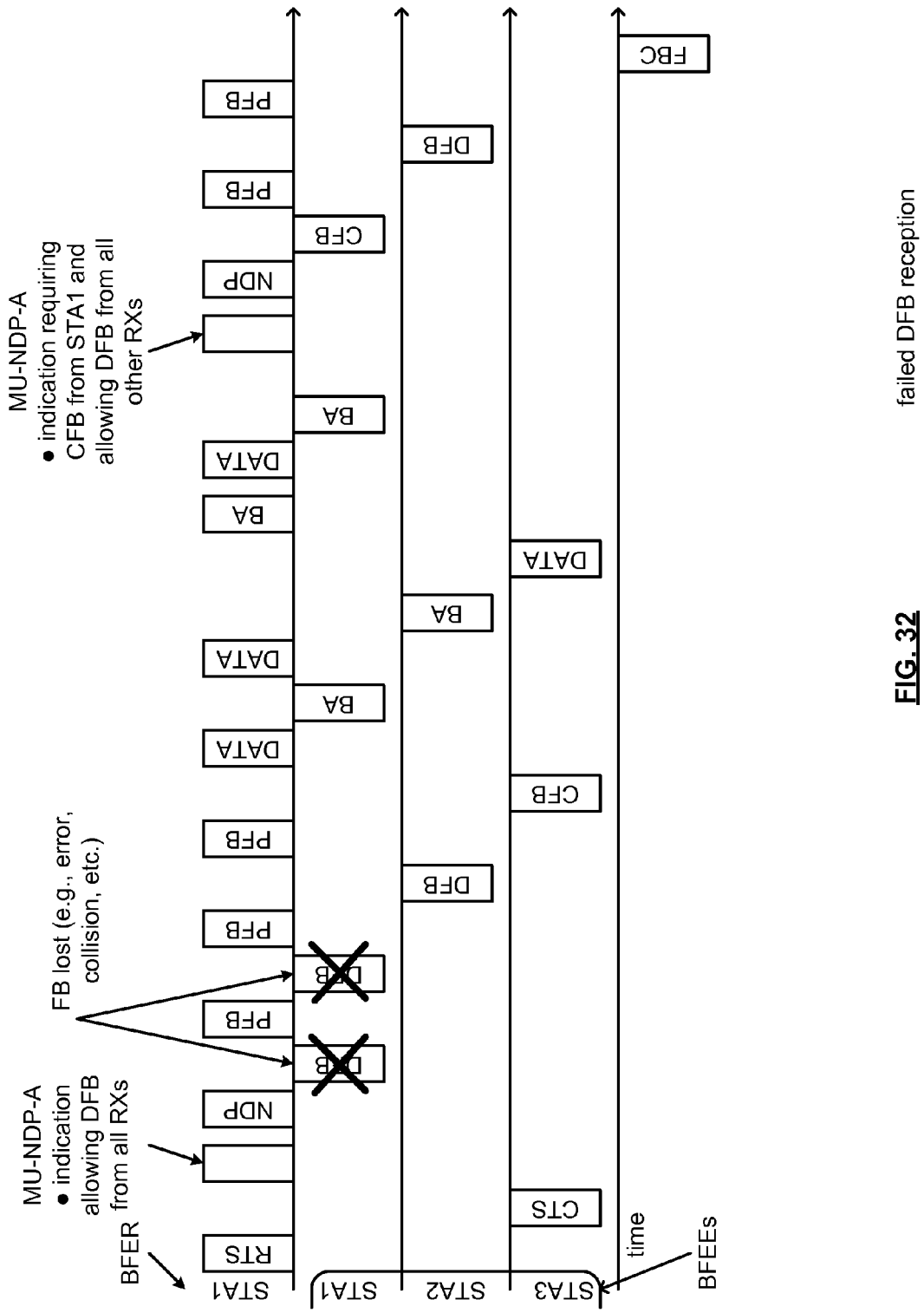
FIG. 32 is a diagram illustrating an embodiment of a failed DFB reception between various wireless communication devices within a communication system.

FIG. 32 is a diagram illustrating an embodiment of a failed DFB reception between various wireless communication devices within a communication system. In accordance with the operations of the present embodiment, an assumption is made that some previous sounding exchange has provided at least one communication associated with full or complete feedback (CFB). As such, a first exchange in this diagram is a subsequent exchange that allows for differential feedback (DFB).

Particularly as illustrated within this diagram, reception of differential feedback (DFB) fails at the transmitter wireless communication device which operates as the Beamformer (e.g., STA0). The transmitter wireless communication device then operates to retrieve the failed received DFB by sending a poll for feedback (PFB) the communication to one of the other wireless communication devices (e.g., receiver wireless communication device, STA1). In accordance with such operation, fast recovery (point coordination interframe space (PIFS) retry) is allowed because of the particular bidirectional NAV coverage provided. Due to the excess of time taken, the transmitter wireless communication device may then abandon any attempt to retrieve DFB from STA1. In such instances, the transmitter wireless communication device may then request FB from certain of the other wireless communication devices, such as from STA2, and then from STA3.

As can be seen with respect to this diagram, a subsequent sounding exchange requires a full or complete feedback (CFB) from one of the wireless communication devices (e.g., one of the receiver wireless communication devices, STA1), given that the prior differential feedback (DFB) was not received due to error collision. Without a full or complete feedback (CFB) appropriately received from that given wireless communication device, the transmitter wireless communication device or Beamformer (e.g., STA0) would receive DFB that is relative to the previous CFB combined with the missing CFB, meaning that the transmitter wireless communication device or Beamformer (e.g., STA0) would be out of synch with the wireless communication device (e.g., the receiver wireless communication device, Beamformee, STA1). That is to say, that transmitter wireless communication device or Beamformer (e.g., STA0) and the other wireless communication device (e.g., the receiver wireless communication device, beamformee, STA1) are out of synch with respect to differential updates, and this requires that for a new sounding to be effectively handled, a new complete FB must be received from that respective wireless communication device (e.g., the receiver wireless communication device, beamformee, STA1) to become re-synchronized.

As may be seen with respect to this embodiment, there may be instances in which one or more differential feedback signals may fail to be received by the transmitter wireless communication device. In such instances, a resynchronization operation may be performed such that a full or complete feedback is provided from the respective and corresponding wireless communication device (e.g., from the appropriate receiver wireless communication device, wireless station (STA), etc.).

Figure 33:
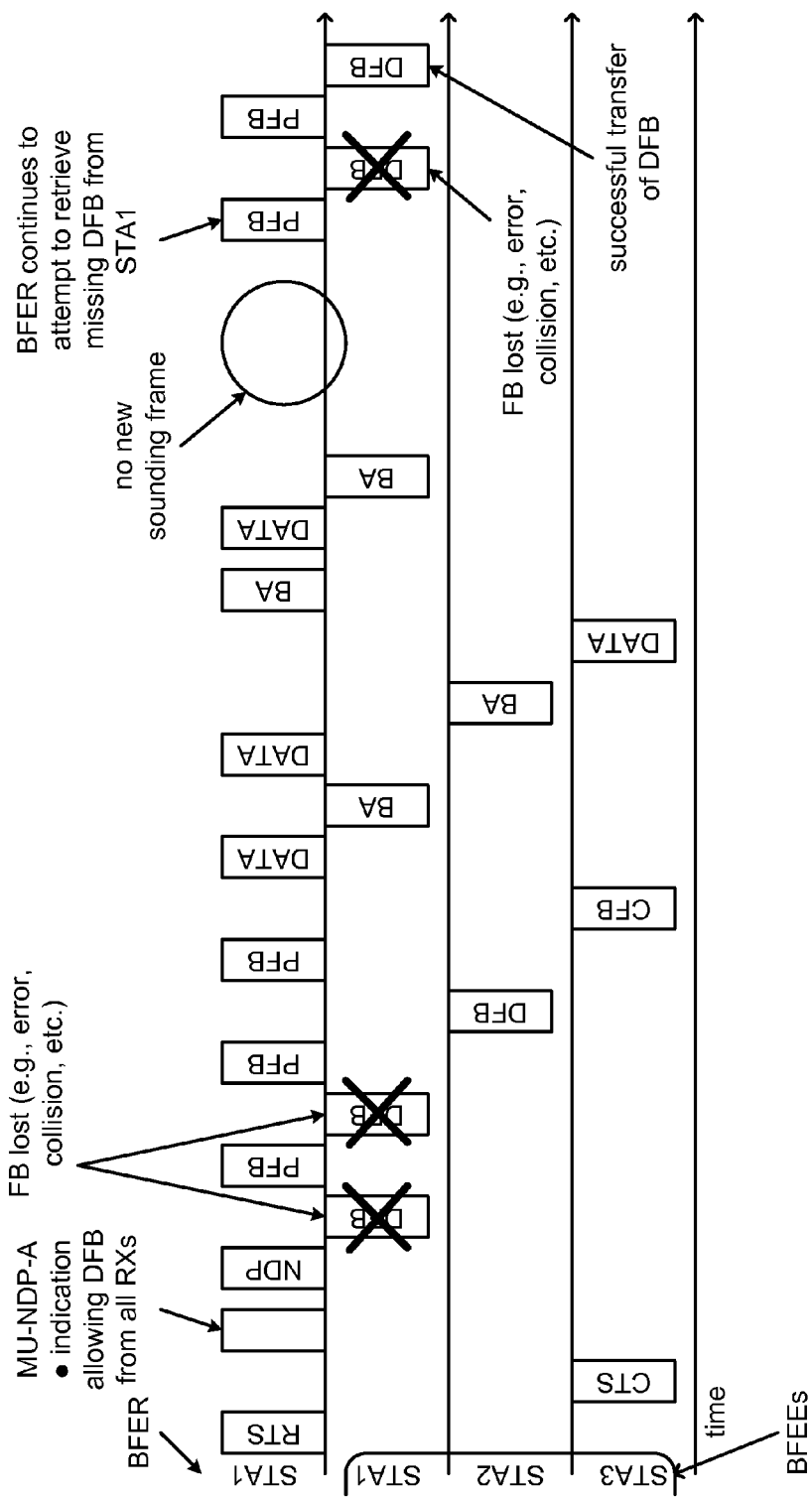
FIG. 33 is a diagram illustrating an embodiment of a failed DFB reception, with a retry option, between various wireless communication devices within a communication system.

FIG. 33 is a diagram illustrating an embodiment of a failed DFB reception, with a retry option, between various wireless communication devices within a communication system. This diagram also operates based upon the assumption employed with respect to the prior embodiment, in that, some previous sounding exchange has provided at least one communication associated with full or complete feedback (CFB). As such, a first exchange in this diagram is a subsequent exchange that allows for differential feedback (DFB).

As can be seen within this diagram, an initial recovery attempt by the transmitter wireless communication device or beamformer (e.g., STA0) fails. The transmitter wireless communication device or beamformer (e.g., STA0) then operates by continuing to attempt to recover differential feedback (DFB) from one of the other wireless communication devices (e.g., receiver wireless communication device, STA1) after intervening data exchanges are performed. For example, this may be viewed as being made after a certain amount of time has passed or elapsed, and during which other exchanges may be performed including data exchanges. Generally speaking, there is no limit particularly on the particular timing regarding when the transmitter wireless communication device or beamformer (e.g., STA0) should cease attempting to retrieve differential feedback. That is to say, such determination as to when such a transmitter wireless communication device or beamformer (e.g., STA0) should terminate the operations associated with seeking or retrieving such differential feedback may be varied within various embodiments. However, it is noted that, generally speaking, the transmitter wireless communication device or beamformer (e.g., STA0) typically will not or cannot send new sounding frame before making these additional one or more attempts in seeking such differential feedback. This is because a new sounding frame may cause or precipitates the generation of a new channel estimate, and then subsequent and successive new differential FB will be generated accordingly.

Figure 34:
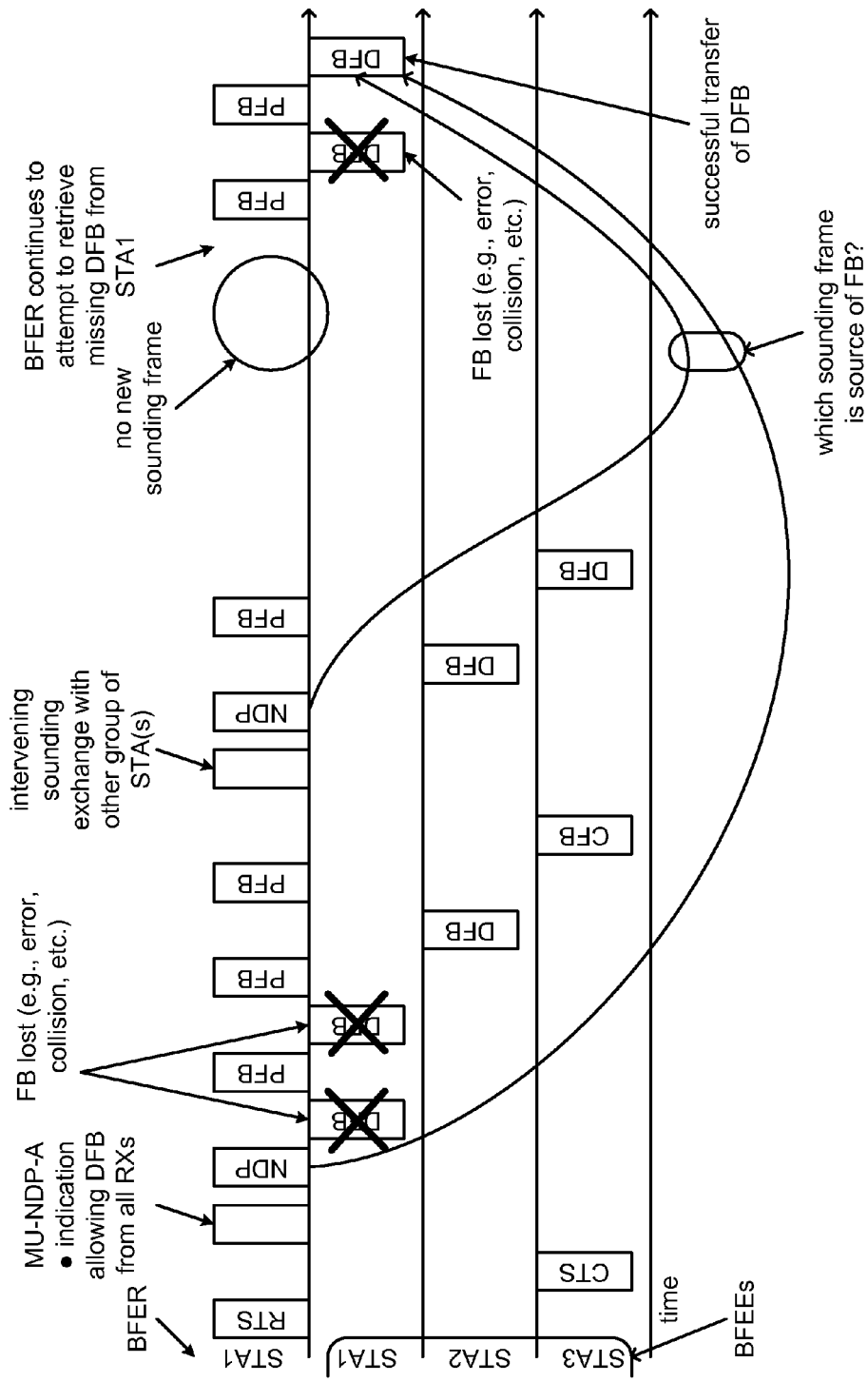
FIG. 34 is a diagram illustrating an embodiment of a failed DFB reception, re-sounding, then a retry, between various wireless communication devices within a communication system.

FIG. 34 is a diagram illustrating an embodiment of a failed DFB reception, re-sounding, then a retry, between various wireless communication devices within a communication system. This diagram also operates based upon the assumption employed with respect to other prior embodiments, in that, some previous sounding exchange has provided at least one communication associated with full or complete feedback (CFB). As such, a first exchange in this diagram is a subsequent exchange that allows for differential feedback (DFB).

With respect to the functionality and/or operations depicted within this diagram, the transmitter wireless communication device or beamformer (e.g., STA0) attempts recovery, then moves on. The transmitter wireless communication device or beamformer (e.g., STA0) performs an intervening sounding exchange.

However, as can be seen within the diagram, one of the wireless communication devices (e.g., receiver wireless communication device, STA1) is not included in this intervening sounding exchange. In some instances, this failure to be included within the intervening sounding exchange However, this might not be immediately recognized that respective one of the wireless communication devices (e.g., receiver wireless communication device, STA1). Therefore, that particular one of the wireless communication devices (e.g., receiver wireless communication device, STA1) may errantly overwrite local memory storage of channel estimate information. In other words, that particular one of the wireless communication devices (e.g., receiver wireless communication device, STA1) might unfortunately lose undelivered differential feedback (DFB) information (e.g., DFB information that has yet to be provided to the transmitter wireless communication device or beamformer (e.g., STA0).

Subsequent attempts as performed by the transmitter wireless communication device or beamformer (e.g., STA0) to retrieve differential feedback (DFB) from that particular one of the wireless communication devices (e.g., receiver wireless communication device, STA1) may nonetheless prove to be successful. In such an instance, the transmitter wireless communication device or beamformer (e.g., STA0) may be able to recognize and/or determine whether or not it has received differential feedback (DFB) information from that particular one of the wireless communication devices (e.g., receiver wireless communication device, STA1) that was generated from a first or second sounding frame by examining sounding sequence number from an MNDP-A frame. That is to say, the transmitter wireless communication device or beamformer (e.g., STA0) may be able to perform distinction regarding whether such differential feedback was associated with the first or second sounding frame by looking at particular characteristics of a previously received MNDP-A frame. For example, a given wireless communication device (e.g., a receiver wireless communication device, a Beamformee, STA) may be implemented to include an MNDP-A sounding sequence number in each respective differential feedback (DFB) or full or complete feedback (CFB) frame.

Figure 35:
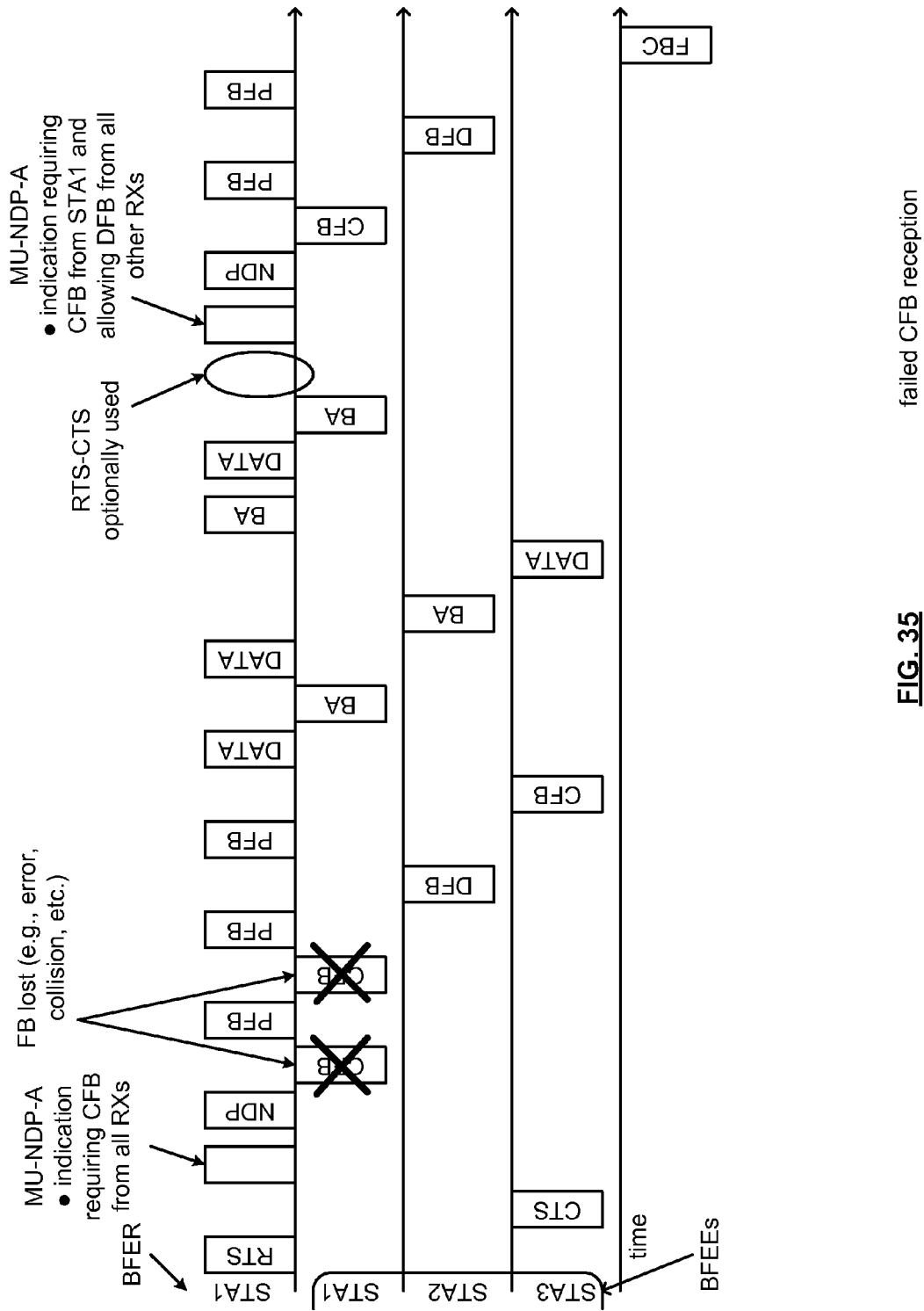
FIG. 35 is a diagram illustrating an embodiment of failed complete feedback (CFB) reception between various wireless communication devices within a communication system.

FIG. 35 is a diagram illustrating an embodiment of failed complete feedback (CFB) reception between various wireless communication devices within a communication system. As can be seen with respect to this diagram, a first sounding exchange requires full or complete feedback (CFB) from all of the recipient wireless communication devices (e.g., those corresponding receiver wireless communication devices, STAs). In the event that there is a failure of differential feedback (DFB) reception fails at the transmitter wireless communication device or beamformer (e.g., STA0), then the Beamformer attempts to retrieve full or complete feedback (CFB) by sending a poll for feedback (PFB) communication to that respective wireless communication device (e.g., receiver wireless communication device, STA1). In certain situations, due to an excessive time passing or collapsing (e.g., the conditions or constraints of which may be fixed, predetermined, adaptively adjusted, etc.), the transmitter wireless communication device or beamformer (e.g., STA0) may subsequently abandoned its respective attempt to receive complete or full feedback (CFB) from that respective wireless communication device (e.g., receiver wireless communication device, STA1). For example, the transmitter wireless communication device or beamformer (e.g., STA0 may then request feedback (FB)

from other of the wireless communication devices (e.g., from STA2, then from STA3).

As can be seen with respect to this diagram, a subsequent sounding exchange requires full or complete feedback (CFB) from one of the wireless communication devices (e.g., one of the receiver wireless communication devices, STA1), given that the prior differential feedback (DFB) was not received due to error collision. Without a complete feedback (FB) appropriately received from that given wireless communication device, the transmitter wireless communication device or Beamformer (e.g., STA0) would receive DFB that is relative to the previous CFB combined with the missing CFB, meaning that the transmitter wireless communication device or Beamformer (e.g., STA0) would be out of synch with the wireless communication device (e.g., the receiver wireless communication device, Beamformee, STA1). That is to say, that transmitter wireless communication device or Beamformer (e.g., STA0) and the other wireless communication device (e.g., the receiver wireless communication device, beamformee, STA1) are out of synch with respect to differential updates, and this requires that for a new sounding to be effectively handled, a new complete FB must be received from that respective wireless communication device (e.g., the receiver wireless communication device, beamformee, STA1) to become re-synchronized.

Figure 36:
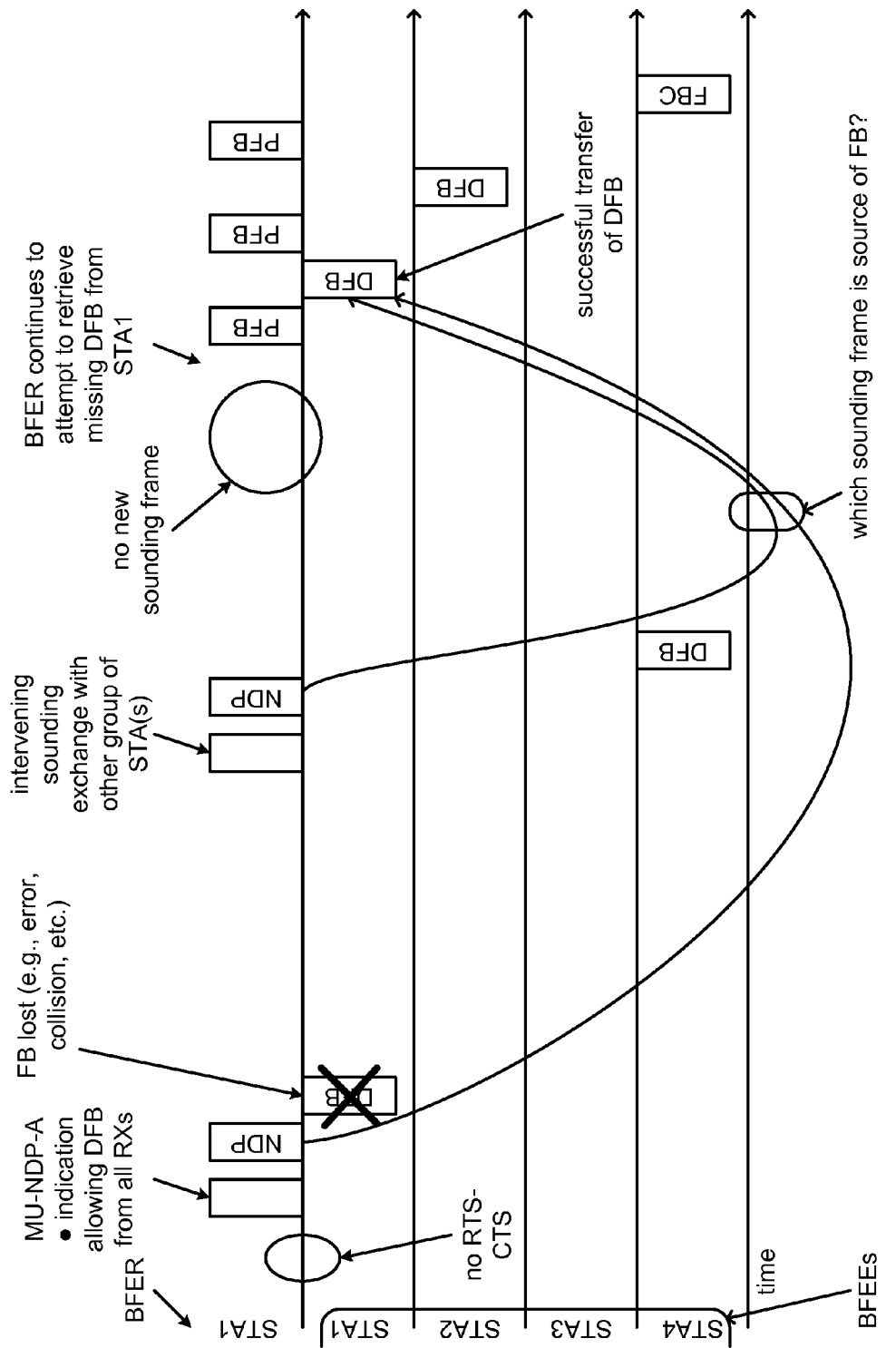
FIG. 36 is a diagram illustrating an embodiment of failed DFB reception, with forced backoff, between various wireless communication devices within a communication system.

FIG. 36 is a diagram illustrating an embodiment of failed DFB reception, with forced backoff, between various wireless communication devices within a communication system. This diagram operates based upon the assumption that some previous sounding exchange has provided at least one communication associated with full or complete feedback (CFB).

With respect to the functionality and/or operations depicted within this diagram, there is some initial failure that is depicted as occurring when the coverage as provided by the network allocation vector (NAV) is uni-directional. In accordance with operation compliant with certain rules of retransmission that may not allow for fast retry, backoff may alternatively be performed.

By employing an intervening backoff function, one or more intervening exchanges may be performed.

However, as can be seen within the diagram, a transmitter wireless communication device or Beamformer (e.g., STA0) may be operative to perform an intervening sounding exchange in which at least one of the other wireless communication devices (e.g., receiver wireless communication device, STA1) is not included in the corresponding respective sounding exchange. For example, one of the wireless communication devices (e.g., receiver wireless communication device, STA1) is not included in this intervening sounding exchange. In some instances, this failure to be included within the intervening sounding exchange However, this might not be immediately recognized that respective one of the wireless communication devices (e.g., receiver wireless communication device, STA1). Therefore, that particular one of the wireless communication devices (e.g., receiver wireless communication device, STA1) may errantly overwrite local memory storage of channel estimate information. In other words, that particular one of the wireless communication devices (e.g., receiver wireless communication device, STA1) might unfortunately lose undelivered differential feedback (DFB) information (e.g., DFB information that has yet to be provided to the transmitter wireless communication device or beamformer (e.g., STA0).

Subsequent attempts as performed by the transmitter wireless communication device or beamformer (e.g., STA0) to retrieve differential feedback (DFB) from that particular one of the wireless communication devices (e.g., receiver wireless communication device, STA1) may nonetheless prove to be successful. In such an instance, the transmitter wireless communication device or beamformer (e.g., STA0) may be able to recognize and/or determine whether or not it has received differential feedback (DFB) information from that particular one of the wireless communication devices (e.g., receiver wireless communication device, STA1) that was generated from a first or second sounding frame by examining sounding sequence number from an MNDP-A frame. That is to say, the transmitter wireless communication device or beamformer (e.g., STA0) may be able to perform distinction regarding whether such differential feedback was associated with the first or second sounding frame by looking at particular characteristics of a previously received MNDP-A frame. For example, a given wireless communication device (e.g., a receiver wireless communication device, a Beamformee, STA) may be implemented to include an MNDP-A sounding sequence number in each respective differential feedback (DFB) or full or complete feedback (CFB) frame.

Some characteristics of respective null data packet frames are provided below with respect to both multiuser and single-user applications.

Multi-User NDP-A Frame (MNDP-A)

Such a MNDP-A may be implemented to include the following information:

FC—to identify the frame type and subtype
DUR—to provide MAC NAV protection information
RA—to indicate the intended recipient or recipients of the MNDP-A
TA—to indicate the transmitter of the MNDP-A
AD3—to indicate the BSSID of the transmitter
HTC or some other field to contain an indication of the NDP announcement
User List—a list of recipients that must generate feedback after receiving the subsequent NDP sounding frame With respect to the user list, such information may be included therein corresponding to a list of uniquely identifiable recipient wireless communication devices (e.g., receiver wireless communication devices, wireless stations (STAs), etc.), such that each one of which is expected to generate and prepare for transmission a feedback frame after receiving the subsequent NDP sounding frame. In addition, such a user list may be implemented to provide for per-user indication as to whether a particular responding recipient is allowed to send differential feedback or not. For example, as described with respect to other embodiments, there may be granularity of the level of per wireless communication device in terms of whether or not differential feedback or full/complete feedback is to be provided from each respective wireless communication device (e.g., such as allowing the receiver wireless communication device to make a decision regarding whether or not to provide differential feedback or full/complete feedback, or in accordance with specifying particularly what type of feedback is to be provided from each respective wireless communication device [e.g., differential feedback from a first wireless communication device, full/complete feedback from a second wireless communication device, etc.])

Single User (SU) NDP-A Frame (NDP-A)

As stated also elsewhere herein with respect to other diagrams and/or embodiments, the in accordance with various aspects, and their equivalents, of the invention are applicable to single user (SU) applications as well as multiple user (MU) applications. For example, such differential feedback functionality and/or operations as described herein with respect to a multi-user environment may generally be applied to a single user environment as well. T In such embodiments, an existing NDP-A frame as being implemented and applied for use in accordance with a SU environment may be implemented to include at least one bit therein to indicate whether or not full or complete (CFB) is required. For example, one possible implementation of an NDP-A frame uses an HTC field to indicate the respective NDP Announcement. Such an HTC field may be implemented to have one or more reserved bits. At least one of these respective reserved bits may be employed to indicate the respective feedback (FB) type requested, that is, complete FB required or complete or differential FB allowed.

One embodiment operating in accordance with certain feedback (FB) protocols and existing definition for Reserved bits, the following definitions of bit values may be employed:

Value of "0" in new bit indicates that Complete FB is required

Value of "1" in new bit indicates that Differential FB is allowed, but Complete FB is also allowed FIG. 37A, FIG. 37B, FIG. 38, FIG. 39, and FIG. 40 are diagrams illustrating various embodiments of methods for operating one or more wireless communication devices.

Referring to the method 3700 of FIG. 37A, generally speaking, the operations of the method 3700 may be viewed as being performed within the transmitter wireless communication device, such as an access point (AP), a wireless station (STA) operating as an AP, network manager, etc., and/or any other wireless communication device generally operating as a transmitter in a communication system (which may of course include bidirectional communications therein) such that one of those wireless communication devices (e.g., the TX) generally serves and facilitates communications between more than one other wireless communication device. For example, in the context of a wireless local area network, an access point (AP) may be viewed as serving as a network manager respect to a number of wireless stations (STAs).

With respect to the method 3700, the method 3700 operates by receiving a plurality of full feedback signals respectively from a plurality of wireless communication devices, as shown in a block 3710. The method 3700 continues by receiving at least one of a plurality of differential feedback signals respectively from at least one of the plurality of wireless communication devices, as shown in a block 3720. For example, as few as one singular wireless communication device may provide as few as one singular differential feedback signal. Generally speaking, each of the different respective wireless communication devices may independently and selectively provide different differential feedback signals to such a first wireless communication device (e.g., AP). The frequency by which the various wireless communication devices provide their respective differential feedback signals may vary. For example, depending on variation of the respective communication channels between each respective wireless communication device and the transmitter wireless communication device (e.g., AP), each respective wireless communication device may provide respective differential feedback signals accordingly. For example, in a situation in which a given communication link between a given wireless communication device and the transmitter wireless communication device, then respective differential feedback signals may be provided there between more frequently than for a communication link between another given wireless communication device and the transmitter wireless communication device may require.

The method 3700 operates by updating at least one of the plurality of full feedback signals thereby generating at least one updated feedback signal, shown in a block 3730. For example, such updating may be viewed as being based upon the at least one of the plurality of different feedback signals received. Different respective updating may be individually and respectively performed for each of the respective full feedback signals. For example, a first full feedback signal may be firstly updated using a first differential feedback signal, then secondly updated using a second differential feedback signal, etc. It is noted that the updating of a full feedback signal using a differential feedback signal will generate a modified/updated full feedback signal. It is this modified/updated full feedback signal that gets updated using the differential feedback signal. The updating may be viewed as being incremental using differently and respectively received differential feedback signals thereby generating a number of intermediate/modified/updated full feedback signals.

Referring to the method 3701 of FIG. 37B, the operational steps of this method 3701 may also be viewed generally as being performed by transmitter wireless communication device (e.g., AP, STA operating as an AP, a network manager etc.). The method 3701 operates by receiving a plurality of full feedback signals respectively from a plurality of wireless communication devices, as shown in a block 3711. The method 3701 then continues by receiving at least one of a plurality of differential feedback signals respectively from at least one of the plurality of wireless communication devices, as shown in a block 3721. As stated with respect other embodiments and/or diagrams herein, as few as one differential feedback signal may be received from as few as one wireless communication device in some situations.

The method 3701 continues by updating at least one of the plurality of full feedback signals thereby generating at least one updated feedback signal, shown in a block 3731. For example the updating may be viewed as being based upon the at least one of a plurality of differential feedback signals received. Each different and respective full feedback signal may be independently and respectively updated using different and respectively received differential feedback signals. As with respect to other diagrams and/or embodiments herein, the frequency by which each respective full feedback signal gets updated may be different. A first full feedback signal may be updated X number of times during a given time period in which a second full feedback signal gets updated Y number of times (e.g., where X and Y are integers). That is to say, any of a variety of different considerations and/or operational characteristics may direct the updating of the respective full feedback signals at different frequencies, rates, etc.

The method 3701 continues by employing the at least one updated feedback signal in accordance with beamforming, as shown in a block 3741. For example, using the at least one updated feedback signal, the method 3701 may be viewed as performing appropriate operations in accordance with beamforming such that at least one additional signal may undergo transmission accordingly based upon feedback provided from that respective wireless communication device. As shown in a block 3751, the method 3701 operates by transmitting at least one additional signal based on the beamforming that has been identified and/or performed in one or more of the previous steps.

Referring to the method 3800 of FIG. 38, the operational steps of this method 3701 may also be viewed generally as being performed by transmitter wireless communication device (e.g., AP, STA operating as an AP, a network manager etc.). The method 3800 operates by transmitting a first signal to a plurality of wireless communication devices requesting or allowing either full feedback or differential feedback there from, as shown in a block 3810. For example, as is also been described with respective other embodiments and/or diagrams herein, such a transmitter wireless communication device may require or request specifically feedback to be provided in one particular way. In other situations or embodiments, a transmitter wireless communication device may optionally allow each respective receiver wireless communication device to select the manner by which feedback is to be provided there from.

The method 3800 then operates by receiving a first plurality of full feedback signals respectively from the plurality of wireless communication devices, as shown in a block 3820. The method 3800 may then perform successive operations either in parallel with respect to one another or successively with respect to one another (e.g., alternatively with respect to one another). For example, from those wireless communication devices for which differential feedback has been requested (or from those wireless communication devices which have decided to provide differential feedback), the method 3800 operates by selectively receiving at least one of a plurality of differential feedback signals from those particular wireless communication devices, as shown in a block 3830. Upon receipt of at least one of the plurality of differential feedback signals, the method 3800 operates by updating at least one of the first plurality of feedback signals based on the at least one of a plurality of differential feedback signals, as shown in a block 3840.

With respect to those wireless communication devices for which full feedback has been requested (or from those wireless communication devices which have decided to provide full feedback), the method 3800 operates by selectively receiving at least one of a plurality of additional/second fulfill back signals from those particular wireless communication devices providing full feedback, as shown in a block 3840.

In certain situations, with respect to the operational mode by which feedback is provided from a given one or more wireless communication devices to the transmitter wireless communication device, alternating between full feedback and differential feedback operational modes may be performed. For example during a first period of time, full feedback may be supported. During a second period of time, differential feedback may be supported. Alternating between the respective operational modes may be performed based on any of a number of considerations, including the direction of the transmitter wireless communication device, selection or decision-making by as few as one of the wireless communication devices (e.g., STAs), variation in the communication channel, change in environmental and/or operating conditions, etc.

It is noted that certain wireless communication devices and may include different wireless communication devices having varying capabilities. For example, certain of the wireless communication devices may not be operative to support a differential feedback operational mode or a full feedback operational mode. In such instances, even when provided the opportunity to give feedback in either of the operational modes (e.g., full or differential), if a given wireless communication device only has capability to provide one or the other, then such feedback will be provided in accordance with that operational mode. Coordination is provided between a transmitter wireless communication device and one or more receiver wireless communication devices so that the respective capabilities of the wireless communication devices at each end of a communication link are known by those at least two respective wireless communication devices. For example, in instances in which one of the operational modes is directed by the transmitter wireless communication device (e.g., differential), if a given receiver wireless communication device does not have capability to support that operational mode (e.g., the receiver wireless communication device is operative only does work full feedback), that receiver wireless communication device should inform the transmitter wireless communication device of its inability to support that operational mode.

Referring to the method 3900 of FIG. 39, the method 3900 operates by receiving a first plurality of full feedback signals respectively from a plurality of wireless communication devices, as shown in a block 3910. The method 3900 then continues by receiving at least one of the plurality of differential feedback signals respectively from at least one of the plurality of wireless communication devices, as shown in a block 3920. The method 3900 then operates by updating at least one of the plurality of full feedback signals thereby generating at least one updated feedback signal, as shown in a block 3930. The updating may be viewed as being based on the most recently received at least one of the plurality of differential feedback signals. Such operations of the blocks 3920 and 3930 may be repeated any desired number of times and/or for any desired period of time. That is to say, additional differential feedback signals may be received and one or more of the full feedback signals may be individually and respectively updated accordingly. Again, as described with respect other embodiments and/or diagrams, updating may be viewed as being successively performed such that a most recently received differential feedback signal is used to update a most recently modified/updated full feedback signal.

At a successive time, additional full feedback signals may be received. For example, a first plurality of full feedback signals may be firstly received, and then a number of differential feedback signals may be successively received for use in updating at least one of the first plurality of full feedback signals. In response to any of a number of conditions (e.g., the elapse of the period of time, the receipt of a certain number of differential feedback signals, the updating of a given full feedback signal and its respective subsequent/updated/modified versions thereof, etc.), an additional set of full feedback signals may be received.

For example, the method 3900 operates by receiving a second plurality of full feedback signals respectfully from the plurality of wireless communication devices or a subset thereof, as shown in the blood 3940. This may be viewed as replacing the first plurality of full feedback signals and/or the most recently updated plurality of full feedback signals. The method 3900 continues by receiving at least one of a plurality of differential feedback signals respectively from at least one of the plurality of wireless communication devices, as shown in a block 3950. The method 3900 then operates by updating at least one of the plurality of full feedback signals thereby generating at least one updated feedback signal, as shown in a block 3960. Such updating may be viewed as being performed in the most recently received at least one of the plurality of differential feedback signals. As described above with respect to the operations of the blocks 3920 and 3930, the operations of the blocks 3950 and 3960 may be repeated any desired number of times and/or for any desired period of time. The number of times and/or the period of time during which the operations of the blocks 3950 and 3960 are performed may be different than the number of times and/or the period of time during which the operation of the blocks 3920 and 3930 are performed. That is to say, each respective operational period need not be the same (e.g., the operational period after the receipt of a plurality of full feedback signals and the subsequent receipt of at least one of a plurality of differential feedback signals before which at least one additional plurality of full feedback signals is received, etc.).

Referring to the method 4000 of FIG. 40, the method 4000 operates by monitoring variation in the communication channel between transmitter wireless communication device and one or more receiver wireless communication devices, as shown in a block 4010. In certain embodiments, such a transmitter wireless communication device may be an access point (AP), and the receiver wireless communication devices may be wireless stations (STAs). The method 4000 then operates by selecting or determining one or more parameters by which differential feedback is to be provided to the transmitter wireless communication device, as shown in a block 4020. Such selecting or determining may be based upon variation in the communication channel as has been monitored between the transmitter wireless communication device and one of the receiver wireless communication devices. In certain situations, the transmitter wireless communication device or a given respective receiver wireless communication device operates by selecting or determining one or more parameters by which differential feedback is to be provided to the transmitter wireless communication device. That is to say, within a given communication link between the transmitter wireless communication device any given one of the receiver wireless communication devices, one of the two respective wireless communication devices at each end of the communication link may be operative for selecting or determining the one or more parameters by which differential feedback is to be provided to the transmitter wireless communication device. In alternative embodiments, both the transmitter wireless communication device and that respective receiver wireless communication device cooperatively operate for selecting or determining the one or more parameters in accordance with joint or mutual operation.

Then, the method 4000 operates by providing differential feedback in accordance with the one or more parameters, as shown in a block 4030. Moreover, in certain body was, the method 4000 operates by adapting the one or more parameters and/or selecting or determining one or more additional parameters based on variation in the communication channel. That is to say, in accordance with successive monitoring of variation in the communication channel, one or more of the parameters may be adapted and/or one or more additional parameters may be selected or determined for use in providing differential feedback. In some embodiments, the one or more additional parameters replaces the initial one or more parameters employed for providing the differential feedback. In other embodiments, one or more of the initial parameters is adapted/modified/updated based on variation in the mediation channel. Particularly with respect to certain types of communication channels including wireless communication channels, it is noted that variation may be ongoing and continuous. Based upon such continuous, ongoing variation within the communication channel, one or more operational parameters may be modified based thereon. Such examples of such operational parameters include the number of bits, quantization granularity level deltas, quantization levels, frequency of differential feedback, whether to operate in accordance with a full feedback operational mode or a differential feedback operational mode, a type of Huffman code to be employed in accordance with such feedback, etc. and/or any other operational parameter which may be employed in accordance with providing feedback including those as described with respect to other embodiments and/or diagrams herein.

It is also noted that the various operations and functions as described with respect to various methods herein may be performed within a wireless communication device, such as using a baseband processing module and/or a processing module implemented therein, (e.g., such as in accordance with the baseband processing module 64 and/or the processing module 50 as described with reference to FIG. 2) and/or other components therein. For example, such a baseband processing module can generate such signals and frames as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing to generate signals for transmission using at least one of any number of radios and at least one of any number of antennae to another wireless communication device (e.g., which also may include at least one of any number of radios and at least one of any number of antennae) in accordance with various aspects of the invention, and/or any other operations and functions as described herein, etc. or their respective equivalents. In some embodiments, such processing is performed cooperatively by a processing module in a first device, and a baseband processing module within a second device. In other embodiments, such processing is performed wholly by a baseband processing module or a processing module.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

Mode Selection Tables:

TABLE 1

2.4 GHz, 20/22 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1
PSD Mask 1

| Frequency Offset | dBr |
|---|---|
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |

TABLE 5-continued

Channelization for Table 4

| Channel | Frequency (MHz) | Country | Channel | Frequency (MHz) | Country |
|---|---|---|---|---|---|
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |

TABLE 10-continued

5 GHz, with 40 MHz channels and max bit rate of 486 Mbps

| Rate | TX Antennas | ST Code Rate | Modulation | Code Rate | NBPSC |
|---|---|---|---|---|---|
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10
PSD Mask 2

| Frequency Offset | dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. A wireless communication device comprising:
a processor configured to:
    transmit a full feedback signal to another wireless communication device;
    transmit a differential feedback signal to the another wireless communication device for use by the another wireless communication device to generate a full updated feedback signal using the full feedback signal and the differential feedback signal, wherein the differential feedback signal includes a difference between the full feedback signal and another full feedback signal; and
    receive a beamformed signal from the another wireless communication device after transmitting at least one of the full feedback signal or the differential feedback signal to the another wireless communication device, wherein the beamformed signal is based on the at least one of the full feedback signal or the differential feedback signal.

2. The wireless communication device of claim 1, wherein the processor is further configured to:
    receive, from the another wireless communication device, a request for the at least one of the full feedback signal or the differential feedback signal before transmitting the at least one of the full feedback signal or the differential feedback signal to the another wireless communication device.

3. The wireless communication device of claim 1, wherein the processor is further configured to:
    support communications with the another wireless communication device to determine cooperatively with the another wireless communication device whether the wireless communication device is to provide full feedback or differential feedback to the another wireless communication device; and
    transmit the at least one of the full feedback signal or the differential feedback signal after determining cooperatively with the another wireless communication device whether the wireless communication device is to provide the full feedback or the differential feedback to the another wireless communication device.

4. The wireless communication device of claim 1, wherein the processor is further configured to:
    transmit at least one of the another full feedback signal or another differential feedback signal to the another wireless communication device, after transmitting the differential feedback signal to the another wireless communication device, for use by the another wireless communication device to generate another full updated feedback signal.

5. The wireless communication device of claim 1, wherein the processor is further configured to:
    transmit the full feedback signal to the another wireless communication device, wherein the full feedback signal includes a plurality of angles associated with a beamforming feedback matrix; and
    transmit the differential feedback signal to the another wireless communication device, wherein the differential feedback signal includes at least one differential angle for use by the another wireless communication device to update at least one angle of the plurality of angles.

6. The wireless communication device of claim 1, wherein the processor is further configured to:
    transmit the full feedback signal to the another wireless communication device, wherein the full feedback signal includes a compressed beamforming feedback matrix; and
    transmit the differential feedback signal to the another wireless communication device, wherein the differential feedback signal includes differential information for use by the another wireless communication device to update the compressed beamforming feedback matrix.

7. The wireless communication device of claim 1 further comprising:
    a cellular telephone, a two-way radio, a personal digital assistant (PDA), a personal computer (PC), a laptop computer, or a home entertainment equipment.

8. The wireless communication device of claim 1 further comprising:
    a wireless station (STA), wherein the another wireless communication device includes an access point (AP).

9. A wireless communication device comprising:
a processor configured to:
    support communications with another wireless communication device to determine whether the wireless communication device is to provide full feedback or differential feedback to the another wireless communication device; and operate, when differential feedback is determined, to:
- transmit a full feedback signal to the another wireless communication device;
- transmit a differential feedback signal to the another wireless communication device for use by the another wireless communication device to generate a beamformed signal using the full feedback signal and the differential feedback signal; and
- receive the beamformed signal from the another wireless communication device.

10. The wireless communication device of claim 9, wherein the processor is further configured, when full feedback is determined, to:
- transmit a first full feedback signal to another wireless communication device for use by the another wireless communication device to generate a first beamformed signal;
- receive the first beamformed signal from the another wireless communication device;
- transmit a second full feedback signal to the another wireless communication device for use by the another wireless communication device to generate a second beamformed signal; and
- receive the second beamformed signal from the another wireless communication device.

11. The wireless communication device of claim 9, wherein the processor is further configured to:
- transmit at least one of another full feedback signal or another differential feedback signal to the another wireless communication device, after transmitting the differential feedback signal to the another wireless communication device, for use by the another wireless communication device to generate another updated feedback signal.

12. The wireless communication device of claim 9, wherein the processor is further configured to:
- transmit the full feedback signal to the another wireless communication device, wherein the full feedback signal includes a plurality of angles associated with a beamforming feedback matrix; and
- transmit the differential feedback signal to the another wireless communication device, wherein the differential feedback signal includes at least one differential angle for use by the another wireless communication device to update at least one angle of the plurality of angles.

13. The wireless communication device of claim 9 further comprising:
- a wireless station (STA), wherein the another wireless communication device includes an access point (AP).

14. A method for execution by a wireless communication device, the method comprising:
- transmit, via a communication interface of the wireless communication device, a full feedback signal to another wireless communication device;
- transmit, via the communication interface of the wireless communication device, a differential feedback signal to the another wireless communication device for use by the another wireless communication device to generate a full updated feedback signal using the full feedback signal and the differential feedback signal, wherein the differential feedback signal includes a difference between the full feedback signal and another full feedback signal; and
- receiving a beamformed signal from the another wireless communication device after transmitting at least one of the full feedback signal or the differential feedback signal to the another wireless communication device, wherein the beamformed signal is based on the at least one of the full feedback signal or the differential feedback signal.

15. The method of claim 14 further comprising:
- receiving, from the another wireless communication device, a request for the at least one of the full feedback signal or the differential feedback signal before transmitting the at least one of the full feedback signal or the differential feedback signal to the another wireless communication device.

16. The method of claim 14 further comprising:
- supporting communications with the another wireless communication device to determine cooperatively with the another wireless communication device whether the wireless communication device is to provide full feedback or differential feedback to the another wireless communication device; and
- transmitting the at least one of the full feedback signal or the differential feedback signal after determining cooperatively with the another wireless communication device whether the wireless communication device is to provide the full feedback or the differential feedback to the another wireless communication device.

17. The method of claim 14 further comprising:
- transmitting at least one of the another full feedback signal or another differential feedback signal to the another wireless communication device, after transmitting the differential feedback signal to the another wireless communication device, for use by the another wireless communication device to generate another full updated feedback signal.

18. The method of claim 14 further comprising:
- transmitting the full feedback signal to the another wireless communication device, wherein the full feedback signal includes a plurality of angles associated with a beamforming feedback matrix; and
- transmitting the differential feedback signal to the another wireless communication device, wherein the differential feedback signal includes at least one differential angle for use by the another wireless communication device to update at least one angle of the plurality of angles.

19. The method of claim 14, wherein the wireless communication device includes a cellular telephone, a two-way radio, a personal digital assistant (PDA), a personal computer (PC), a laptop computer, or a home entertainment equipment.

20. The method of claim 14, wherein the wireless communication device includes a wireless station (STA), and the another wireless communication device includes an access point (AP).

* * * * *